(12) United States Patent
Jewell et al.

(10) Patent No.: US 11,698,885 B2
(45) Date of Patent: *Jul. 11, 2023

(54) SYSTEM AND METHOD FOR CONTENT SYNCHRONIZATION

(71) Applicant: Open Text SA ULC, Halifax (CA)

(72) Inventors: Brian Alexander Jewell, Kitchener (CA); Jinshan Yang, Waterloo (CA)

(73) Assignee: Open Text SA ULC, Halifax (CA)

( * ) Notice: Subject to any disclaimer, the term of this patent is extended or adjusted under 35 U.S.C. 154(b) by 32 days.

This patent is subject to a terminal disclaimer.

(21) Appl. No.: 17/240,798

(22) Filed: Apr. 26, 2021

(65) Prior Publication Data

US 2021/0248112 A1    Aug. 12, 2021

Related U.S. Application Data

(63) Continuation of application No. 15/824,639, filed on Nov. 28, 2017, now Pat. No. 11,003,632.

(60) Provisional application No. 62/426,987, filed on Nov. 28, 2016.

(51) Int. Cl.
  *G06F 16/178* (2019.01)
  *G06F 16/17* (2019.01)
  *H04L 67/1095* (2022.01)
  *G06F 16/172* (2019.01)

(52) U.S. Cl.
  CPC ........ *G06F 16/1734* (2019.01); *G06F 16/172* (2019.01); *G06F 16/178* (2019.01); *H04L 67/1095* (2013.01)

(58) Field of Classification Search
  CPC ... G06F 16/172; G06F 16/128; G06F 16/1787
  See application file for complete search history.

(56) References Cited

U.S. PATENT DOCUMENTS

| | | | |
|---|---|---|---|
| 4,887,204 A | 12/1989 | Johnson et al. |
| 4,897,781 A | 1/1990 | Chang et al. |
| 5,202,982 A | 4/1993 | Gramlich et al. |
| 5,261,051 A | 11/1993 | Masden et al. |
| 5,293,619 A | 3/1994 | Dean |
| 5,473,772 A | 12/1995 | Halliwell et al. |
| 5,504,879 A | 4/1996 | Eisenberg et al. |

(Continued)

OTHER PUBLICATIONS

Defendant's Preliminary Invalidity Contentions, *Open Text Corp.* v. *Alfresco Software*, CA. No. 6:20-cv-00928, Jul. 15, 2021, pp. 104-200 (222 pages total).

(Continued)

*Primary Examiner* — Grace Park
(74) *Attorney, Agent, or Firm* — Sprinkle IP Law Group

(57) ABSTRACT

One embodiment of a system comprises a client device and a remote content management system. The client device comprises a synchronization manager that maintains a remote virtual model that models a synchronization state of a remote peer resource at the content management system and a local virtual model that models a synchronization state of a local peer resource in the local file system. The synchronization manager determines that the remote peer resource and local peer resource are out of sync based on a comparison of the remote virtual model and the local virtual model and synchronizes changes from the local cache to the content management system to update the remote peer resource or synchronizes changes from the content management system to update the local peer resource.

20 Claims, 21 Drawing Sheets

(56) References Cited

U.S. PATENT DOCUMENTS

| | | |
|---|---|---|
| 5,675,802 A | 10/1997 | Allen |
| 5,732,219 A | 3/1998 | Blumer et al. |
| 5,740,430 A | 4/1998 | Rosenberg et al. |
| 5,765,171 A | 6/1998 | Gehani |
| 5,774,717 A | 6/1998 | Porcaro |
| 5,793,966 A | 8/1998 | Amstein et al. |
| 5,802,297 A | 9/1998 | Engquist |
| 5,805,809 A | 9/1998 | Singh et al. |
| 5,829,022 A | 10/1998 | Watanabe et al. |
| 5,845,293 A | 12/1998 | Veghte et al. |
| 6,023,708 A | 2/2000 | Mendez et al. |
| 6,026,413 A | 2/2000 | Challenger et al. |
| 6,073,161 A | 6/2000 | DeBoskey et al. |
| 6,088,702 A | 7/2000 | Plantz et al. |
| 6,105,037 A | 8/2000 | Kishi |
| 6,119,151 A | 9/2000 | Cantrell et al. |
| 6,151,624 A | 11/2000 | Teare et al. |
| 6,185,608 B1 | 2/2001 | Hon et al. |
| 6,198,824 B1 | 3/2001 | Shambroom |
| 6,199,065 B1 | 3/2001 | Kenyon |
| 6,219,675 B1 | 4/2001 | Pal et al. |
| 6,226,752 B1 | 5/2001 | Gupta |
| 6,434,543 B1 | 8/2002 | Goldberg et al. |
| 6,510,458 B1 | 1/2003 | Berstis et al. |
| 6,578,054 B1 | 6/2003 | Hopmann et al. |
| 6,633,924 B1 | 10/2003 | Wu et al. |
| 6,687,793 B1 | 2/2004 | Thomas et al. |
| 6,697,844 B1 | 2/2004 | Chan et al. |
| 6,701,345 B1 | 3/2004 | Carley et al. |
| 6,701,428 B1 | 3/2004 | Harvey, III et al. |
| 6,754,621 B1 | 6/2004 | Cunningham et al. |
| 6,754,696 B1 | 6/2004 | Kamath et al. |
| 6,757,705 B1 | 6/2004 | Pardikar et al. |
| 6,757,871 B1 | 6/2004 | Sato |
| 6,766,352 B1 | 7/2004 | McBrearty et al. |
| 6,816,891 B1 | 11/2004 | Vahalia et al. |
| 6,842,770 B1 | 1/2005 | Serlet et al. |
| 6,847,983 B2 | 1/2005 | Somalwar et al. |
| 6,850,941 B1 | 2/2005 | White et al. |
| 6,952,741 B1 | 10/2005 | Bartlett et al. |
| 7,062,515 B1 | 6/2006 | Thomas et al. |
| 7,171,619 B1 | 1/2007 | Bianco |
| 7,194,010 B2 | 3/2007 | Beasley |
| 7,254,617 B2 | 8/2007 | Schuh |
| 7,337,392 B2 | 2/2008 | Lue |
| 7,363,330 B1 | 4/2008 | Ellman et al. |
| 7,469,408 B2 | 12/2008 | Carter et al. |
| 7,590,665 B2 | 9/2009 | Thomas et al. |
| 7,593,943 B2 | 9/2009 | Clark |
| 7,657,517 B2 | 2/2010 | Brown et al. |
| 7,711,771 B2 | 5/2010 | Kirnos |
| 7,734,826 B2 | 6/2010 | Brown et al. |
| 8,117,152 B2 | 2/2012 | Thomas et al. |
| 8,156,074 B1 | 4/2012 | Multer et al. |
| 8,161,019 B2 | 4/2012 | Bailor et al. |
| 8,219,526 B2 | 7/2012 | Clarke et al. |
| 8,286,077 B2 | 10/2012 | Zhang et al. |
| 8,452,728 B2 | 5/2013 | Thomas et al. |
| 8,510,848 B1 | 8/2013 | Zhao et al. |
| 8,539,080 B1 | 9/2013 | Uluderya et al. |
| 8,645,318 B2 | 2/2014 | Thomas et al. |
| 8,825,597 B1 | 9/2014 | Houston et al. |
| 9,110,911 B2 | 8/2015 | Thomas et al. |
| 9,292,536 B2 | 3/2016 | Thomas et al. |
| 9,497,292 B2 | 11/2016 | Goldman |
| 9,507,651 B2 | 11/2016 | McDonald et al. |
| 9,594,768 B2 | 3/2017 | Thomas et al. |
| 9,614,893 B2 | 4/2017 | Kim |
| 9,898,520 B2 | 2/2018 | Hawa et al. |
| 10,057,318 B1 | 8/2018 | Rashid |
| 10,089,324 B2 | 10/2018 | Thomas et al. |
| 10,218,778 B2 | 2/2019 | Wesley |
| 10,275,510 B2 | 4/2019 | Hawa et al. |
| 10,324,903 B1 | 6/2019 | Goldberg |
| 10,339,156 B2 | 7/2019 | Hawa et al. |
| 10,552,382 B2 | 2/2020 | Thomas et al. |
| 10,713,282 B2 | 7/2020 | Hawa et al. |
| 10,915,556 B2 | 2/2021 | Hawa et al. |
| 11,003,632 B2 | 5/2021 | Jewell |
| 11,016,992 B2 | 5/2021 | Hawa |
| 11,301,431 B2 | 4/2022 | Jewell |
| 11,314,778 B2 | 4/2022 | Hawa |
| 2001/0027420 A1 | 10/2001 | Boublik et al. |
| 2001/0032254 A1 | 10/2001 | Hawkins |
| 2002/0107835 A1 | 8/2002 | Coram et al. |
| 2002/0111956 A1 | 8/2002 | Yeo et al. |
| 2002/0129065 A1 | 9/2002 | Shiohara |
| 2002/0155848 A1 | 10/2002 | Suryanaraya |
| 2003/0101223 A1 | 5/2003 | Pace et al. |
| 2003/0182450 A1 | 9/2003 | Ong et al. |
| 2004/0049579 A1 | 3/2004 | Ims |
| 2004/0172423 A1 | 9/2004 | Kaasten |
| 2004/0205452 A1 | 10/2004 | Fitzsimons et al. |
| 2004/0230894 A1 | 11/2004 | Elza et al. |
| 2005/0050067 A1 | 3/2005 | Sollicito et al. |
| 2005/0091339 A1 | 4/2005 | Rudolph |
| 2005/0278458 A1 | 12/2005 | Berger et al. |
| 2006/0047804 A1 | 3/2006 | Fredricksen et al. |
| 2006/0101100 A1 | 5/2006 | Konidena et al. |
| 2006/0117018 A1 | 6/2006 | Christiansen |
| 2006/0161841 A1 | 7/2006 | Horiuchi et al. |
| 2007/0033569 A1 | 2/2007 | Davidson et al. |
| 2007/0061327 A1 | 3/2007 | Oscherov |
| 2007/0157173 A1 | 7/2007 | Klein |
| 2007/0220417 A1 | 9/2007 | Mathew et al. |
| 2008/0098006 A1 | 4/2008 | Pedersen |
| 2008/0291891 A1 | 11/2008 | Jerlhagen |
| 2009/0063274 A1 | 3/2009 | Dublin, III |
| 2009/0077160 A1 | 3/2009 | Svendsen |
| 2009/0106247 A1 | 4/2009 | Daughtry |
| 2009/0157802 A1 | 6/2009 | Kang |
| 2009/0157811 A1 | 6/2009 | Bailor |
| 2009/0249222 A1 | 10/2009 | Schmidt et al. |
| 2009/0276698 A1 | 11/2009 | Clarke et al. |
| 2009/0327907 A1 | 12/2009 | Estrada |
| 2010/0174690 A1 | 7/2010 | Marcotte |
| 2010/0287253 A1 | 11/2010 | Xie et al. |
| 2011/0209064 A1 | 8/2011 | Jorgensen et al. |
| 2011/0289404 A1 | 11/2011 | Fleur et al. |
| 2011/0320889 A1 | 12/2011 | Balasubramanyan et al. |
| 2012/0033254 A1 | 2/2012 | Numata |
| 2012/0036178 A1 | 2/2012 | Gavini et al. |
| 2012/0010980 A1 | 4/2012 | Taleghani |
| 2012/0089906 A1 | 4/2012 | Reeves et al. |
| 2012/0117481 A1 | 5/2012 | Stevens et al. |
| 2012/0173612 A1 | 7/2012 | Vegesna-Venkata et al. |
| 2012/0192064 A1 | 7/2012 | Antebi et al. |
| 2012/0226673 A1 | 9/2012 | Li |
| 2012/0284602 A1 | 11/2012 | Seed et al. |
| 2012/0296889 A1 | 11/2012 | Davydok et al. |
| 2013/0054514 A1 | 2/2013 | Barrett-Kahn et al. |
| 2013/0226872 A1 | 8/2013 | Barefoot et al. |
| 2013/0226876 A1 | 8/2013 | Gati |
| 2013/0254656 A1 | 9/2013 | Florian |
| 2013/0262551 A1 | 10/2013 | Hasuike et al. |
| 2014/0032489 A1 | 1/2014 | Hebbar et al. |
| 2014/0053084 A1 | 2/2014 | Kim |
| 2014/0081912 A1 | 3/2014 | Liu |
| 2014/0250064 A1 | 9/2014 | Hopmann et al. |
| 2014/0250066 A1 | 9/2014 | Calkowski |
| 2014/0280779 A1 | 9/2014 | Paul |
| 2014/0281850 A1 | 9/2014 | Prakash |
| 2014/0282826 A1 | 9/2014 | Bastide |
| 2014/0351211 A1 | 11/2014 | Albouze |
| 2014/0365436 A1 | 12/2014 | Calienes |
| 2015/0012488 A1 | 1/2015 | van Rossum |
| 2015/0081633 A1 | 3/2015 | Su et al. |
| 2015/0120763 A1 | 4/2015 | Grue |
| 2015/0193408 A1 | 7/2015 | Ho |
| 2015/0248444 A1 | 9/2015 | Prahlad et al. |
| 2015/0269316 A1 | 9/2015 | Hussam |
| 2016/0034433 A1 | 2/2016 | Yamat et al. |
| 2016/0070685 A1 | 3/2016 | Williams et al. |
| 2016/0088077 A1 | 3/2016 | Liu et al. |

(56) References Cited

U.S. PATENT DOCUMENTS

| | | | |
|---|---|---|---|
| 2016/0117298 | A1 | 4/2016 | Lemonik et al. |
| 2016/0127452 | A1 | 5/2016 | Newman et al. |
| 2016/0139768 | A1 | 5/2016 | Lemonik et al. |
| 2016/0182626 | A1 | 6/2016 | Endahl et al. |
| 2016/0342519 | A1 | 11/2016 | Liashenko |
| 2016/0364404 | A1 | 12/2016 | Newhouse |
| 2017/0185573 | A1 | 6/2017 | Milvaney |
| 2018/0150477 | A1 | 5/2018 | Jewell |
| 2018/0349408 | A1 | 12/2018 | Jewell et al. |
| 2020/0293552 | A1 | 9/2020 | Hawa |
| 2021/0165804 | A1 | 6/2021 | Hawa |
| 2021/0279256 | A1 | 9/2021 | Hawa |
| 2022/0164315 | A1 | 5/2022 | Jewell |
| 2022/0207057 | A1 | 6/2022 | Hawa |

OTHER PUBLICATIONS

Defendant's Preliminary Invalidity Contentions, *Open Text Corp.* v. *Alfresco Software*, CA. No. 6:20-cv-00928, Exhibit E-1, Jul. 15, 2021 (76 Pages).
Defendant's Preliminary Invalidity Contentions, *Open Text Corp.* v. *Alfresco Software*, CA. No. 6:20-cv-00928, Exhibit E-2, Jul. 15, 2021 (162 Pages).
Defendant's Preliminary Invalidity Contentions, *Open Text Corp.* v. *Alfresco Software*, CA. No. 6:20-cv-00928, Exhibit E-3, Jul. 15, 2021 (122 Pages).
Defendant's Preliminary Invalidity Contentions, *Open Text Corp.* v. *Alfresco Software*, CA. No. 6:20-cv-00928, Exhibit E-4, Jul. 15, 2021 (116 Pages).
Defendant's Preliminary Invalidity Contentions, *Open Text Corp.* v. *Alfresco Software*, CA. No. 6:20-cv-00928, Exhibit E-5, Jul. 15, 2021 (117 Pages).
Defendant's Preliminary Invalidity Contentions, *Open Text Corp.* v. *Alfresco Software*, CA. No. 6:20-cv-00928, Exhibit E-6, Jul. 15, 2021 (193 Pages).
Defendant's Preliminary Invalidity Contentions, *Open Text Corp.* v. *Alfresco Software*, CA. No. 6:20-cv-00928, Exhibit F-1, Jul. 15, 2021 (41 Pages).
Defendant's Preliminary Invalidity Contentions, *Open Text Corp.* v. *Alfresco Software*, CA. No. 6:20-cv-00928, Exhibit F-2, Jul. 15, 2021 (64 Pages).
Defendant's Preliminary Invalidity Contentions, *Open Text Corp.* v. *Alfresco Software*, CA. No. 6:20-cv-00928, Exhibit F-3, Jul. 15, 2021 (50 Pages).
Defendant's Preliminary Invalidity Contentions, *Open Text Corp.* v. *Alfresco Software*, CA. No. 6:20-cv-00928, Exhibit F-4, Jul. 15, 2021 (46 Pages).
Defendant's Preliminary Invalidity Contentions, *Open Text Corp.* v. *Alfresco Software*, CA. No. 6:20-cv-00928, Exhibit F-5, Jul. 15, 2021 (54 Pages).
Defendant's Preliminary Invalidity Contentions, *Open Text Corp.* v. *Alfresco Software*, CA. No. 6:20-cv-00928, Exhibit F-6, Jul. 15, 2021 (90 Pages).
Defendant's Preliminary Invalidity Contentions, *Open Text Corp.* v. *Alfresco Software*, CA. No. 6:20-cv-00928, Exhibit G-1, Jul. 15, 2021 (45 Pages).
Defendant's Preliminary Invalidity Contentions, *Open Text Corp.* v. *Alfresco Software*, CA. No. 6:20-cv-00928, Exhibit G-2, Jul. 15, 2021 (79 Pages).
Defendant's Preliminary Invalidity Contentions, *Open Text Corp.* v. *Alfresco Software*, CA. No. 6:20-cv-00928, Exhibit G-3, Jul. 15, 2021 (63 Pages).
Defendant's Preliminary Invalidity Contentions, *Open Text Corp.* v. *Alfresco Software*, CA. No. 6:20-cv-00928, Exhibit G-4, Jul. 15, 2021 (59 Pages).
Defendant's Preliminary Invalidity Contentions, *Open Text Corp.* v. *Alfresco Software*, CA. No. 6:20-cv-00928, Exhibit G-5, Jul. 15, 2021 (59 Pages).
Defendant's Preliminary Invalidity Contentions, *Open Text Corp.* v. *Alfresco Software*, CA. No. 6:20-cv-00928, Exhibit G-6, Jul. 15, 2021 (102 Pages).
Defendant's Preliminary Invalidity Contentions, *Open Text Corp.* v. *Alfresco Software*, CA. No. 6:20-cv-00928, Exhibit H-1, Jul. 15, 2021 (51 Pages).
Defendant's Preliminary Invalidity Contentions, *Open Text Corp.* v. *Alfresco Software*, CA. No. 6:20-cv-00928, Exhibit H-2, Jul. 15, 2021 (97 Pages).
Defendant's Preliminary Invalidity Contentions, *Open Text Corp.* v. *Alfresco Software*, CA. No. 6:20-cv-00928, Exhibit H-3, Jul. 15, 2021 (90 Pages).
Defendant's Preliminary Invalidity Contentions, *Open Text Corp.* v. *Alfresco Software*, CA. No. 6:20-cv-00928, Exhibit H-4, Jul. 15, 2021 (79 Pages).
Defendant's Preliminary Invalidity Contentions, *Open Text Corp.* v. *Alfresco Software*, CA. No. 6:20-cv-00928, Exhibit H-5, Jul. 15, 2021 (70 Pages).
Defendant's Invalidity Contentions, *Open Text Corp.* v. *Hyland Software, Inc.* No. 8:20-cv-02123-DOC-ADS (C.D. Cal., 2020), Jul. 23, 2021, pp. 133-237 (239 pages total).
Defendant's Invalidity Contentions, *Open Text Corp.* v. *Hyland Software, Inc.* No. 8:20-cv-02123-DOC-ADS (C.D. Cal., 2020), Exhibit E-1, Jul. 23, 2021 (76 Pages).
Defendant's Invalidity Contentions, *Open Text Corp.* v. *Hyland Software, Inc.* No. 8:20-cv-02123-DOC-ADS (C.D. Cal., 2020), Exhibit E-2, Jul. 23, 2021 (162 Pages).
Defendant's Invalidity Contentions, *Open Text Corp.* v. *Hyland Software, Inc.* No. 8:20-cv-02123-DOC-ADS (C.D. Cal., 2020), Exhibit E-3, Jul. 23, 2021 (122 Pages).
Defendant's Invalidity Contentions, *Open Text Corp.* v. *Hyland Software, Inc.* No. 8:20-cv-02123-DOC-ADS (C.D. Cal., 2020), Exhibit E-4, Jul. 23, 2021 (116 Pages).
Defendant's Invalidity Contentions, *Open Text Corp.* v. *Hyland Software, Inc.* No. 8:20-cv-02123-DOC-ADS (C.D. Cal., 2020), Exhibit E-5, Jul. 23, 2021 (117 Pages).
Defendant's Invalidity Contentions, *Open Text Corp.* v. *Hyland Software, Inc.* No. 8:20-cv-02123-DOC-ADS (C.D. Cal., 2020), Exhibit E-6, Jul. 23, 2021 (193 Pages).
Defendant's Invalidity Contentions, *Open Text Corp.* v. *Hyland Software, Inc.* No. 8:20-cv-02123-DOC-ADS (C.D. Cal., 2020), Exhibit F-1, Jul. 23, 2021 (41 Pages).
Defendant's Invalidity Contentions, *Open Text Corp.* v. *Hyland Software, Inc.* No. 8:20-cv-02123-DOC-ADS (C.D. Cal., 2020), Exhibit F-2, Jul. 23, 2021 (64 Pages).
Defendant's Invalidity Contentions, *Open Text Corp.* v. *Hyland Software, Inc.* No. 8:20-cv-02123-DOC-ADS (C.D. Cal., 2020), Exhibit F-3, Jul. 23, 2021 (50 Pages).
Defendant's Invalidity Contentions, *Open Text Corp.* v. *Hyland Software, Inc.* No. 8:20-cv-02123-DOC-ADS (C.D. Cal., 2020), Exhibit F-4, Jul. 23, 2021 (46 Pages).
Defendant's Invalidity Contentions, *Open Text Corp.* v. *Hyland Software, Inc.* No. 8:20-cv-02123-DOC-ADS (C.D. Cal., 2020), Exhibit F-5, Jul. 23, 2021 (54 Pages).
Defendant's Invalidity Contentions, *Open Text Corp.* v. *Hyland Software, Inc.* No. 8:20-cv-02123-DOC-ADS (C.D. Cal., 2020), Exhibit F-6, Jul. 23, 2021 (90 Pages).
Defendant's Invalidity Contentions, *Open Text Corp.* v. *Hyland Software, Inc.* No. 8:20-cv-02123-DOC-ADS (C.D. Cal., 2020), Exhibit G-1, Jul. 23, 2021 (45 Pages).
Defendant's Invalidity Contentions, *Open Text Corp.* v. *Hyland Software, Inc.* No. 8:20-cv-02123-DOC-ADS (C.D. Cal., 2020), Exhibit G-2, Jul. 23, 2021 (79 Pages).
Defendant's Invalidity Contentions, *Open Text Corp.* v. *Hyland Software, Inc.* No. 8:20-cv-02123-DOC-ADS (C.D. Cal., 2020), Exhibit G-3, Jul. 23, 2021 (63 Pages).
Defendant's Invalidity Contentions, *Open Text Corp.* v. *Hyland Software, Inc.* No. 8:20-cv-02123-DOC-ADS (C.D. Cal., 2020), Exhibit G-4, Jul. 23, 2021 (59 Pages).
Defendant's Invalidity Contentions, *Open Text Corp.* v. *Hyland Software, Inc.* No. 8:20-cv-02123-DOC-ADS (C.D. Cal., 2020), Exhibit G-5, Jul. 23, 2021 (59 Pages).

(56) References Cited

OTHER PUBLICATIONS

Defendant's Invalidity Contentions, *Open Text Corp. v. Hyland Software, Inc.* No. 8:20-cv-02123-DOC-ADS (C.D. Cal., 2020), Exhibit G-6, Jul. 23, 2021 (102 Pages).
Defendant's Invalidity Contentions, *Open Text Corp. v. Hyland Software, Inc.* No. 8:20-cv-02123-DOC-ADS (C.D. Cal., 2020), Exhibit H-1, Jul. 23, 2021 (51 Pages).
Defendant's Invalidity Contentions, *Open Text Corp. v. Hyland Software, Inc.* No. 8:20-cv-02123-DOC-ADS (C.D. Cal., 2020), Exhibit H-2, Jul. 23, 2021 (97 Pages).
Defendant's Invalidity Contentions, *Open Text Corp. v. Hyland Software, Inc.* No. 8:20-cv-02123-DOC-ADS (C.D. Cal., 2020), Exhibit H-3, Jul. 23, 2021 (90 Pages).
Defendant's Invalidity Contentions, *Open Text Corp. v. Hyland Software, Inc.* No. 8:20-cv-02123-DOC-ADS (C.D. Cal., 2020), Exhibit H-4, Jul. 23, 2021 (79 Pages).
Defendant's Invalidity Contentions, *Open Text Corp. v. Hyland Software, Inc.* No. 8:20-cv-02123-DOC-ADS (C.D. Cal., 2020), Exhibit H-5, Jul. 23, 2021 (70 Pages).
Notice of Allowance for U.S. Appl. No. 15/997,286, dated Aug. 30, 2021, 5 pgs.
Office Action for U.S. Appl. No. 17/139,803, dated Oct. 5, 2021, 22 pgs.
"How to move the user cache director [~/.cache] out of the /home directory to another partition" on ubuntu.com, retrieved from https://askubuntu.com/questions/87314/how-to-move-the-user-cache-directory-cache-out-of-the-home-directory-to-an, 2011, 3 pgs.
Office Action for U.S. Appl. No. 15/680,029, dated Oct. 27, 2021, 55 pgs.
Office Action for U.S. Appl. No. 17/239,136, dated Oct. 27, 2021, 12 pgs.
Preston, Jon A. et al., "An Efficient Synchronous Collaborative Editing System Employing Dynamic Locking of Varying Granularity in Generalized Document Trees," IEEE, 2006, 10 pgs.
Office Action for U.S. Appl. No. 17/239,136, dated Apr. 28, 2022, 13 pgs.
Notice of Allowance for U.S. Appl. No. 15/997,286, dated Jan. 20, 2022, 5 pgs.
Surguy, Inigo, Designing Your Intranet to be Useful, Usability and Information Architecture, Ch. 6, 2003, pp. 103-137.
Office Action for U.S. Appl. No. 15/680,029, dated Feb. 10, 2022, 58 pgs.
Notice of Allowance for U.S. Appl. No. 17/139,803, dated Feb. 16, 2022, 10 pgs.
Office Action for U.S. Appl. No. 17/239,136, dated Aug. 10, 2022, 16 pgs.
Dasgupta, "Resource Location in Very Large Networks," Proceedings of IEEE Workshop on Services for Distributed and Networked Environments, Jun. 27-28, 1994, pp. 156-163, IEEE # 0-8186-5835-5/94.
Vetter et al., "Mosaic and the World-Wide Web," Computer, Oct. 1994, pp. 49-57, vol. 27, Issue 10, IEEE.
Obraczka et al., "Internet Resource Discovery Services," Computer, Sep. 1993, pp. 8-22, vol. 26, Issue 9, IEEE.
Sharma et al., "Hypertext Based Distributed Object Management for Information Location and Retrieval," Proceedings of Engineering Management Society Conf. on Managing Projects in a Borderless World, IEEE, Dec. 17-18, 1993, 6 pg.s, 102-107.
Encryption and Decryption, Microsoft Corp., 2 pg.s, printed Feb. 9, 2001, at wysiwyg://101/http://msdn.microsof....brary/wcedoc/wcesecur/crypto_1.htm.
Turley, "Design Specification for Packaged Application Support in Assassin," Vignette Corporation, Austin, Texas, 1999, 6 pgs.
Turley, Functional Specification for Packaged Application Support in Assassin, Vignette Corporation, Austin, Texas, 1999, 6 pgs.
Office Action for U.S. Appl. No. 10/033,242, dated Jul. 8, 2004, 30 pgs.
Office Action for U.S. Appl. No. 10/033,242, dated Mar. 4, 2005, 31 pgs.
Office Action for U.S. Appl. No. 10/033,242, dated Aug. 24, 2005, 11 pgs.
Office Action for U.S. Appl. No. 11/328,526, dated Jun. 6, 2008, 15 pgs.
Office Action for U.S. Appl. No. 13/335,782, dated Oct. 3, 2012, 9 pgs.
Office Action for U.S. Appl. No. 14/107,906, dated Jul. 16, 2014, 6 pgs.
Cheriton et al., "A Caching Model of Operating System Kernel Functionality," SIGOPS Operating Systems Review, vol. 29, Jan. 1995, p. 1-4.
Order Re Post-Trial Motions, pp. 1-4, 10-15 (upholding validity U.S. Pat. No. 7,062,515, U.S. Pat. No. 7,590,665, U.S. Pat. No. 8,117,152), *Open Text S.A. v. Box, Inc. et al.*, No. C 13-cv-04910-JD (N.D. Cal.), Aug. 19, 2015, 22 pgs.
Verdict Form, pp. 7, 8 (verdict on validity of U.S. Pat. No. 7,062,515, U.S. Pat. No. 7,590,665, U.S. Pat. No. 8,117,152), *Open Text S.A. v. Box, Inc. et al.*, No. C 13-cv-04910-JD (N.D. Cal.), Feb. 13, 2015, 9 pgs.
Order Granting Open Text's Motion for Summary Judgment That TreeComp 3.6 is Not Prior Art, *Open Text S.A. v. Box, Inc. et al.*, No. C 13-cv-04910-JD (N.D. Cal.), Jan. 30, 2015, 4 pgs.
Defendants Invalidity Contentions and Document Production Pursuant to Patent Local Rules 3-3 and 3-4, pp. 1-12, Exhibits C1-C16, *Open Text S.A. vs Box, Inc. et al.*, No. C 13-cv-04910-JD (N.D. Cal.), Jun. 27, 2014, 10,459 pgs.
Defendants Box, Inc. and Carahsoft Technology Corporation's Preliminary Election of Asserted Prior Art, pp. 1-6, *Open Text S.A. vs Box, Inc. et al.*, No. C 13-cv-04910-JD (N.D. Cal.), Jul. 9, 2014, 11 pgs.
Defendants' First Supplement to Invalidity Contentions, pp. 1-5, *Open Text S.A. v. Box, Inc. et al.*, No. C 13-cv-04910-JD (N.D. Cal.), Jul. 28, 2014, 22 pgs.
Defendants' Condensed Invalidity Contentions Pursuant to Court Order, pp. 1-11, Exhibits C3, C4, C8, C9, C11, C12, C16, *Open Text S.A. v. Box, Inc. et al.*, No. C 13-cv-04910-JD (N.D. Cal.), Oct. 17, 2014, 466 pgs.
Defendants' Notice of Prior Art, pp. 1, 10-14, *Open Text S.A. v. Box, Inc. et al.*, No. C 13-cv-04910-JD (N.D. Cal.), Jan. 2, 2015, 16 pgs.
Claim Construction Order, pp. 1-3, 15-21, *Open Text S.A. v. Box, Inc. et al.*, No. C 13-cv-04910-JD (N.D. Cal.), Dec. 1, 2014, 21 pgs.
Supplemental Claim Construction Order, pp. 1-3, *Open Text S.A. v. Box, Inc. et al.*, No. C 13-cv-04910-JD (N.D. Cal.), Jan. 28, 2015, 4 pgs.
WS_FTP Pro "User's Guide," Software Version 5, Ipswitch, Inc. Lexington, MA, 1998, 104 pgs.
Braam, "The Coda Distributed File System," Linux Journal, Issue 50, Jun. 1, 1998, 17 pgs.
Satyanarayanan et al., "Coda File System User and System Administrators Manual," Aug. 1997, 82 pgs.
CODA version 5.3.10, Carnegie Mellon Univ., <_DEFS001094_codarpms_listings.txt>, 1997-1998, 109 pgs.
"DocuShare 2.2 Administration Guide," 2000, Xerox Corporation, Norwalk, CT, 62 pgs.
Readme.txt, DocuShare Client_Readme, Xerox Corporation, Norwalk, CT, 11 pgs.
"Docushare 2.2", 2010, Xerox Corporation, Norwalk, CT, <_DEFS013958_DocuShare_listing.txt>, 1 pg.
"TreeComp version 3.6, NKI/AvL", <_DEFS013979_TreeComp-3-6_listing.txt>, 1995-1999, 1 pg.
Magellan Explorer version 2.0c, Enriva Development DA, Tromso, Norway, <_DEFS013966_MagellanExplorer_listing.txt>, 1 pg.
License.txt, Software License Agreement, Magellan Explorer, Enriva Development DA, Tromso, Norway, 3 pgs.
Readme.txt, Magellan Explorer v2.0c, Enriva Development DA, Tromso, Norway, 7 pgs.
Whatsnew.txt, Magellan Explorer v.2.0c, Enriva Development DA, Tromso, Norway, 1.
Guy et al. "Rumor: Mobile Data Access Through Optimistic Peer-to-Peer Replication," Jun. 27, 2014, 12 pgs.
Reiher, "Rumor 1.0 User's Manual," 1998, 9 pgs.

(56) References Cited

OTHER PUBLICATIONS

"Using the Intra.doc! Management System with the ODMA Intra.doc! Client," Version 2.0, IntraNet Solutions, Inc., (Copyright 1996-1998), 48 pgs.
Intra.doc! Management System "Archiver Guide", IntraNet Solutions, Inc., Eden Prairie, MN, (Copyright 1998), 32 pgs.
Intra.doc! Management System, "Batch Loader," Version 3.0.3, IntraNet Solutions, Inc., Eden Prairie, MN, (Copyright 1996-1998), 28 pgs.
"Archiver Installation for NT," Intra.doc! Management System Archiver System, Version 3.5 (undated), 1 pg.
Intra.doc! Management System "Installation Guide for Windows NT," Version 3.5, IntraNet Solutions, Inc., Eden Prairie, MN, (Copyright 1996-1998), 51 pgs.
"ODMA Intra.doc! Client Installation," Version 2.0, IntraNet Solutions, Inc., Eden Prairie, MN, (Copyright 1996-1998), 8 pgs.
"Release Notes," Intra.doc! Management System, Version 3.5, Sep. 30, 1998, IntraNet Solutions, Inc., Eden Prairie, MN, 5 pgs.
Intra.doc! Management System "Installation Guide for Solaris," Version 3.5, IntraNet Solutions, Inc., Eden Prairie, MN, (Copyright 1996-1998), 35 pgs.
Intra.doc! Management System "System Properties," Version 3.5, IntraNet Solutions, Inc., Eden Prairie, MN, (Copyright 1996-1998), 14 pgs.
Intra.doc! Management System "System Administration Guide," Version 3.5, IntraNet Solutions, Inc., Eden Prairie, MN, (Copyright 1996-1998), , 124 pgs.
Intra.doc! Management System "Update Installation Guide for Windows NT," Version 3.5, IntraNet Solutions, Inc., Eden Prairie, MN, (Copyright 1996-1998), 20 pgs.
Intra.doc! Management System "User Guide," IntraNet Solutions, Inc., Eden Prairie, MN, (Copyright 1996-1998), 111 pgs.
Mason et al., "GNOME User's Guide," (Copyright 1999), Red Hat Software and David A. Wheeler, 110 pgs.
"User's Guide for Windows 32-Bit," Novell GroupWise, Version 5.5 (Copyright 1998) Novell, Inc., Provo, UT, 322 pgs.
Rogers et al., "Novell's GroupWise 5.5 User's Handbook," Copyright 1998 by Novell, Inc., Provo, UT, 277 pgs.
Rogers et al., Readme.txt, "Novell's GroupWise 5.5 Administrator's Guide," IDG Books Worldwide (Copyright 1999), 6 pgs.
"GroupWise 5.5 ReadMe," Jul. 15, 1998, Novell, Inc., Provo, UT, (Copyright 1998), 10 pgs.
"GroupWise 5.5 Monitor ReadMe," Jul. 15, 1998, Novell, Inc., Provo, UT, (Copyright 1998), 2 pgs.
"GroupWise Backup Utilities," GroupWise, Jun. 17, 1998, 7 pgs.
Readme.txt, GroupWise Enhancement Pack, Aug. 14, 1996, 5 pgs.
Gwtipus.txt, GroupWise 5.5, Apr. 29, 1998, 8 pgs.
Readme.txt, GroupWise 4.1 Async Gateway v2 NLM, Jul. 9, 1998, 16 pgs.
Smtpuser.txt, GroupWise, Mar. 19, 1996, 9 pgs.
Preamble.txt, GroupWise, Oct. 20, 1995, 1 pg.
"GroupWise 5.5 Internet Agent Readme," Jul. 15, 1998, Novell, Inc., Provo, UT, (Copyright 1998), 3 pgs.
Groupwise 5 Readme.txt, Nov. 5, 1996, Novell, Inc., Provo, UT, 20 pgs.
Groupwise 5.5 Readme.txt, Oct. 2, 1998, Novell, Inc., Provo, UT, 12 pgs.
Ogle, "Practical Experience with OS/2 Installable File Systems," Software—Practice and Experience, vol. 22(7), Jul. 1992, pp. 537-551.
Cute FTP 4.2.2, GlobalSCAPE, Inc., San Antonio, TX, <_DEFS013961_CuteFTP_listing.txt>, 1 pg.
Cute FTP Notes.txt, Dec. 11, 2000, GlobalSCAPE, Inc., San Antonio, TX, 9 pgs.
Cuteftptips.txt, GlobalSCAPE, Inc., San Antonio, TX, 2 pgs.
FTP Voyager 7.0.0.0 <_DEFS013964_ftpVoyager_listing.txt>, 1 pg.
License.txt, License Agreement, FTP Voyager, Gaylord, MI, 2 pgs.
PrintFAX.txt, FTP Voyager Print and Fax Order Form, FTP Voyager, Gaylord, MI, 1 pg.
Readme.txt, FTP Voyager Readme File, FTP Voyager Version 7.0, Rhino Software, Inc. (Copyright 1997-1999), 3 pgs.
Web Drive Version 2.2, River Front Software, <_DEFS013968_WebDrive_listing.txt>, 1 pg.
Absolute FTP Version 1.7, Van Dyke Technologies, Inc., <_DEFS013959_AbsoluteFTP_listing.txt>, 1 pg.
FtpNetDriver Version 2.21, KnoWare, Inc., <_DEFS013963_ftpNetDrive_listing.txt>, 1 pg.
War FTP Daemon v. 1.7, <_DEFS013954_WarFTPDaemon_listing.txt>, 1 pg.
Office Action for U.S. Appl. No. 15/017,189, dated Jun. 2, 2016, 9 pgs.
Office Action for U.S. Appl. No. 14/555,385, dated Jun. 23, 2016, 15 pgs.
Xianqiang et al., "SyncViews: Toward Consistent User Views in Cloud-based File Synchronization Services," IEEE 2011, pp. 89-96.
Bodker et al., "A Network Protocol for Remote Collaborative Authoring on the Web," Springer 1999, pp. 291-310.
Office Action for U.S. Appl. No. 14/555,385, dated Nov. 22, 2016, 15 pgs.
Office Action for U.S. Appl. No. 14/555,385, dated Apr. 19, 2017, 13 pgs.
Office Action for U.S. Appl. No. 14/620,414, dated Jun. 13, 2017, 14 pgs.
Office Action for U.S. Appl. No. 15/431,343, dated May 16, 2017, 10 pgs.
Housel et al., WebExpress: A client/intercept based system for optimizing Web browsing in a wireless environment, Mobile Networks and Applications 3, 1998, pp. 419-431, Baltzer Science Publishers BV.
Office Action for U.S. Appl. No. 14/620,414, dated Oct. 4, 2017, 18 pgs.
Office Action for U.S. Appl. No. 15/431,343, dated Nov. 29, 2017, 9 pgs.
Office Action for U.S. Appl. No. 14/620,414, dated Mar. 9, 2018, 18 pgs.
Office Action for U.S. Appl. No. 15/862,236, dated Aug. 23, 2018, 6 pgs.
Wang et al., On the Impact of Virtualization on Dropbox-like Cloud File Storage/Synchronization Services, IEEE 2012, pp. 1-9 (2012).
Office Action for U.S. Appl. No. 14/620,414, dated Oct. 11, 2018, 17 pgs.
Swierk et al., "The Roma Personal Metadata Service," 2002 Kluwer Academic Publishers, Mobile Networks and Applications 7, pp. 407-418.
Mecozzi, Donna and Minton, James, Design for a Transparent, Distributed File System, IEEE Symposium on Mass Systems, 1991, pp. 77-84.
Office Action for U.S. Appl. No. 16/356,902, dated Sep. 30, 2019, 9 pgs.
Muthitacharoen, Athicha et al., A Low-bandwidth Network File System, ACM 2001, pp. 174-187.
Office Action for U.S. Appl. No. 15/824,639, dated Apr. 8, 2020, 10 pgs.
Office Action for U.S. Appl. No. 16/417,810, dated Jun. 9, 2020, 14 pgs.
Office Action for U.S. Appl. No. 15/680,029, dated Aug. 4, 2020, 53 pgs.
Reiher, P., J. Popek, M. Gunter, J. Salomone, and D. Ratner, "Peer-to-Peer Reconciliation Based Replication for Mobile Computers", Proceedings of the European Conference on Object-Oriented Programming (ECOOP), Second Workshop on Mobility and Replication, Jul. 1996.
Wang, A.A., P.L. Reiher, and R. Bagrodia "A Simulation Evaluation of Optimistic Replicated Filing in Mobile Environments", Proceedings of the 18th IEEE International Conference on Performance, Computing, and Communications, Feb. 1999, pp. 43-51.
Ratner, D.H., P.L. Reiher, G.J. Popek, and R.G. Guy, "Peer Replication with Selective Control", Proceedings of the First Int'l Conf. on Mobile Data Access (MDA'99), LNCS 1748, Dec. 16-17, 1999, pp. 169-181.

(56) References Cited

OTHER PUBLICATIONS

Ekenstam, T., C. Matheny, P. Reiher, and G.J. Popek, "The Bengal Database Replication System", Distributed and Parallel Databases, vol. 9, May 2001, pp. 187-210.

Office Action for U.S. Appl. No. 15/824,639, dated Aug. 19, 2020, 11 pgs.

Office Action for U.S. Appl. No. 16/886,262, dated Oct. 5, 2020, 16 pgs.

Office Action for U.S. Appl. No. 15/997,286, dated Oct. 28, 2020, 15 pgs.

Steere, David C. et al., Efficient user-level file cache management on the Sun Vnode interface, Carnegie Mellon University, Research Showcase@CMU, 1990, 14 pgs., Trial Exhibit 626, Case No. 13CV4910-JD, In the United States District Court for the Northern District of California.

Declaration of Professor Ketan Mayer-Patel on Issues of Patent Validity in Support of Open Text S.A.'s Rebuttal in Support of its Motion for Preliminary Injunction Against Box, Inc., Trial Exhibit 640, Case No. 13CV4910-JD, In the United States District Court for the Northern District of California, 58 pgs.

Declaration of Srinivasan Jagannathan, Ph.D., M.B.A., In Support of Box, Inc.'s Opposition to Open Text's Motion for Preliminary Injunction, Trial Exhibit 705, Case No. 13CV4910-JD, In the United States District Court for the Northern District of California, 2049 pgs.

Declaration (Amended) of Srinivasan Jagannathan, Ph.D., M.B.A., In Support of Box, Inc.'s Opposition to Open Text's Motion for Preliminary Injunction, Trial Exhibit 706, Case No. 13CV4910-JD, In the United States District Court for the Northern District of California, 41 pgs.

Satyanarayanan, M., The Evolution of Coda, Carnegie Mellon University, ACM Transactions on Computer Systems, vol. 20, No. 2, May 2002, pp. 85-124, Trial Exhibit 1553, Case No. 13CV4910-JD, In the United States District Court for the Northern District of California, 41 pgs.

Satyanarayanan, Mahadev et al., Coda: A Highly Available File System for a Distributed Workstation Environment, IEEE Transactions on Computers, vol. 19, No. 4, Apr. 1990, pp. 447-459, Trial Exhibit 1554, Case No. 13CV4910-JD, In the United States District Court for the Northern District of California.

Coda File System—News, 5 pgs., retrieved from <<http://www.coda.cs.cmu.edu/news.html>>, Trial Exhibit 1561, Case No. 13CV4910-JD, In the United States District Court for the Northern District of California.

Braam, Peter, et al., The Coda Howto, v1.00, Mar. 3, 1999, 2 pgs., retrieved on Jul. 29, 2014 from <<https://web.archive.org/web/19990506011536/http://www.coda.cs.cmu.edu/doc/html/coda-howto.html/>>, Trial Exhibit 1562, Case No. 13CV4910-JD, In the United States District Court for the Northern District of California.

Office Action for U.S. Appl. No. 15/680,029, dated Mar. 9, 2021, 55 pgs.

Notice of Allowance for U.S. Appl. No. 16/886,262, dated Mar. 29, 2021, 7 pgs.

Notice of Allowance for U.S. Appl. No. 15/997,286, dated May 12, 2021, 6 pgs.

Office Action for U.S. Appl. No. 17/239,136, dated Dec. 22, 2022, 14 pgs.

Office Action for U.S. Appl. No. 17/698,358, dated Mar. 16, 2023, 23 pgs.

Office Action for U.S. Appl. No. 17/666,487, dated Mar. 16, 2023, 13 pgs.

Office Action for U.S. Appl. No. 17/239,136, dated Apr. 25, 2023, 11 pgs.

SYSTEM AND METHOD FOR CONTENT SYNCHRONIZATION

RELATED APPLICATIONS

This application is a continuation of, and claims a benefit of priority under 35 U.S.C. 120 of, U.S. patent application Ser. No. 15/824,639 filed Nov. 28, 2017, issued as U.S. Pat. No. 11,003,632, entitled "SYSTEM AND METHOD FOR CONTENT SYNCHRONIZATION," which claims the benefit of priority under 35 U.S.C. § 119(e) to U.S. Provisional Patent Application No. 62/426,987 filed Nov. 28, 2016, entitled "SYSTEM AND METHOD FOR FILE SYNCHRONIZATION," which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of content management. More specifically, the disclosure relates to a system and method to synchronize locally accessible content with a remote repository.

BACKGROUND

With the ever-increasing prevalence and proliferation of electronic content has come a commensurate need for the management of such content. Content management systems do just that, allowing for the management of such content by controlling the access, editing, updating, versioning, etc. of content. This type of content management is in no way trivial. In certain contexts, such as in an enterprise setting, there may be millions or even billions of documents that need to be managed, and users may desire to have access to these documents from a variety of distributed access points.

To facilitate content management in conjunction with such distributed access, content management systems may be organized around one or more content management servers that provide services associated with the management of such content. Content management servers like these may be deployed in the cloud or otherwise distributed.

Using such content management systems then, users may access managed content to, for example, edit such content. To access such content users typically use a user interface (UI) to interface with a content management server of the content management system. They reserve (or "check out") the content and download it locally on their computer (e.g., referred to as a client). The user can then edit the document, save the changed version to the content management server and un-reserve the content.

Some systems require the installation of specialized drivers to intercept calls between editing applications and the operating system. When a user selects the file that he/she wants to edit (e.g., by double clicking on the asset), the file can be retrieved from a data store and opened locally with whichever program is associated with that particular type of asset. The specialized drivers capture calls by the editing application and forward the calls to the remote server so that the various calls can be replayed at the remote server. These systems present shortcomings, however, because they require additional programming at the operating system "driver" level. Any defect or error in the program while the program is running can cause the local user's machine to cease functioning or "crash" until the operating system is reinitialized (e.g., until the client computer is rebooted), significantly reducing user productivity, and leading to loss of data. In addition to the problems mentioned above, these systems present issues when there are communication problems, etc. that may cause some of the calls to be missed by the server.

Other systems have architectures in which the entire synchronization process is highly tied to a particular operating system, making synchronization applications complex and difficult to distribute to multiple operating systems.

SUMMARY

Embodiments of the present invention provide systems and methods to synchronize locally accessible content with a remote repository. One embodiment of a system comprises a client computer and a remote content management system. The client computer comprises a synchronization manager that maintains a remote virtual model that models a synchronization state of a remote peer data resource at the content management system and a local virtual model that models a synchronization state of a local peer data resource in the local file system. The synchronization manager determines that the remote peer data resource and local peer data resource are out of sync based on a comparison of the remote virtual model and the local virtual model synchronizes changes from the local cache to the content management system to update the remote peer data resource or changes from the content management system to update the local peer data resource.

One embodiment of a system comprises a processor and a memory having stored thereon instructions executable by the processor to send a request to a content management system for a data resource stored at the content management system, receive the data resource in response to the request and store the received data resource as a local peer data resource in a local cache located in a local file system. The instructions are further executable to maintain a remote virtual model that models a synchronization state of a remote peer data resource at the content management system, maintain a local virtual model that models a synchronization state of the local peer data resource in the local file system, determine that the remote peer data resource and local peer data resource are out of sync based on a comparison of the remote virtual model and the local virtual model; and based on the results of the comparison, synchronize changes to the local peer data resource to the content management system to update the remote peer data resource or synchronize changes to the remote peer data resource to the local cache.

One embodiment of a method of synchronizing content comprises sending a request from a client computer to a content management system for a data resource managed by the content management system, receiving the data resource in response to the request, storing the received data resource as a local peer data resource in a local cache located in a local file system of the client computer, maintaining a remote virtual model that models a synchronization state of a remote peer data resource at the content management system and maintaining a local virtual model that models a synchronization state of the local peer data resource in the local file system. The method can further comprise determining that the remote peer data resource and local peer data resource are out of sync based on a comparison of the remote virtual model and the local virtual model and based on the results of the comparison, synchronizing changes made to the local peer data resource to the content management system to update the remote peer data resource or synchronizing changes made to the remote peer data resource to the local cache.

Another embodiment can comprise a processor and a memory having stored thereon instructions executable by the processor to provide a synchronization manager configured to request files from a content management system and store the files in local cache associated with the content management system, maintain a local virtual model modelling the files in the local cache and maintain a remote virtual model modelling the files on the content management server. The synchronization manager comprises remote link services configured to update the remote virtual model based on changes at the content management system and send copies of local peer files to the content management system based on changes to the remote virtual model to synchronize the content management system with the local cache. The synchronization manager further comprises local link services configured to update the local virtual model based on changes in the local cache and update the local cache based on changes to the local virtual model to synchronize the local cache with the content management system. The synchronization manager can further include a synchronization engine configured to compare the local virtual model and the remote virtual model, update the local virtual model based on the remote virtual model to indicate that the local cache is out of sync with the content management system; and update the remote virtual model based on the local virtual model to indicate the content management system is out of sync with the local cache.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DISCLOSURE

Figure 1:
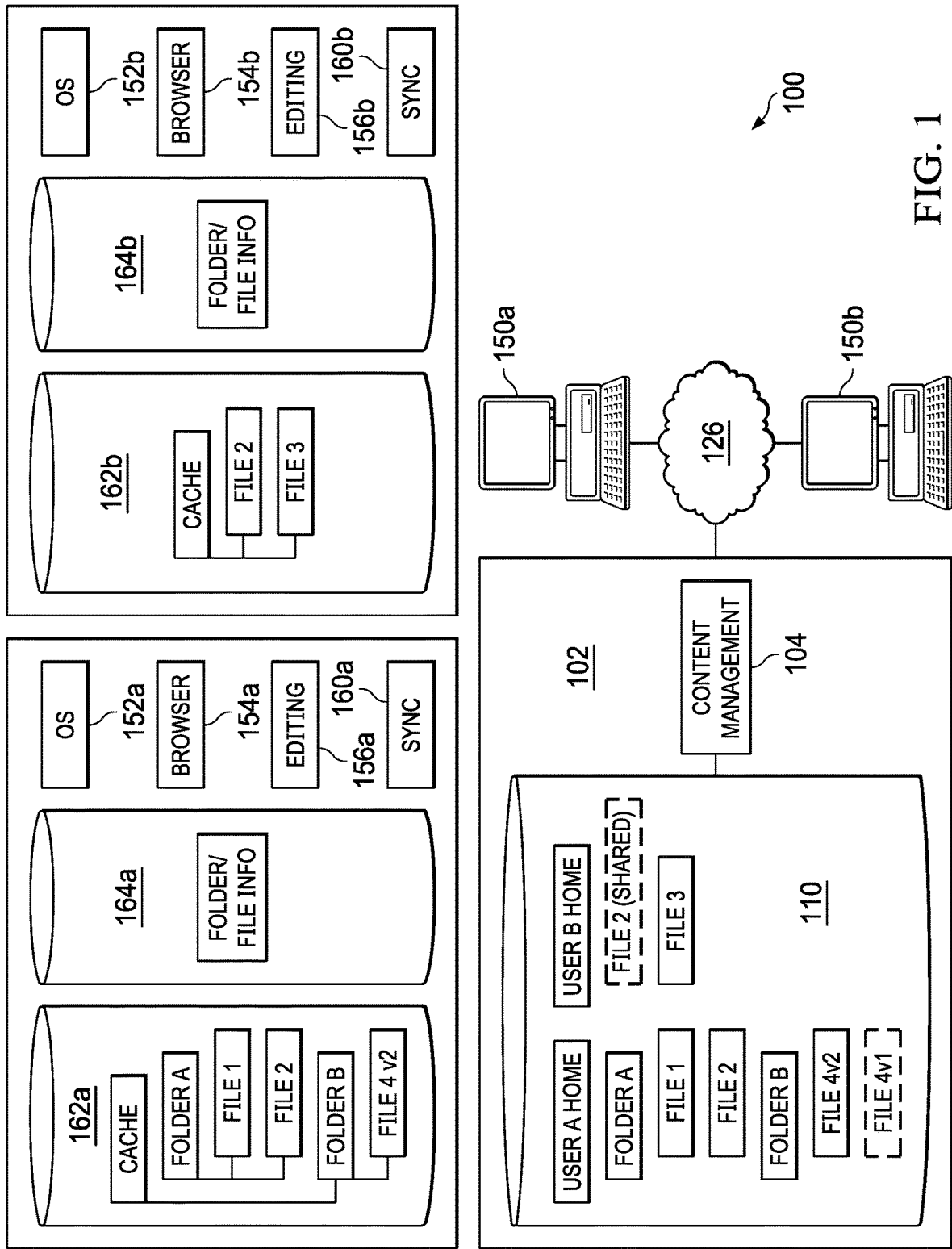
FIG. 1 is a block diagram depicting one embodiment of an environment in which synchronization may be implemented.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments of the present invention provide systems and methods to synchronize locally accessible content with a remote repository. In particular, certain embodiments include a content management system for managing data content stored on a remote content management server and a client computing device that can synchronize content between the content management server and the client device. The client computing device includes a synchronization manager that manages synchronization between the client computing device and the content management server. The synchronization manager requests data resources from the content management server, stores the data resources in the local cache, monitors the local cache for changes and synchronizes changes in the local cache back to the server. The synchronization manager may also monitor the server for changes and synchronize changes from the server down to the local cache. According to one embodiment, the synchronization manager on the client computing device maintains data models that model the peer local and remote data resources and uses the data models to determine when data resources should be synchronized.

Among other advantages and benefits, the system described below improves the user experiences involved in editing, or otherwise accessing files. Specifically, the user may interact with local versions of managed content stored locally on that user's local storage and file system (e.g., on that user's C: drive) despite the fact that the managed content may be under the control and management of a remote content management system.

The system enables the "seamless" use of tools of choice for editing files by synchronizing changes to files or folders in the local cache regardless of the application that made the changes. The system ensures that the user can always save files, and works with most existing applications installed on a client device. At the same time, the system preserves key capabilities of the content management server system. Generally, the system uses a seamless synchronization technique for uploading and downloading files. As described in detail below, client applications can edit files using standard file system paths to a local hard disk or roaming profile. Those file system paths directly access a local file cache, so that opening and saving of previously downloaded files can be fast and reliable. The local file system is monitored so that the system can determine when a file or folder content or metadata has been modified and should be uploaded to the content management server. The modified content and metadata can be uploaded in the background. Moreover, the latest version can be automatically downloaded from the content management server, if necessary. In one embodiment, an application in the client device system tray on the task bar provides an unobtrusive user interface (UI) for communicating with the user as necessary, such as to report on the status of pending operations.

Speed of access is another advantage provided by embodiments as disclosed herein. In some prior systems, users opened files for editing directly from a content management server and every time there was a save request, a synchronous save of the file to the content management server was required. In embodiments as presented herein, an architecture is provided where the user's client device maintains a local cache and such editing of files can be provided separately from a content management server for an enterprise containing the same files. Synchronization may be performed between the user's client device and the content management server asynchronously from a user saving the file.

In certain embodiments, the files in the local cache of the client device are synced to the content management server in the background while being maintained in the local cache. The system can employ a watcher to watch the cache to determine if the cache has changed and the system can determine if file or folder content or metadata should be synchronized with the server. By divorcing the editing and the synchronization processes through the use of the local cache, a seamless and speedy way to allow a user to access files that are synchronized with a server is provided. By providing a seamless way for a user to be able to access files for editing using a local cache instead of having the user edit them on a content management server located in a cloud and connected via an Internet connection, a user is not always required to have Internet connectivity and editing of files can be accomplished in speedier manner. Moreover, convenient functionality of applications may be used, such as the most recently used (MRU) files list of Microsoft® Office applications (e.g., Word, Excel, or other applications).

The content management server may provide functionality, such as versioning, audit trails or other functionality not available in the local editing application. By synchronizing changes to the content management server versions can be preserved, audit trails created, etc. using the server's content management functionality. Furthermore, the content management server may provide collaboration tools to allow sharing of and collaboration with respect to files.

FIG. 1 is a block diagram of one embodiment of a content management system 100 for managing and accessing content. System 100 includes a content management server 102 executing a content management module 104 to manage data resources (files, folders or other discrete sets of data) stored in data store 110, which may include one or more file systems, databases or other data stores to store managed items. For ease of discussion, embodiments herein will be described primarily in terms of synchronizing file and folder content and metadata, but other data resources may also be synchronized. Content management module 104 can provide an Application Program Interface (API) or other interface to allow applications on client devices 150 to access objects. According to one embodiment, content management server 102 may provide a cloud based file storage system that provides file synchronization across multiple devices, file sharing and other features.

Content management server 102 may manage files and folders (or other data resources) as a set of objects. Data store 110 may thus provide an object-based data store in which files and folders (or other data resources) are managed as a set of objects. The managed folders at content management server 102 may be "virtual" folders that do not correspond to actual file directory paths in a file system of data store 110. The files managed by content management system 102 may be files stored in a file system of data store 110, files stored in a database (as blobs), sets of logically related data managed as file objects.

In one embodiment, each item (file, folder or other item) managed by content manager server 102 is associated with content management metadata. The content management metadata may include an object identifier associated with each item managed by the content management server 102. In particular, in order to manage content in the content management system (e.g., as stored in data store 110) the content management module 104 may utilize one or more object identifiers, such as GUIDs to identify objects. In one embodiment, the content management module 104 may use a content management node identifier (node id) that can serve to identify a file or folder regardless of its location in a file system or version. In other words, there may be multiple stored versions of the same file and each of those versions would have the same content management node id to associate the different versions. Each of the versions would be managed as a distinct piece of content and to manage the different versions of the same file, there may be a different version number associated with each version. For example, as illustrated in the example of FIG. 1, File 4 v1 may be a first version of a file and File 4 v2 may be a second version of the file. Each of these versions may be stored separately but is associated with the same content management node id. Additionally, other metadata may be associated with each object such as the size of a file, a timestamp indicating a last save time, ids of related objects (for example, parent object ids or children object ids to relate folders and files in a hierarchy).

Accordingly, content management metadata may include metadata associated with a managed object. Content management metadata may contain enough information that the content management module 104 will be able to, for example, locate the managed object in data store 110 even in cases where the managed object has changed location on the file system or determine if an object is a latest or same version of that object, or perform other operations with respect to the managed objects.

Content management module 104 may provide a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. The content navigation structure may or may not reflect an actual arrangement of files and folders in a file system of data store 110.

Content management module 104 provides user interface functionality for accessing items managed by content management server 102. The interface functionality may be provided through any suitable mechanism including, but not limited to, a web application server exposing a REST API or through another mechanism. Content management module 104 can process requests submitted via the interface by client applications running on devise 150 (e.g., client devices 150*a*, 150*b*) to enable a user to perform various operations via a client application, such as uploading items, downloading items, reserving items, editing content, searching, adding items to containers, removing items from containers, adding containers, editing containers, removing containers and other operations. A user's ability to access particular items and perform particular operations may be limited based on permissions.

Client devices 150 (client devices 150*a*, 150*b*) may access content from content management server 102 over a network 126, which may be a LAN, WAN, Internet, or other network. Client devices 150 can be personal computers, workstations, smart phone, laptop computer, or any other computer device operable to access data from content management server 102. While FIG. 1 shows only two client devices 150 and one content management server 102, it should be understood that a system may include any number of clients and multiple content management servers.

Each client device 150 may include a variety of programs including, but not limited to, an operating system 152 (e.g., operating systems 152*a*, 152*b*), web browsers (e.g., web browsers 154*a*, 154*b*) editing applications 156 (e.g., applications 156*a*, 156*b*), such as document editors, spreadsheet programs, presentation editors, etc., and a synchronization manager 160 (e.g., synchronization managers 160*a*, 160*b*). In some embodiments, the editing application 156 may be web app editing application provided via browser or a mobile app. The client devices 150 may have different operating systems, web browsers, editing applications, etc. installed. The synchronization manager 160 on each client device 150 can be configured to execute in the corresponding operating system 152 to maintain a local cache 162 (e.g., local cache 162*a*, 162*b*) and synchronization management database 164 (e.g., synchronization management database 164*a*, 164*b*).

The local synchronization manager 160 at a client device 150 maintains a local cache 162 of files that are synchronized with server 102. Corresponding local and remote files and folders may be referred to as peer local and remote files or peer local and remote folders. For example, File 1 stored on client device 150*a* and File 1 stored in data store 110 may be referred to as peer local and remote files. That is, File 1 stored in data store 110 is the remote peer of File 1 stored on client device 150*a* and File 1 stored in the local cache of client device 150*a* is the local peer of File 1 stored at data store 110 and so on. It can be noted that a local peer file and remote peer file may not be identical as the peer pair may be out of sync at any given time. Similarly, a local peer folder and remote peer folder may not be identical as the peer pair may be out of sync at any given time and items in a remote peer folder can be synchronized to local peer folder as discussed below.

In one embodiment, local cache 162 comprises a location in a file system managed by the corresponding client device. The local cache may have a file system structure that reflects associations between objects managed by server 102 (files and folders). More particularly, local cache 162 may be arranged in a hierarchy that reflects at least a portion of the content navigation structure provided by server 102.

A synchronization manager 160 maintains a synchronization management database 164 where management data associated with the management of content may be stored. Synchronization management database 164 includes data for modelling the corresponding local cache 162 and remote server objects to facilitate synchronization. In some embodiments, the synchronization management database 164 can be stored as one or more files in the local file system.

Synchronization manager 160 may be installed on the client device 150 at the request of a user or, for example, when the user accesses content management module 104 using another interface. For example, in certain embodiments, content management module 104 may provide an interface that may be accessed using a web browser 154. When a user at a client device 150 accesses this browser-based interface a module (e.g., including JavaScript or the like) may be executed or otherwise loaded on the client device (e.g., by the browser 154). This module may determine if the synchronization manager 160 is deployed on the client device 150. If the local synchronization manager 160 is not already installed on the client device 150 the local synchronization manager 160 may be downloaded from content management server 102 and installed on client device 150.

Additionally, synchronization manager 160 can determine if a local cache 162 or synchronization management database 164 exist on that client device 150. If not, the synchronization manager 160 may create the local cache 162. Local cache 162 may be a location (e.g., one or more folders) on the local file system of client device 150 provided by the local operating system 152. In some embodiments the location of local cache 162 may be user specified, whereas in other embodiments the location of local cache 162 may be selected by synchronization manager 160. Synchronization manager 160 may also create a synchronization management database 164 where management data associated with the management of content (e.g., content stored in local cache 162) may be stored.

As will be discussed in more detail, synchronization manager 160 includes one or more modules that communicate with one or more interfaces provided by content management module 104 on content management server 102 to allow the user at the client device 150 to seamlessly access the content (e.g., File 1, File 2, etc.) in data store 110 managed by the content management server 102. In particular, a user may attempt to access managed files in a variety of ways, including through the previously discussed web based interface or directly through an editing application, etc., though access to content may be restricted based on user credentials (e.g., username and password) and sharing permissions to provide both private storage (single user) and shared access to files. Synchronization manager 160 can store login and authentication information such that synchronization manager 160 can connect to server 102 without requiring the user to re-enter his/her login and/or authentication information. The login and authentication information can include username and password, authentication tokens provided by an authentication authority to re-establish sessions or other credentials.

Synchronization manager 160 may download all the files to which a user has access or may download selected files. In some embodiments, synchronization manager 160 may provide a user interface that displays the files available to the user. Synchronization manager 160 may request particular files from the content management server 102 in response to user input (e.g., user selection of files). Synchronization manager 160 may also be user configurable to only synchronize some subset of files available to the user. For example, if a user has 100 files stored on content management server 102, the user may select to only automatically synchronize particular files or folders to reduce network usage.

In some cases, when a file is received from content management server 102, synchronization manager 160 may further prompt the operating system 152 to open the cached file using the appropriate editing application 156. Thus, for example, if .doc files are associated with a particular word processing application—an example of an editing application 156a—at client device 150a and File 1 is a .doc file, operating system 152a can open File 1 in the word processing application associated with the .doc file extension.

In any event, synchronization manager 160 can determine if a server stored file is in the local cache 162. If not, the file may be requested from content management module 104 on content management server 102. In certain embodiments, even if the requested file exists in the local cache 162, identifying information for the file may be sent to content management module 104 to determine if the version of the content stored in the local cache 162 is the most recent version. The content management module 104 may reply with metadata for the server stored copy of the file (e.g., object id, version number, last modified date). If the cached copy of the file is not the most recent version, synchronization manager 160 can download the latest version from server 102 and store the latest version in the local cache 162.

In the embodiment of FIG. 1, content management server 102 maintains a set of folder objects and file objects for "User A" and "User B." The "Home" object represents a user's entry point into content management module 104. The entry point for a user may be a container corresponding to the highest level in a navigation hierarchy to which the user has access or some other default location in the hierarchy. From there, the user may navigate to decedent containers (e.g., folders) and files. Using synchronization program 160, the user may select to synchronize the folders and files available to that user or some subset (e.g., by selecting a top level folder to synchronize).

In the example of FIG. 1, synchronization manager 160a is configured to synchronize files and folders associated with User A and synchronization program 160b is configured to synchronize files and folder associated with User B. Thus, as illustrated, local cache 162a comprises local peers of Folder A, Folder B, File 1, File 2 and File 4 and local cache 162 contains local peers of File 2 and File 3, where File 2 is a shared file. The files and folders are organized under a top level folder created by the respective synchronization manager 160a, 160b.

Synchronization manager 160 maintains synchronization management information for accessed items. In the example of FIG. 1, synchronization manager 160a maintains synchronization management information for Folder A, Folder B, File 1, File 2 and File 4 in synchronization management database 164a of client device 150a, while synchronization manager 160b maintains synchronization management information for File 2 and File 3 in synchronization management database 164b of client device 150b.

A user may access and edit a local copy of content through an editing application 156, change the structure of the cache by adding/removing folders or take other actions that change the cache. For example, if File 1 is a word processing document, a user may edit File 1 using a word processing editing application 156a in the same manner he or she would use the word processing application to edit other word processing documents. As the user makes changes to the file, such changes can be saved to the local copy of the file (the local peer file) stored in local cache 162. In other words, the changes by the editing application are stored to the local file system where the local cache 162 storing the files resides. Changes to items in the local cache (e.g., creation, deletion, editing of files and folders) may be detected by synchronization manager 160 and synchronized to server 102.

To determine when changes are made to local cache 162, synchronization manager 160 may monitor local cache 162. According to one embodiment, an application may register with an operating system for automatic file or directory change notifications or other event notifications. For example, various versions of the WINDOWS Operating System by MICROSOFT CORP of Redmond, Wash., USA, support registering for file and directory change notifications and other event notifications and, as would be appreciated by those of skill in the art, other operating systems also support registering for event notifications. Therefore, in some cases, synchronization manager 160 may take advantage of this feature and register for automatic event notifications for the directories (folders) of the local cache. For example, synchronization manager 160 can register for event notifications on a directory after creating the directory. If the synchronization manager 160 receives an automatic event notification for a directory, synchronization manager 160 can request metadata from the operating system 152 for the folders and files in the local cache 162 and determine which folders or files have changed. The determination may be based, for example, on modified dates for a folder or file, changes in folder or file size, changes to a data hash of the file or folder or other changes.

Synchronization manager 160 may also register for automatic event notifications with respect to individual files in local cache 162. For example, synchronization manager 160 can be configured to register for notifications with respect to a file after saving the file to the local cache. If the synchronization manager 160 receives an automatic event notification for a particular file (such as a change notification), the synchronization manager 160 may determine that the file has changed based on the notification itself. In another embodiment, synchronization manager may determine that the file has changed in response to the automatic notification by requesting metadata for the file from operating system 152 and comparing the metadata to previous metadata for the file (e.g., to determine that the file has changed based, for example, on modified dates for the file, changes in file size, or other changes in file system metadata). The synchronization manager 160 may confirm that the content of a file has changed by comparing a current hash of a file to a previous hash of the file.

In another embodiment, synchronization manager 160 may poll operating system 152 for file system metadata and make a determination that a folder or file has changed based on file system metadata. Polling can be done, for example, by reading a time stamp associated with a cached file to determine the last time at which the cached file was modified. If the time stamp from the most recent polling of a cached file does not match the time stamp from a previous polling of a cached file then synchronization manager 160 can determine that the cached file has been modified and can attempt to synchronize the cached file with content management server 102. As another example, synchronization manager 160 may poll file system metadata of a cached file to determine that a lock has been released, indicating that another application has released the file, and based on the lock being released, determine if the file has changed. Again, the determination that the file has changed may further include comparing last modified dates, hashes or other information.

As can be understood by those of ordinary skill in the art, the frequency at which synchronization manager polls cached files can be adjusted to optimize the resources of the client device 150. A more frequent polling will require more resources but will result in a lower latency between the time when a cached file is modified and when the synchronization manager 160 determines that a cached file has been modified. Conversely, a longer time interval between each polling of a cached file will reduce the required resources of the client device 150 but can lead to a longer latency period. Thus, the polling interval can be set to optimize system resources with respect to latency period.

In some embodiments, synchronization manager 160 may use a combination of automatic event notifications and polling to determine that a file has changed. Regardless of whether synchronization manager 160 is notified of events through automatic notifications, polling or other mechanism, when synchronization manager 160 determines that an event that requires synchronization has occurred in local cache 162 (e.g., a file or directory has changed), synchronization manager 160 may formulate and send one or more requests to content management module 104 to update corresponding items at content management server 102. Synchronization manager 160 may synchronize changes to server 102 by sending server 102 a copy of the entire file, copies of the changed blocks, a range of blocks or metadata that contain a change.

Content management module 104 may receive the request and perform the requested update. In some embodiments, content management module 104 may update a remote peer copy of file by creating a new version of the file each time an update to the file is received. For example, if a user at client device 150a edits File 1 in local cache 162a and synchronization manager 160a uploads the changes to content management server 102, content management module 104 can update the remote peer File 1 by creating a new version of File 1 (e.g., version 1.1) while also retaining the previous version. In other embodiments, content management module 104 may update the remote peer File 1 by overwriting the previous version of File 1.

Synchronization may be bi-directional. Content management module 104 may send event notifications to synchronization manager 160 (automatically or in response to requests) to alert synchronization manager 160 of changes to a peer remote folder or file. For example, if a user at client device 150b edits File 2 and synchronization manager 160b synchronizes File 2 to content management server 102, then local peer File 2 in synchronization cache 162a of client device 150a may be out of date because the remote peer File 2 has been edited/replaced with a new version. Content management module 104 can notify synchronization manager 160a of a change to remote peer File 2 and synchronization manager 160a can download the updated File 2 (or changes to File 2). The local peer File 2 in cache 162a can be updated by replacing File 2 with the most recently downloaded version, modifying File 2 or otherwise updating the local peer File 2 to synchronize the locally cached File 2 with the server.

For convenience, content management module 104 may provide a locking mechanism so that a user can lock a file. Synchronization managers 160 that are managing a peer local copy of a file that is locked may be sent a notification so that the respective user can be notified that another user is editing the file. Such a scheme can help avoid conflicts that occur when multiple users update local peer copies of a file simultaneously. However, synchronization manager 160 can include conflict detection and resolution mechanisms.

In accordance with one aspect of the present disclosure, content management server 102 may provide a hosted website component including data storage in which a plurality of data resources (files, folders and other resources) are collectively associated with a website. Content management module 104 may make the plurality of data resources available as a website accessible over a global network. Synchronization manager 160 can synchronize resources (e.g., files, folders or other resources) with server 102 such that changes to a cached file result in a change to the website. In some embodiments, a change to the cache structure (e.g., adding/removing folders, renaming folders) may also result in a change to the website.

In some implementations, the "local cache" may be stored in a directory that is also synchronized to another system (for example another cloud-based file store system). The synchronization manager may, therefore, have the effect of synchronizing a file between the client and multiple servers and potentially multiple cloud-based services.

As described above, the content management server 102 may be embodied on one or more server machines operating in a network environment. A suitable server machine may comprise a data processing system having one or more central processing units (CPU) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs) and smart cards. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver(s), or other communication means coupled to a network, such as a local area network (LAN), wide area network (WAN), or the Internet. Other communication implementations are also possible.

A client device 150 may comprise a data processing system having one or more central processing units (CPU) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs) and smart cards. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver(s), or other communication means coupled to a network, such as a local area network (LAN), wide area network (WAN), or the Internet. Other communication implementations are also possible.

Figure 2:
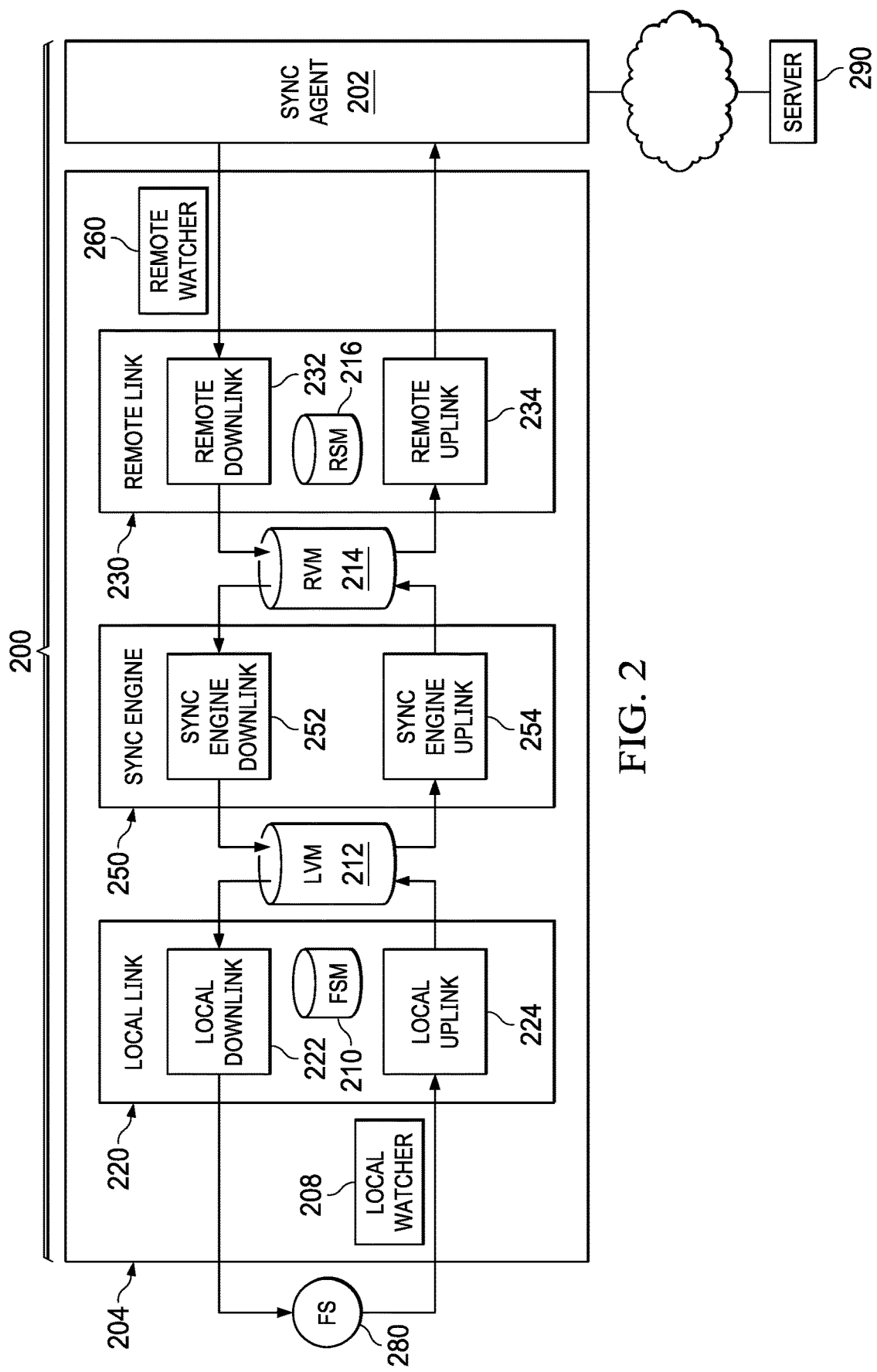
FIG. 2 is a diagrammatic representation of one embodiment of a synchronization manager.

FIG. 2 is a diagrammatic representation of one embodiment of a synchronization manager 200, which is an example of a synchronization manager 160. Synchronization manager 200 can be configured to synchronize changes between a file system 280 (e.g., such as a file system in which a local cache 162 resides) and a remote server 290 running a content management application (e.g., such as content management module 104). In accordance with one embodiment, synchronization manager 200 may be installed on a client computing device and may reside entirely in user space (rather than requiring installation of kernel components or customized drivers). Furthermore, synchronization manager 200, in one embodiment, may be a non-intercepting synchronization manager that does not intercept calls between editing applications and the file system, but instead, monitors the file system for changes. In other embodiments, synchronization manager 200 may include drivers that intercept calls between editing applications and the file system.

In the embodiment illustrated, synchronization manager 200 includes a sync agent 202 and a synchronization manager sync engine module 204. In one implementation, the sync agent 202 includes a system tray application that runs in the background and appears in the client device system tray on the taskbar to provide an unobtrusive user interface (UI) for communicating with the user as necessary, such as to report on the status of pending operations. The sync agent 202 can be responsible for communication with server 290. To this end, sync agent 202 can store information to log into server 290 under a user account and retrieve information related to objects (e.g., folders and files) associated with that account.

Synchronization manager sync engine module 204, which may also run in the background, maintains one or more data models that model local peer files and folders in the file system 280 and the remote peer folders and files at server 290. In the embodiment illustrated, these models include a local virtual model ("LVM") 212 that models the synchronization state of objects in the local cache (e.g., folders or files in file system 280) and a remote virtual model ("RVM") 214 that models the synchronization state of corresponding objects (folder or file objects) on remote server 290. The synchronization state modelled in LVM 212 may reflect the current state of file system 280 (most recent state known to synchronization manager sync engine module 204) for files or folders that are up to date or a stale state generally reflecting that files, folders and metadata should be updated in file system 280 to synchronize file system 280 with server 290. The synchronization state modelled in RVM 214 may reflect the current state of server 290 (most recent state known to synchronization manager sync engine module 204) for files and folders that are up to date or a stale state generally reflecting that files, folders or metadata should be updated at server 290 to synchronize server 290 with the local cache. Information for data models may be maintained in a database (e.g., synchronization management database 164 of FIG. 1) and the data models may be maintained in transient memory during operation. Example data models are discussed more fully below.

Synchronization manager sync engine module 204 includes local link services 220 that keep LVM 212 and file system 280 in sync. Local link services 220 include a local downlink module 222 and a local uplink module 224. Local uplink module 224 updates LVM 212 to reflect the current state of file system 280. Local downlink module 222, on the other hand, performs operations on file system 280 to update file system 280 when the synchronization state modelled by LVM 212 for a file or folder is stale.

Synchronization manager sync engine module 204 further includes remote link services 230 that keep RVM 214 and remote server 290 in sync. Remote link services include a remote downlink module 232 and a remote uplink module 234. Remote downlink module 232 updates RVM 214 to reflect the current state of remote server 290 and remote uplink module 234 communicates with remote server 290 to update remote server 290 when the synchronization state modelled by RVM 214 for a file or folder is stale.

Sync engine 250 includes a sync engine downlink module 252 and a sync engine uplink module. Sync engine downlink module 252 acts as a peer router that, in response to a change in RVM 214 that reflects a change in a folder or file at server 290, determines the peer local folder or file in the local cache, and changes the synchronization state of the LVM 212 to stale. To update LVM 212, sync engine downlink module 252 compares RVM 214 to LVM 212 to determine if changes made at remote server 290 should be synchronized down to the peer local file or folder in file system 280 and updates that state of LVM 212 accordingly. Sync engine uplink module 254, on the other hand, acts as a peer router that, in response to a change to a folder or file in the local cache, determines the peer remote folder or file on server 290 and updates RVM 214 to flag the synchronization state for that file or folder as stale. To update RVM 214, sync engine uplink module 254 compares RVM 214 to LVM 212 to determine if changes made in the local cache should be synchronized to the peer remote folder or file on server 290 and updates RVM 214 accordingly.

Sync engine module 204 may include a remote watcher 260 that detects events at remote server 290, such as events to create, delete or update objects. According to one embodiment, when an action is taken on a file or folder at remote server 290 (e.g., the file or the file metadata is edited by another user, a file or folder is added to the synchronized folder, a synchronized file or folder is deleted), remote server 290 may send an event notification to sync agent 202 and sync agent 202 can pass the notification to remote watcher 260. Thus, remote watcher 260 can be configured to listen for events from sync agent 202 (or otherwise listen for or receive notifications from server 290 of a change to a file or folder, including a change on the file or folder metadata). In another embodiment of monitoring remote server 290, remote watcher 260 may poll sync agent 202 for event notifications and sync agent 202 can, in turn, poll remote server 290 for event notifications.

If remote watcher 260 detects an event that may require synchronization, remote watcher can trigger remote downlink module 232. For a delete event, remote downlink module 232 can delete the entry for the object from the RVM 214. For a create event, remote downlink module 232 can collect information for a file or folder from remote server 290 according to RSM 216 and create an entry for the file or folder in RVM 214. For an update event, remote downlink module 232 can compare information from server 290 for a file or folder to RVM 214 and if there is a discrepancy, remote downlink module 232 can resolve the differences by updating RVM 214 for the file or folder such that RVM 214 reflects the current state of the remote server for the file or folder. More particularly, in one embodiment, remote downlink module 232 collects information for a file or folder from remote server 290 according to RSM 216 and compares the collected information to RVM 214 to identify changes at the remote server 290. Remote downlink module 232 can update the RVM 214 based on the differences. Remote downlink module 232 can notify sync engine downlink module 252 of the change to RVM 214 for the file or folder.

In response to a notification by remote downlink module 232 of a change to RVM 214, sync engine downlink module 252 can access LVM 212 for data associated with the local peer file or folder and can compare LVM 212 to RVM 214 for the file or folder. Sync engine may implement rules to identify conflicts. If no conflict is identified, but there is discrepancy between LVM 212 and RVM 214 for the file or folder, sync engine downlink module 252 can update LVM 212 for the file or folder and notify local downlink module 222 of the changes to LVM 212. For a non-delete event, if there is no corresponding entry for a file or folder in LVM 212, sync engine downlink module 252 can create a partial entry in LVM 212. If there is an existing entry for the file or folder in LVM 212, sync engine downlink module 212 can update the entry for the file or folder in LVM 212 to reflect the stale state. For example, updating the entry for the file or folder in LVM 212 may include marking attributes of the file or folder stale in LVM 212 based on the RVM 214 or marking file or folder for deletion in LVM 212. At this point LVM 212 reflects a synchronization state for the local cache indicating that the local cache is out of sync with server 290 for the file or folder.

Local downlink module 222 can process information in LVM 212 and compare the information in LVM 212 to information from file system 280 for a file or folder. For example, if the last modified date for a file in FSM 210 is greater than that in LVM 212, this may indicate a version conflict. If a conflict is identified (e.g., a version conflict or other conflict), a conflict handler can be called. If there is no conflict but LVM 212 is stale for the file or folder, local downlink module 222 can synchronize the local cache with remote server 290. This may include, for example, creating, deleting or modifying files or folders, writing a copy of a remotely stored file to file system 280 or otherwise modifying file system 280. The metadata from RVM 214 is passed to local downlink module 222 and local downlink module can update the metadata for the local peer in file system 280 as needed. If content data has changed, local downlink module 222 can signal sync agent 202 to stream the file content to the local cache. In one embodiment, if sync agent 202 is going to stream a new file to local cache, local downlink module 222 can write a dummy file with the same filename in the local cache as a placeholder and the sync agent 202 can stream the content to that file. Local downlink module 222 can then update the LVM 212 to include the current state of the file on the file system and update the status in LVM to indicate that the local peer copy of the file is synchronized with the remote peer copy. For a delete event, local downlink module 222 can remove the entry for the file or folder from the LVM 212.

Synchronization can be bi-directional. According to one embodiment, synchronization manager sync engine module 204 includes a local watcher 208 that can be configured to monitor file system 280 for events (e.g., changes to files or folders in the local cache). Local watcher 208 is configured to monitor file system 280 by registering with the operating system for automatic event notifications for folders corresponding to the local cache, registering for automatic event notifications for files in the local cache, by polling the file system metadata of folders and files in the local cache or otherwise monitoring the local cache. Local watcher 208 may detect various events through monitoring.

Local watcher 208 may queue events and filter events. According to one embodiment, rules may be specified such that certain events do not cause synchronization to server 290. For example, Microsoft® Windows® operating systems often create temporary (*.tmp) files for management purposes in the same directory as a file opened in an editing application, but it may not be desirable to synchronize these temporary files to server 290. Thus, filter rules can be applied by local watcher 208 to filter out certain events, such as events on temporary files. In addition, an operating system may provide notifications for any number of events with respect to a file. In some cases, the operating system events may be queued by local watcher 208 and local watcher 208 may apply rules to determine that an event has occurred based on a combination of event notifications provided by the file system. As another example, on APPLE MAC OS X operating system, modifying the contents of a document generally results in the original document on the file system being deleted and the new contents written as a new file with the same file path; thus a filter rule can be applied that ignores the file deletion when followed immediately by a file creation with the same path so that when synchronized to the remote system the new content can be added as a new version instead of deleting and re-creating the remote copy.

If an event is not filtered out, local watcher 208 triggers local uplink module 224 to read file system metadata, files or other information from file system 280. In response to an event notification from local watcher 208, local uplink module 224 can locate information for that file or folder in LVM 212 (if present) and, if there has been a change to the file or folder, local uplink module 224 can resolve differences between information from file system 280 and LVM 212 by updating LVM 212 for the file or folder. For a delete event notification, the entry for the file can be deleted in the LVM 212. For a notification of a file or folder for which there is no entry in LVM 212 (indicating a new file), the local uplink module can update the LVM 212 for the file as appropriate (including assigning an internal id for a new file). In some cases, local uplink module 224 can use data read from or derived from information in file system 280 to construct a file system model (FSM) 210 of the file or folder and can compare the FSM 210 to LVM 212 to identify changes in the file system. Local uplink module 224 can notify synchronization engine 250 of changes to LVM 212 for a folder or file.

In response to a notification by local uplink module 224 of a change to LVM 212, sync engine uplink module 254 can access RVM 214 for data associated with the remote peer file or folder and can compare LVM 212 to RVM 214 for the file or folder. Sync engine may implement rules to identify conflicts. If a conflict is identified, a conflict handler can be called to address the conflict. If no conflicts are identified, but there is a discrepancy between LVM 212 and RVM 214 for the file or folder, sync engine uplink module 254 can update RVM 214 for the file or folder and notify remote uplink module 234 of the changes to RVM 214. For a non-delete event, if there is no corresponding entry for a file or folder in RVM 214, sync engine uplink module 254 can create a partial entry in RVM 214 and notify remote uplink module 234 of the changes. If there is an existing entry for the file or folder in RVM 214, sync engine downlink module 212 can update the entry for the remote peer file or folder in RVM 214 to reflect a stale state. Updating the entry for the file or folder in RVM 214 may include marking attributes of the file or folder stale in RVM 214 based on LVM 212 or marking the file or folder for deletion in RVM 214. At this point, the synchronization state for the file or folder modelled by RVM 214 will indicate that the remote server is out of sync with the local cache for the file.

Remote uplink module 234 can process information in RVM 214, retrieve information from server 290 and compare the information in RVM 214 for a file or folder with the information from server 290 about the remote peer file or folder. In some embodiments, remote uplink module 234 may construct a remote server model (RSM) 216 to facilitate comparing information from remote server 290 with RVM 214. Remote uplink module 234 may implement rules to identify conflicts. For example, if the latest file version retrieved from server 290 is greater than that in RVM 214 this may indicate a version conflict (e.g., that a user updated a version of the file in the local cache that is not the current version on the server because, for example, the user was working offline for a period of time). If a conflict is identified, a conflict handler can be called to address the conflict.

If no conflicts are identified, but the RVM 214 is stale, remote uplink module can update remote server 290. In one embodiment, remote uplink module 234 can signal sync agent 202 to update server 290. Updating server 290 may include, for example, creating, deleting or modifying files or folders on server 290, sending updated metadata for a file or folder to server 290, sending a copy of the locally cached file (or modified blocks) or sending other information to remote server 290. If the update is not successful, synchronization manager 200 can implement error handling routines. If the update is successful, remote uplink module 234 can update RVM 214 accordingly to reflect the updated state at server 290.

Local link services 220, sync engine 250 and remote link services 230 may all include error handlers to handle errors (including conflicts) that occur during processing. The error handlers may be specific to types of errors and may be triggered when an error is received or detected. Each error handler can include rules for handling a specific type of error. An error handler may, in some cases, update RVM 214 or LVM 212. In some cases, an error handler may simply mark a file as being subject to an error (e.g., with an overlay on a file icon for the file).

In some embodiments, the synchronization manager can include rules for identifying conflicts, some examples of which are discussed above. As another example, synchronization manager 200 may identify conflicts based on various requirements of file system 280 and remote server 290. One example may be a name conflict because file system 280 and remote server 290 have different rules for naming. For example, the local operating system may not differentiate between lowercase and uppercase letters while remote server 290 does. Thus, in this example, while A.txt and a.txt would be considered two different file names by remote server, they may be considered the same filename in file system 280. For example, say A.txt exists in the cache and at server 290 and the user then adds a file a.txt to the remote server. During the synchronization process, when a.txt is synchronized down, a partial entry for the new file can be created in LVM 212, as discussed below. When local downlink module 222 attempts to create the file in file system 280, however, local downlink module 222 will receive an error. Local downlink module can determine that there is a naming conflict based on the error returned and save the file under a new name (say a.txt (2)) which could be entered in LVM 212. According to one embodiment, because the name of the file in file system 280 and LVM 212 match, local uplink module 224 would not detect a difference and would not notify sync engine uplink module 254 of a change. In such an embodiment, the changed filename (e.g., a.txt (2)) would not be uploaded to server 290. In this example, the local and remote peer copies of the file will have different names. However, the synchronization manager can track the correspondence between the peers using other information.

Figure 3:
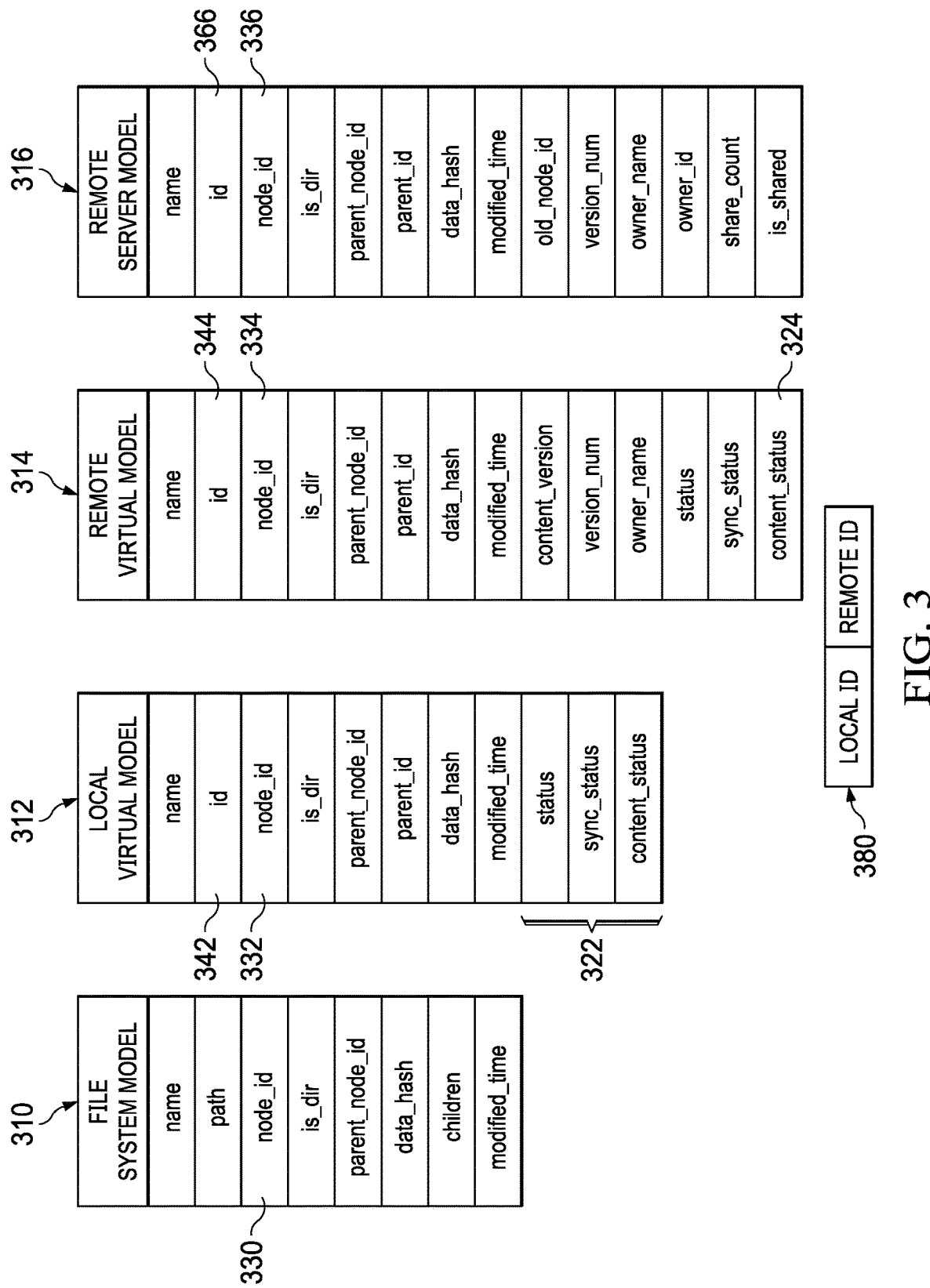
FIG. 3 is a diagrammatic representation of one embodiment of a set of synchronization data models.

FIG. 3 illustrates one embodiment of various data models that may be used by a synchronization manager. File system model (FSM) 310 is a model representing data maintained by the local file system for folders or files in the local cache or that can be derived from the folders or files in local cache. Remote server model (RSM) 316 is a model representing data maintained by a remote server for files or folders. Local virtual model (LVM) 312 and remote virtual model (RVM) 314 are virtual models maintained by a synchronization manager to facilitate synchronization. FSM 310, LVM 312, RVM 314, RSM 316 may be examples of FSM 210, LVM 212, RVM 214 and RSM 216 of FIG. 2, respectively. In some embodiments, these models may be maintained in transient memory by the synchronization manager during operation.

FSM 310 is an internal representation of a file or folder generated from several data sources. The data hash can be generated by the synchronization manager (e.g., by the local downlink module 222 or local uplink module 224), the name and path are provided by the file system while the node_id is provided by an operating system specific function. In one embodiment, data hashes are generated over various portions of file content (say every 4 kb of file data) so that the changed portions of the content may be identified and the file synchronized by sending only the changed portions to the server. The node_id in FSM 310 may be the id used by the operating system to represent a file's location on disk. RSM 316 is based on a data model provided by the remote system, but modified by the synchronization manager to allow easy comparison with the RVM 314. RSM 316 may include metadata gathered from the remote system about an object, such as file/folder name, id, node_id, etc. or other information about the object (e.g., such as one or more hashes calculated from the content of a file as uploaded by the synchronization manager or calculated by the server). FSM 310 and RSM 316 can be generated by the synchronization manager to provide an abstraction of the file or folder in the file system or on the remote system. In accordance with one embodiment, FSM 310 and RSM 316 can be generated on-demand for use in a current synchronization process and are transient.

In general, LVM 312 models the current state of objects in the local cache and includes various attributes for the objects collected according to FSM 310 or provided by the synchronization manager. In the illustrated embodiment, LVM 312 includes a set of statuses 322. According to one embodiment, the various statuses 322 map directly to attributes of the model 312 and are used to determine which attributes need to be updated. The sync engine 250 can mark a status as dirty indicating that the file system is stale with respect to that attribute, during sync processing, each "dirty" status can trigger the synchronization manager to perform a local update. For example, if the content status for a file is marked as dirty, local downlink module 222 can signal the sync agent to download and save the updated file. Once the file is updated in the local cache, local downlink module 222 can generate a hash of the file, update the data_hash and any other attributes in LVM 312 for the file and clear the "dirty" status. As another example, if the name_status for a file (not shown) is marked as dirty, local downlink module 222 can update the name of the file in the local file system, update the name in LVM 312 and clear the name_status for the file in LVM 312. In addition or in the alternative, LVM 312 may include more general statuses such as a status that indicates that the file system is stale with respect to an object without indicating the particular attribute that is stale. For example, LVM 312 entries may include a delete_status to indicate whether a local peer file should be deleted from local cache 280.

In general, RVM 314 models the current state of objects at the remote system and includes various attributes for the objects collected according to RSM 316 or provided by the synchronization manager. In the illustrated embodiment, RVM 314 includes a set of statuses 324. According to one embodiment, the various statuses 324 map directly to attributes of the model 314 and are used to determine which attributes need to be updated. The sync engine 250 can mark a status as dirty indicating that the file system is stale with respect to that attribute, during sync processing, each "dirty" status can trigger the synchronization manager to perform a local update. For example, if the content status for a file is marked as dirty, remote uplink module 234 can signal the sync agent to upload the updated file. Remote uplink module 234 can then retrieve a data hash of the file from the server, update the data_hash and any other attributes in RVM 314 for the file and clear the "dirty" status. As another example, if the name_status for a file (not shown) is marked as dirty, local uplink module 324 can signal the sync agent to send a request to update the name of the file on the remote server, update the name in RVM 314 and clear the name_status for the file in RVM 314. In addition or in the alternative, RVM 314 may include more general statuses such as a status that indicates that the remote system is stale with respect to an object without indicating the particular attribute that is stale. For example, RVM 314 entries may include a delete_status to indicate whether a remote peer file should be deleted from the server.

It can be noted that different systems may use different ids for objects. With respect to one embodiment, for example, node_id 330 and 332 may refer to the node_id typically assigned by a local operating system to track an item's location on disk. In some circumstances, an operating system may change the node_id. The synchronization manager can therefore assign a unique id 342 to each file or folder. If the node_id 330 changes, the correspondence between an item represented by FSM 310 and the model of the item in LVM 312 can be determined based on one or more of the path, name, is_dir, parent_node_id, data_hash in FSM 310 and entries for a file or folder in LVM 312. The node_id 332 and other attributes for the file or folder can then be updated accordingly in LVM 312.

On the other hand, node_id 334 and 336 may refer to a node_id assigned by the remote system such as to track all versions of a file together. Id 344 may be a unique id assigned to a remote object by synchronization manager 200. Id 366 may be an id used by the remote server to identify an object. If the node_id 336 changes, the correspondence between an item represented by RSM 316 and the model of the item in RVM 314 can be determined based on one or more of the name, is_dir, parent_node_id, parent_id, data_hash, old_node_id in RSM 316 and entries for the item in RVM 314. The node_id 334 and other attributes for the item can then be updated accordingly in RVM 314.

In one embodiment, ids 344 and 342 for corresponding local and remote peers may not match. The synchronization manager 200 can maintain an id map (e.g., table or other data structure) mapping ids 344 to ids 342 to map the unique id in RVM 314 for a remote peer to the unique id in LVM 312 for the local peer.

Figure 4:
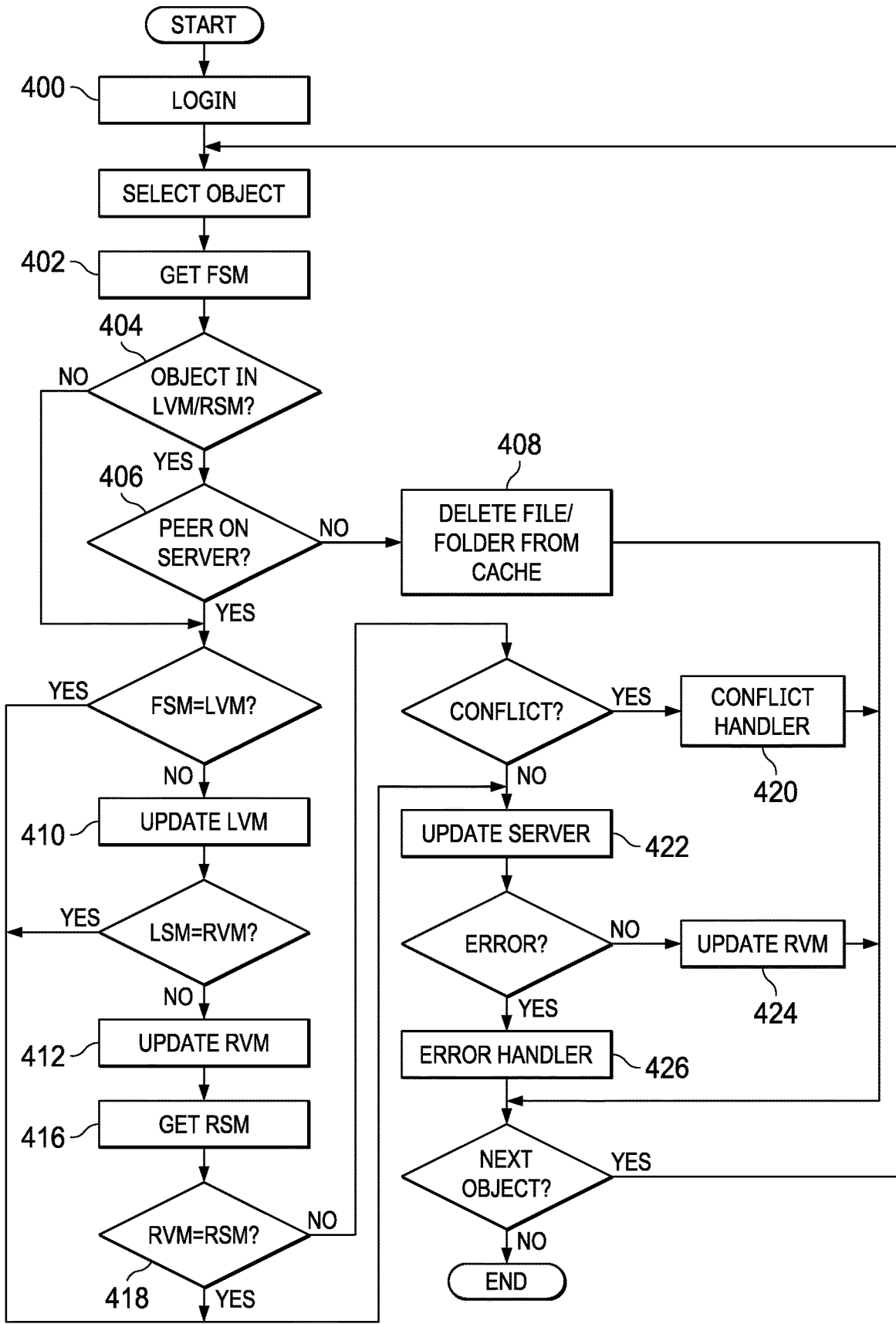
FIG. 4 is a flow diagram illustrating one embodiment of a startup sequence.

FIG. 4 is a flow chart of one embodiment of a startup process for a synchronization manager synchronizing a local cache to a server. For the sake of example, the startup process is discussed with reference to FIGS. 2 and 3. When synchronization manager 200 starts up, the sync agent can log on to server 290 using stored credential information (step 400). The startup process of the synchronization manager traverses the local objects (files and folders) available to synchronization manager 200. If the startup is the initial startup, there may be no files in the local cache and the process can end. If there are objects in the cache, the startup process signals local uplink module 224 to query the file system for the state of files and folders in the cache and generate the FSM 310 for each file and folder (step 402). For a file or folder found in cache, the startup process determines if a corresponding file or folder entry is found in LVM 312 and RVM 314 (step 404). For example, the startup process compares attributes in the FSM 310 to the LVM 312 to identify if an LVM entry exists for the file or folder. Local uplink module 224 can, for example, use the name, node_id, path, data_hash or other information according to file system model 310 to identify the entry for the file or folder in LVM 312. If an LVM entry exists for the file or folder, the startup process can use map 380 to determine if an entry exists in RVM 314 for a corresponding remote peer file or folder. If a corresponding file or folder entry is found in LVM 312 and RVM 314, the startup process determines if the remote peer copy of the file or folder is located on the remote server 290 (step 406). For example, the startup process can signal the sync agent 202 to request the state of the remote peer copy of the file or folder. If the file or folder cannot be found on the remote server, for example if the server returns a notification that a remote peer copy of the file or folder does not exist, this indicates that the file or folder previously existed remotely (because it was in the RVM 314) but has been deleted there. In one embodiment, the sync manager start process can remove the file or folder entry from RVM 314 and LVM 312 and delete the file or folder from the local file system (step 408).

For a file or folder that is found locally and for which a remote peer exists on the remote system or for which there is no entry in LVM 312 (indicating a new file), the synchronization manager, during the startup process, updates the LVM 312 with the state of the file as appropriate (step 410). For example, if there is no entry corresponding to the file or folder in LVM 312, local uplink 224 can create an entry, assign an id 342 and populate the entry with attribute values from FSM 310. If there is an entry in LVM 312, synchronization engine 250 can compare a set of attributes of the LVM entry for the file or folder with corresponding attributes of FSM 310 and, if there is a discrepancy in the compared attribute values, update LVM 312 using the attribute values from FSM 310. With reference to FIG. 3, for example, the synchronization manager can compare the corresponding name, data_hash, is_dir, parent_node_id and modified_time values from file system model 310 and LVM 312 to determine if the file system model 310 and LVM 312 match.

Synchronization manager 200 determines if the state for the local peer file or folder in LVM 312 matches the state for the remote peer file or folder in the RVM 314 and, if not, can update RVM 314 (step 412) accordingly. If there is no entry for the file or folder in RVM 314, sync engine uplink module 234 can create a partial entry (including assigning an id 344) and update map 380. If there is a corresponding entry in RVM 314 for the remote peer copy, sync engine uplink module can compare a set of attributes of the LVM entry for the file or folder with corresponding attributes in the RVM entry for the remote peer copy of the file or folder and, if there is a discrepancy in the compared attribute values, update RVM 314 by marking the RVM entry stale. In some embodiments, the RVM entry is marked stale by marking specific attributes as stale.

If the synchronization manager updates RVM 314 for a file or folder, remote uplink module 234 can query server 290 (via sync agent 202) for information related to the file or folder according to remote server model 316 (step 416) and compare the information for the folder or file in the RSM 316 with corresponding information for the file or folder in RVM 314 (step 418). For example, local uplink module 234 can compare a set of attributes of the RVM entry for the file or folder with corresponding attribute values from the RSM. If the entry for the file or folder in RVM 314 differs from that retrieved from the server based on the comparison, remote uplink module 234 can determine if a conflict exists, such as a version conflict or other conflict. If a conflict exists, remote uplink module 234 can call a conflict handler (step 420). If there is no discrepancy between the compared attribute values or the differences between the attributes returned by server 290 and the corresponding information in RVM 314 for the file or folder do not result in a conflict or other error, remote uplink module 234 can update the remote server appropriately (e.g., with the updated information from sync engine uplink module 254) (step 422). This may include, for example, interacting with sync agent 202 to create folders at server 290, update attributes at server 290 or upload files from file system 280 to server 290.

If the update is successful, remote uplink module 234 can update RVM 314 accordingly, setting statuses, updating RVM 314 attributes with updated values, completing an RVM entry for a new file or taking other actions (step 424). In one embodiment, if the update to the remote server is not successful, RVM 314 is not updated and the status of the attributes remains "dirty" indicating that the update should be attempted again. According to one embodiment, an error handler 426 can be called. The steps of FIG. 4 may be repeated for each file or folder in the local cache.

Figure 5:
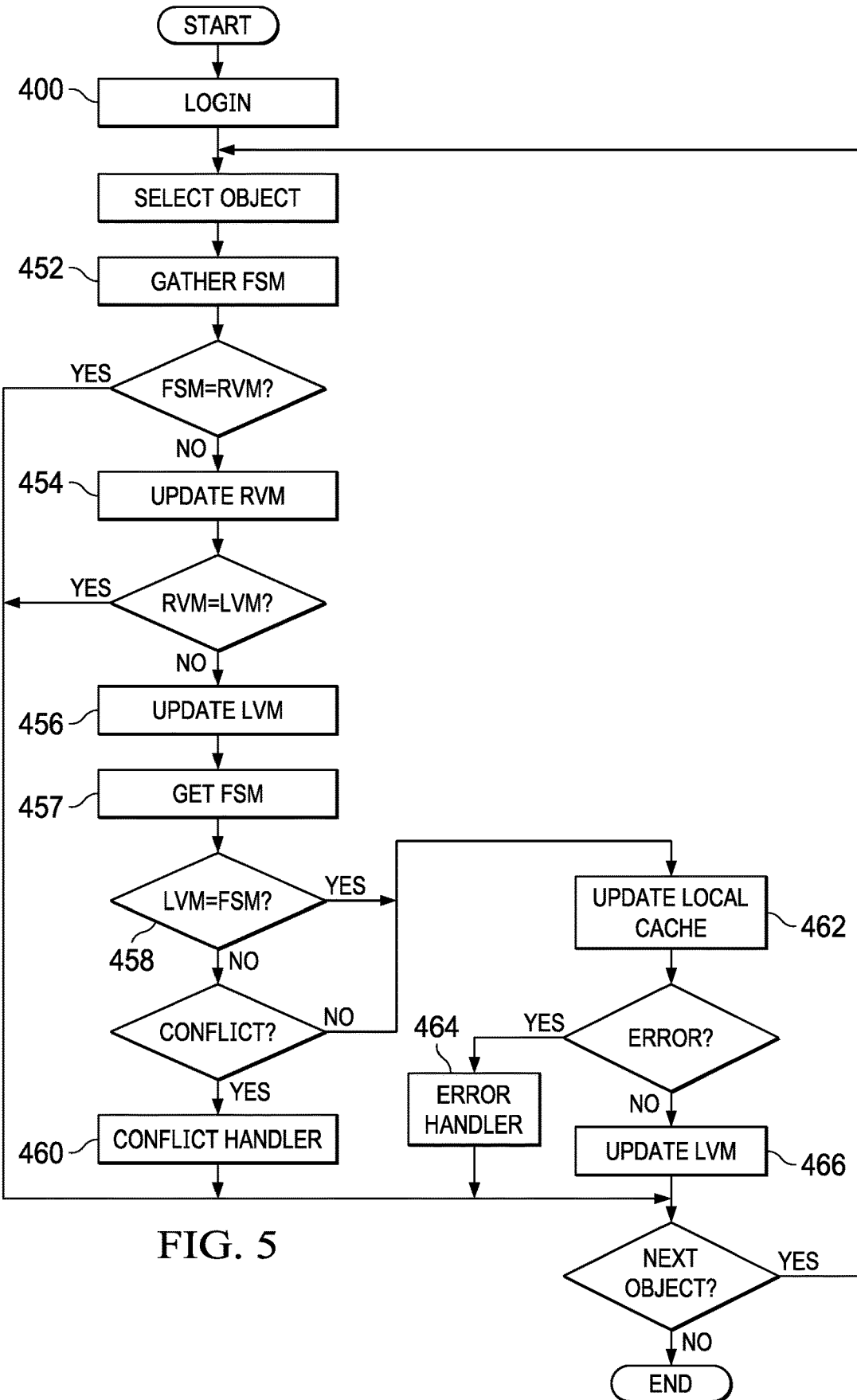
FIG. 5 is a flow diagram illustrating another embodiment of a startup sequence.
Figure 12:
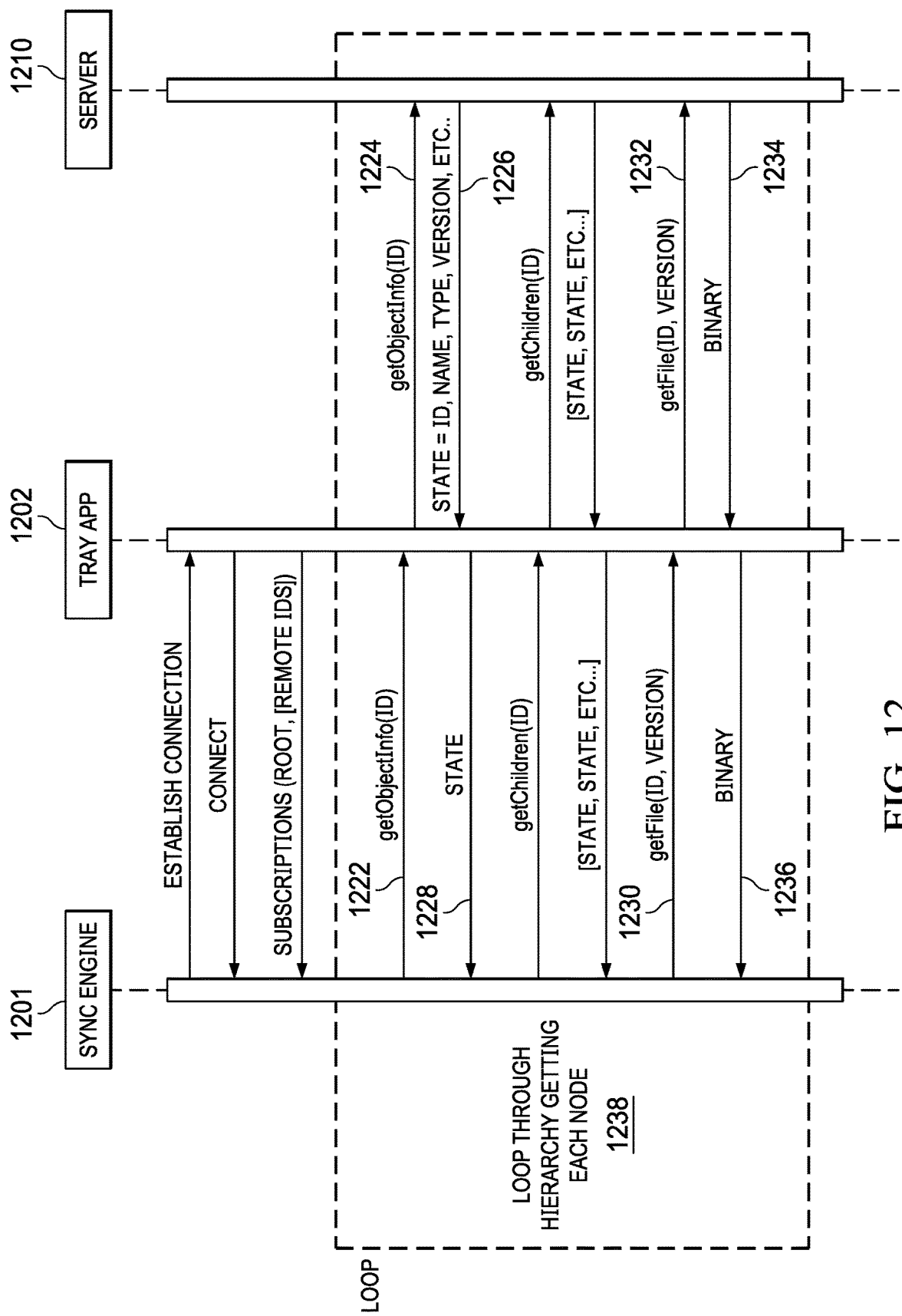
FIG. 12 is a flow diagram illustrating one embodiment of a startup sequence.

FIG. 5 is a flow chart of one embodiment of a startup process for a synchronization manager synchronizing objects on a server to a local cache. For the sake of example, the startup process is discussed with reference to FIGS. 2 and 3. When synchronization manager 200 starts up, the sync agent can log on to server 290 using stored credential information (step 400). Further, the start process signals remote downlink module 232 to request information (via sync agent 202) for each remote folder or file to be synchronized to the local cache in file system 280 (e.g., as determined based on user credentials and account settings). One embodiment of traversing the objects at startup is illustrated in FIG. 12.

As the state of each remote file or folder available based on the login is returned is by server 290, remote downlink module 232 compares the RSM 316 for each remote file and folder to the RVM 314. If there is no entry for the file or folder in RVM 314, remote downlink module 232 creates an entry, for example assigning an id 344 and populating attribute values with values from the RSM 316. If there is an entry for the remote peer file or folder in RVM 314, synchronization manager 250 can compare a set of attributes of the RVM entry for the file or folder with corresponding attributes from RSM 310 for the remote peer file or folder and, if there is a discrepancy in the attribute values, update RVM 314 with the current attribute values. Thus, if there is a discrepancy between the RSM 316 and RVM 314 for a file or folder, the remote downlink module 232 creates new entries or updates existing entries in RVM 314 and signals sync engine downlink module 252 of the changes (step 454).

Sync engine downlink module 252 compares the RVM entry for a file or folder with a corresponding entry in LVM 312 and updates LVM 312 accordingly (step 456). For example, if there is no corresponding entry for the file or folder in LVM 312, sync engine 250 can build a partial entry for the item in LVM 312 from RVM 314 (including assigning an id 342) and update map 380. If there is an entry for the local peer file or folder in LVM 312, synchronization manager 250 can compare a set of attributes of the LVM entry for the file or folder with corresponding attributes of RVM entry for the remote peer file or folder and, if there is a discrepancy in the attribute values, update LVM 312 by marking the LVM entry stale. In some embodiments, the LVM entry is marked stale by marking specific attributes stale. If there is no discrepancy in the compared attributes, the startup process can move to the next object.

If the synchronization manager updates LVM 312 for a file or folder, local downlink module 222 can query the file system 280 for information related to the file or folder according to FSM 310 (step 457) and compare the information for the folder or file according to FSM 310 with corresponding information for the file or folder in LVM 312 (step 458). For example, local downlink module 222 can compare a set of attributes of the LVM entry for the file or folder with corresponding attribute values from the FSM. If the information in the entry for the file or folder in LVM 312 differs from that retrieved from the file system based on the comparison, remote downlink module 222 can determine if a conflict exists, such as a version conflict or other conflict. If a conflict exists, remote uplink module 234 can call a conflict handler (step 460).

If the corresponding attributes for the file or folder in LVM 312 and FSM 310 are the same or if the differences between the corresponding attributes in FSM 310 and LVM 312 for the file or folder do not result in a conflict or other error, remote downlink module 222 can update the local cache appropriately (step 462), for example creating the appropriate folders in file system 280 using metadata passed from RVM 314 and signaling sync agent 202 to download files to the cache. If an error occurs when updating the cache, local downlink module 222 can call an error handler (step 464). Otherwise, local downlink module 222 updates LVM 312 for the files or folders based on the current state of the file or folder in cache (step 466). For a new file or folder synchronized down from the remote server, whether at startup or during live synchronization, the path for the file in file system 280 can be generated at runtime by recursively building the paths of all ancestors up to the root of the cache. The steps of FIG. 5 can be repeated for each object at the remote server available for synchronization.

Figure 6:
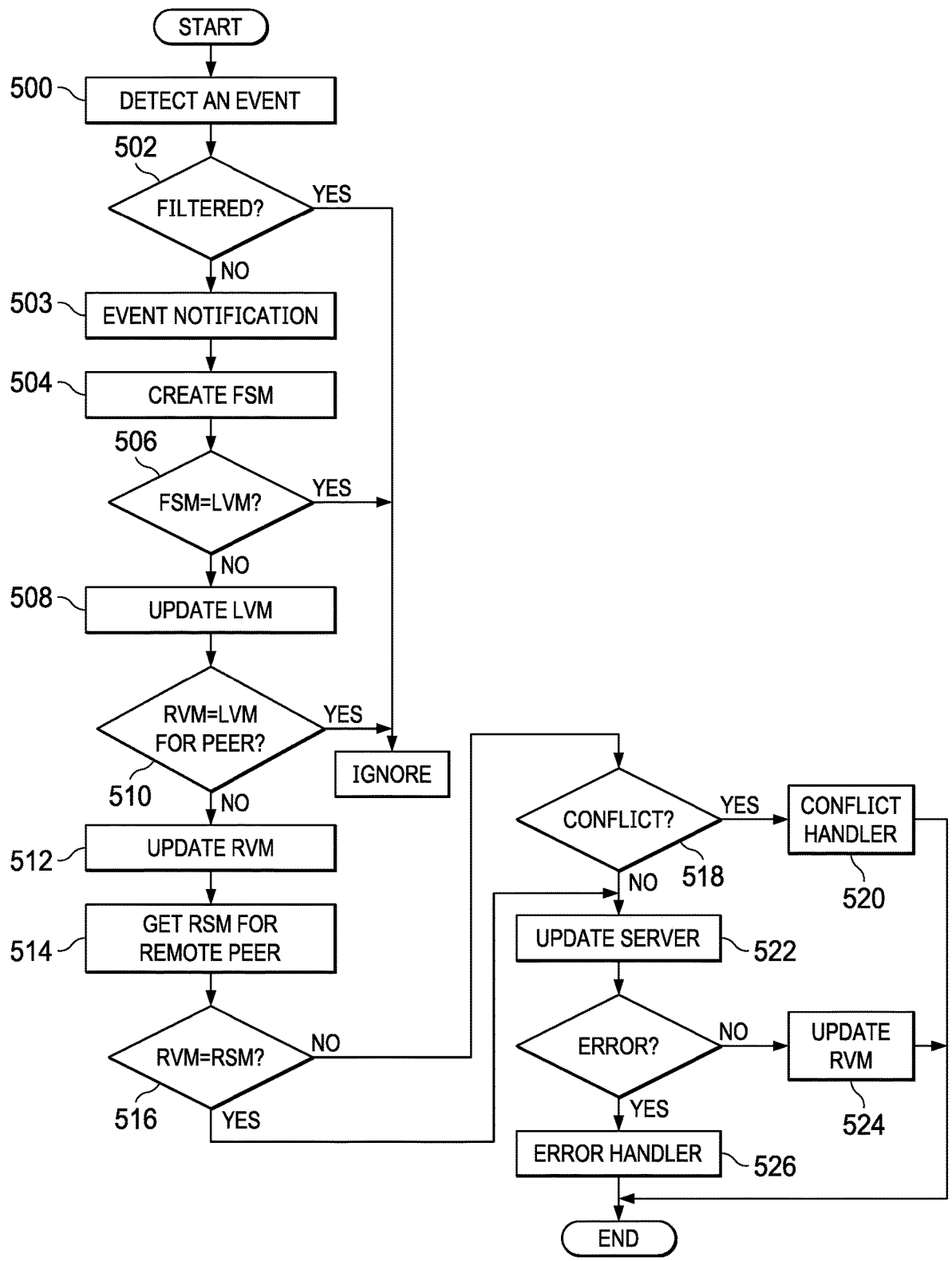
FIG. 6 is a flow diagram illustrating one embodiment of a method for live synchronization.

FIG. 6 is a flow chart of one embodiment of a method for live synchronization of changes from a local cache to a server. For the sake of example, the steps of FIG. 6 will be discussed with reference to FIG. 2 and FIG. 3. At step 500, the synchronization manager detects an event affecting an object associated with a user account. According to one embodiment, a local watcher 208 is configured to monitor file system 280 for events (e.g., changes to files or folders in the local cache). Local watcher 208 may detect an event based on an automatic event notification from the operating system. In another embodiment, local watcher 208 may detect an event by polling file system metadata, such as last modified date or data and comparing values from different polling periods. Local watcher 208 may apply filter rules to filter out certain events or to queue and combine detected events. Based on the filter rules, local watcher 208 may ignore an event or communicate a synchronization event notification to local uplink module 224 (step 504). Local watcher 208 may detect various events through monitoring.

In response to an event notification from local watcher 208 regarding a file or folder, local uplink module 224 can read file system metadata, files or other information from file system 280 for the file or folder to collect information according to file system model 310 for the file or folder (step 504). Local uplink module 224 can compare the information according to file system model 310 for the updated file or folder with the information in LVM 312 for the file or folder (step 506). If the information for the FSM for the file or folder is the same as the information in the entry for the file or folder in LVM 312, the event can be ignored. Otherwise, local uplink module 224 can resolve differences between file system 280 and LVM 312 by updating the corresponding information in LVM 312 (i.e., to reflect the current state of file system 280 for the file or folder) (step 508).

More particularly, according to one embodiment, local uplink module 224 can use the name, node_id, path, data_hash or other information according to file system model 310 to identify the entry for the file or folder in LVM 312. For a delete event, local uplink module 224 can delete the entry for the file or folder from LVM 312. For a non-delete event, if there is no entry corresponding to the file or folder in LVM 312, synchronization manager 250 can create an entry, assign an id 342 and populate the entry with attribute values from FSM 310. If there is an entry in LVM 312 for the file or folder, synchronization manager 250 can compare a set of attributes of the LVM entry for the file or folder with corresponding attributes of FSM 310 and, if there is a discrepancy in the compared attribute values, update LVM 312 using the attribute values from FSM 310. With reference to FIG. 3, for example, the synchronization manager can compare the corresponding name, data_hash, is_dir, parent_node_id and modified_time values from file system model 310 and LVM 312 to determine if the file system model 310 and LVM 312 match. For example, if local uplink module 224 determines that a file in file system 280 has a new modified_time entry and data_hash, local uplink module 224 can update LVM 312 with the new modified_time entry and data_hash for the file. When local uplink module 224 changes LVM 312 for a file or folder, local uplink module 224 can notify synchronization engine uplink module 254 of the changes to LVM 312.

The synchronization manager can compare the LVM entry for the file or folder to the RVM entry for the file or folder (step 510). According to one embodiment, sync engine uplink module 254 is notified of a change in LVM 312 for a local file or folder, locate the peer remote file or folder information in RVM 314 using map 380 and compare LVM 312 to RVM 314 for the folder or file. For a delete event, sync engine uplink module 254 can mark the remote peer file or folder for deletion in RVM 314. For a non-delete event, if there is not an entry for the remote peer file or folder in RVM 314, sync engine uplink module 254 can create a partial entry from LVM 312 and update map 380. For example, sync engine uplink module 254 may populate name, id, is_dir, parent_id in an entry. If there is a corresponding entry in RVM 314 for the remote peer copy, synchronization manager 250 can compare a set of attributes of the LVM entry for the file or folder with corresponding attributes in the RVM entry for the remote peer copy of the file or folder. If there are no discrepancies between LVM 312 and RVM 314 for the file or folder based on the comparison, the event can be ignored. If there are differences between LVM 312 and RVM 314 for the compared attributes of the file or folder that do not result in an error, sync engine uplink module 254 updates the RVM 314 (step 512). For example, sync engine uplink module 254 can update an entry for the file or folder in RVM 314. For example, a "content status" can be marked "dirty" to indicate that the content of the file was updated. A determination of whether content has changed can be based on a difference in modified_time entries or data_hash entries for the file in LVM 312 are RVM 314.

Sync engine uplink module 254 can update the statuses for the file in RVM 314 and notify remote uplink module 234 of the changes to RVM 314 for the file or folder. At this point, the synchronization state modelled by RVM 314 for the file or folder reflects that the remote peer file or folder is out of sync with the local peer file or folder (is stale) and should be updated.

If sync engine uplink module 254 updates RVM 314 for a file or folder, remote uplink module 234 can query server 290 (via sync agent 202) for information related to the file or folder according to remote server model 316 (step 516) and compare the information for the folder or file with the information for the file or folder in RVM 314 (step 518). For example, local uplink module 234 can compare a set of attributes of the RVM entry for the file or folder with corresponding attribute values from the RSM.

If the entry for the file or folder in RVM 314 differs from that retrieved from the server based on the compared attributes, remote uplink module 234 can determine if a conflict exists, such as a version conflict or other conflict (step 518). If a conflict arises, remote uplink module 234 can call a conflict handler (step 520). If the file or folder attributes in RVM 314 are the same as the corresponding attributes in RSM 310 or the differences between RVM 314 and RSM 310 for the file or folder do not result in a conflict or other error, remote uplink module 234 can update the remote server appropriately (e.g., with the updated information from sync engine uplink module 254) (step 522). This may include, for example, interacting with sync agent 202 to delete or create folders at server 290, delete files at server 290, update attributes at server 290 or upload files from file system 280 to server 290. If the update is successful, remote uplink module 234 can update the attributes and status of the file in RVM 314 (e.g., update the modified_time, data_hash and change the status to synched, complete a partial entry with information returned from the server or otherwise update RVM 314) (step 524). In one embodiment, if the update to the remote server is not successful, RVM 314 is not updated and the status of the changed attributes remains "dirty" indicating that the update should be attempted again. According to one embodiment, an error handler 526 can be called. The steps of FIG. 6 may be repeated for subsequent events.

Figure 7:
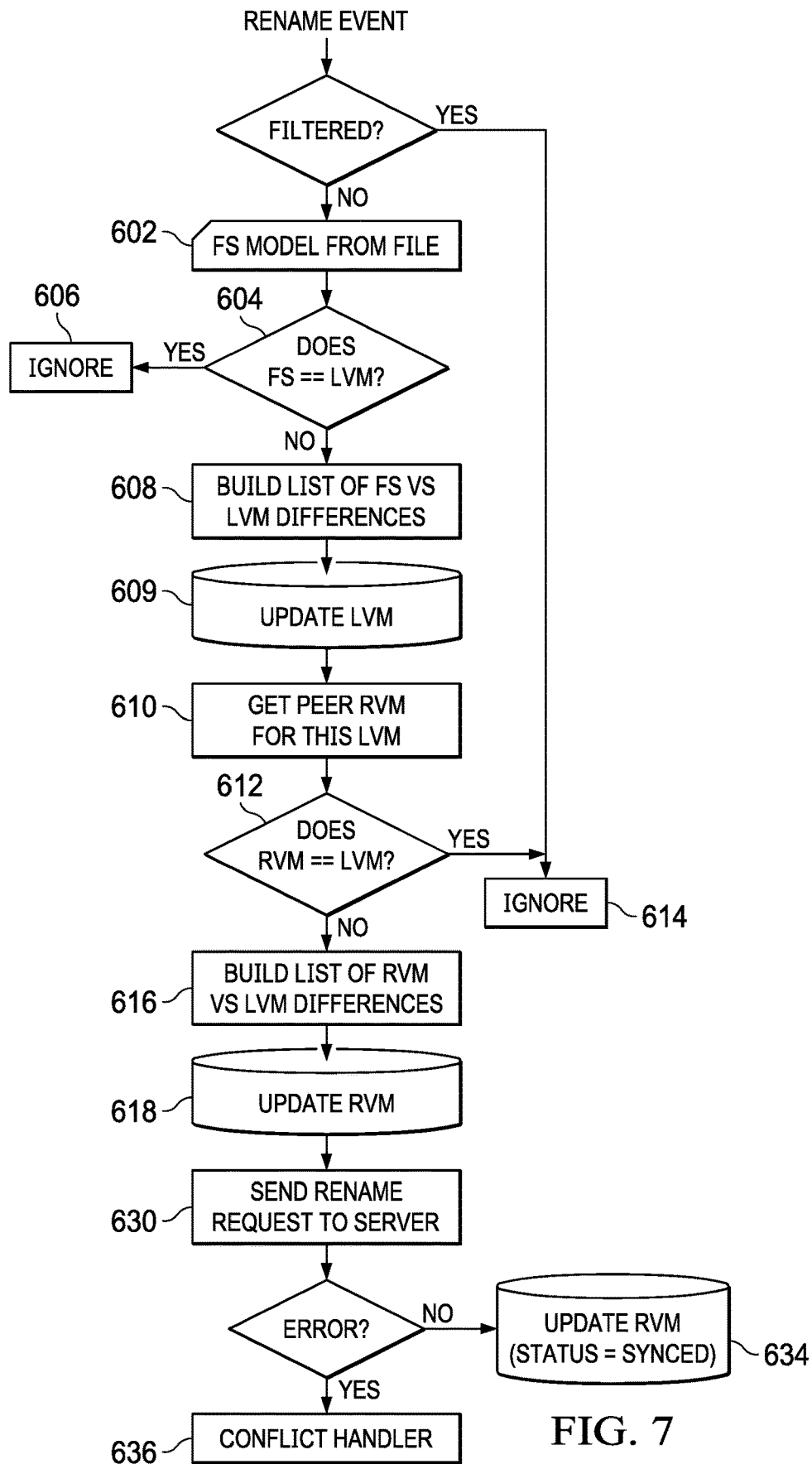
FIG. 7 is a flow diagram illustrating one embodiment of a method for synchronization based on a rename event.

FIG. 7 is a flow chart illustrating one embodiment of a method for renaming a cached file (e.g., a file in a local cache in a local file system). The method of FIG. 7 is discussed in conjunction with the embodiments of FIG. 2 and FIG. 3 by way of example. When a rename event occurs (and is not filtered out) the local uplink module 224 can collect information from the file system according to a file system model (e.g., file system model 310) (step 602) and locate corresponding entries in the LVM (e.g., LVM 312) (e.g., based on the name, path or other information for the file). The local uplink module can compare the information collected according to the file system model to the LVM to see if they match (step 604). Determining if the information matches may involve comparing only certain information between the models. With reference to FIG. 3, for example, the synchronization manager can compare the corresponding name, data_hash, is_dir, parent_node_id and modified_ time values from file system model 310 and LVM 312 to determine if the file system model 310 and LVM 312 match.

Returning to FIG. 7, if the file system and LVM match for the file or folder, this indicates that the change has already been processed and the name change can be ignored (step 606). However, if the file system model and LVM do not match, local uplink module 224 can build a list of relevant differences between the file system model and LVM (step 608) and update the LVM accordingly (step 609). The sync engine uplink module 254 can locate information for the file in the RVM (e.g., using an "id" or other information) (step 610) and determine if the LVM matches the RVM for the file (step 612). Again, this comparison may involve comparing a certain subset of information for the file in the LVM and RVM to see if they match. If the information in the LVM and RVM match for the file, the change can be ignored (step 614). If the RVM and LVM do not match for the file, the sync engine uplink module 254 can build a list of differences between the LVM and RVM (step 616) and update the RVM (step 618) to mark the model as stale for the file. This may include updating one or more statuses to indicate that the server should be synched. With the RVM updated, the remote uplink module 234 can communicate with the server to synchronize the name change to the server (step 630). If no error is returned, the remote uplink module 234 can update the RVM information for the file with the updated name and a status of "synced" (step 634) (at least for the name attribute) such that the RVM now models the current state of the server with respect to the file. If an error is returned, an error handler can be invoked (step 636).

Figure 8:
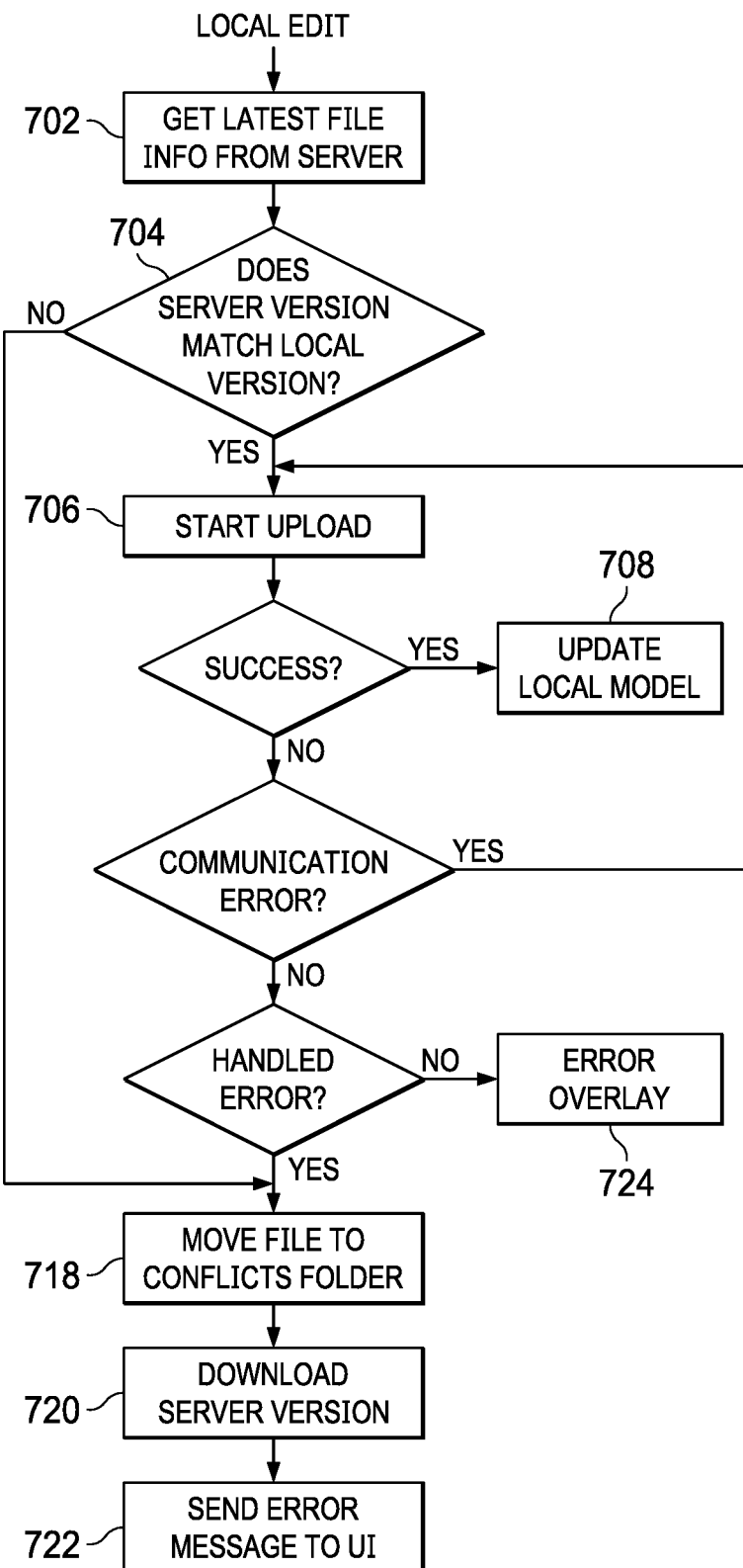
FIG. 8 is a flow diagram illustrating an embodiment of synchronization based on a local file edit.

FIG. 8 is a flow chart illustrating one embodiment of determining a version conflict when a change is made to the local cached copy of a file. For example in response to an event notification by watcher 208, the LVM 312 is updated and the RVM 314 marked stale (e.g., steps 500-512 of FIG. 6). In response to detecting that a local copy of file has been edited (e.g., based on content being marked stale in the RVM/notification from the sync engine) the remote uplink module 234 can request information for the remote peer file from the content management server (e.g., according to a remote server model 310) (step 702) and compare a version number received from the remote server for the remote peer file to the version number in the RVM 314 representing the latest version number downloaded to the local cache (step 704). If the version number returned by the remote server is not higher than the version number for the file in the RVM 314, the remote uplink module 234 can upload the file and metadata to the server to update the remote peer file (step 706). This may include, for example, interacting with sync agent 202 to create folders at server 290, update attributes at server 290 or upload files from file system 280 to server 290. If the update is successful, the remote uplink module 234 can update the RVM (step 708).

If the update to the local file is not an update to the latest version (as determined at step 704) or if there is a communication error during uploading the updated file, the appropriate error handler can be called. The error handler can move the updated local file to a local conflicts folder (step 718), download the latest version of the file from the server and add the latest version to the local cache (step 720) and present an error message to the user notifying the user that the edited version is not the latest version and that a newer version has been downloaded (step 722). If the error cannot be handled through isolation and reverting the local cache back to the server data for the file, the synchronization manager can present an error message to the user, such as overlay on the file icon in the local cache (step 724). In accordance with one embodiment, the conflicts folder exists on the local client, outside the local cache so that files in the conflicts folder do not sync up to the server. The original location of the file is recorded before moving it so that it can be moved back into its original location if the error is resolved by the user.

Figure 9:
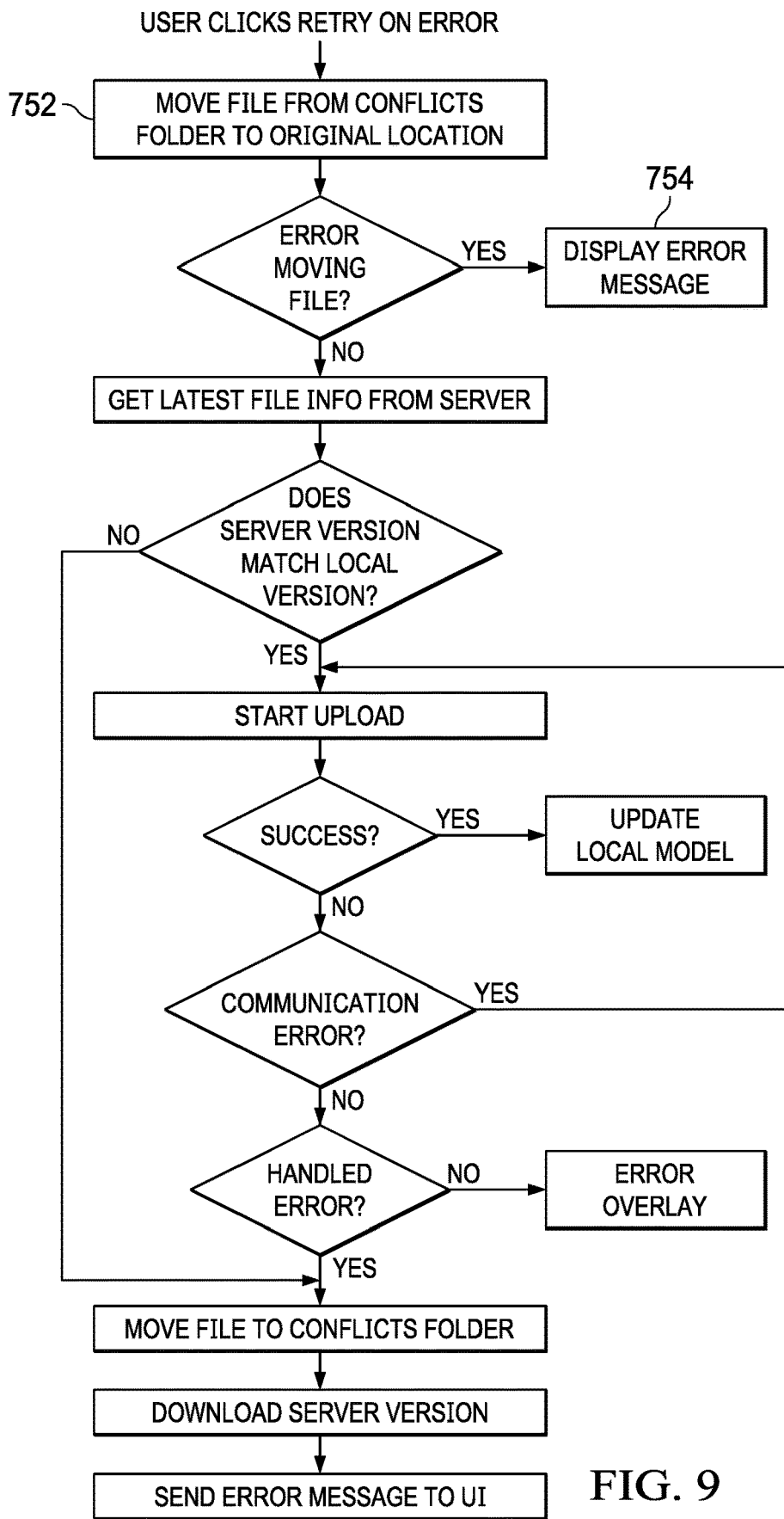
FIG. 9 is a flow diagram illustrating an embodiment of a method for conflict handling.

FIG. 9 is a flow chart illustrating one embodiment of a method for version conflict resolution. A user may select to move a file from the conflicts folder to an original location in the local cache (step 752). If there is an error moving the file, the user can be presented with an error message (step 754). If there is not an error moving the file, the process can be treated as an update to local cache and synchronization can proceed as discussed above in conjunction with FIG. 8.

Figure 10:
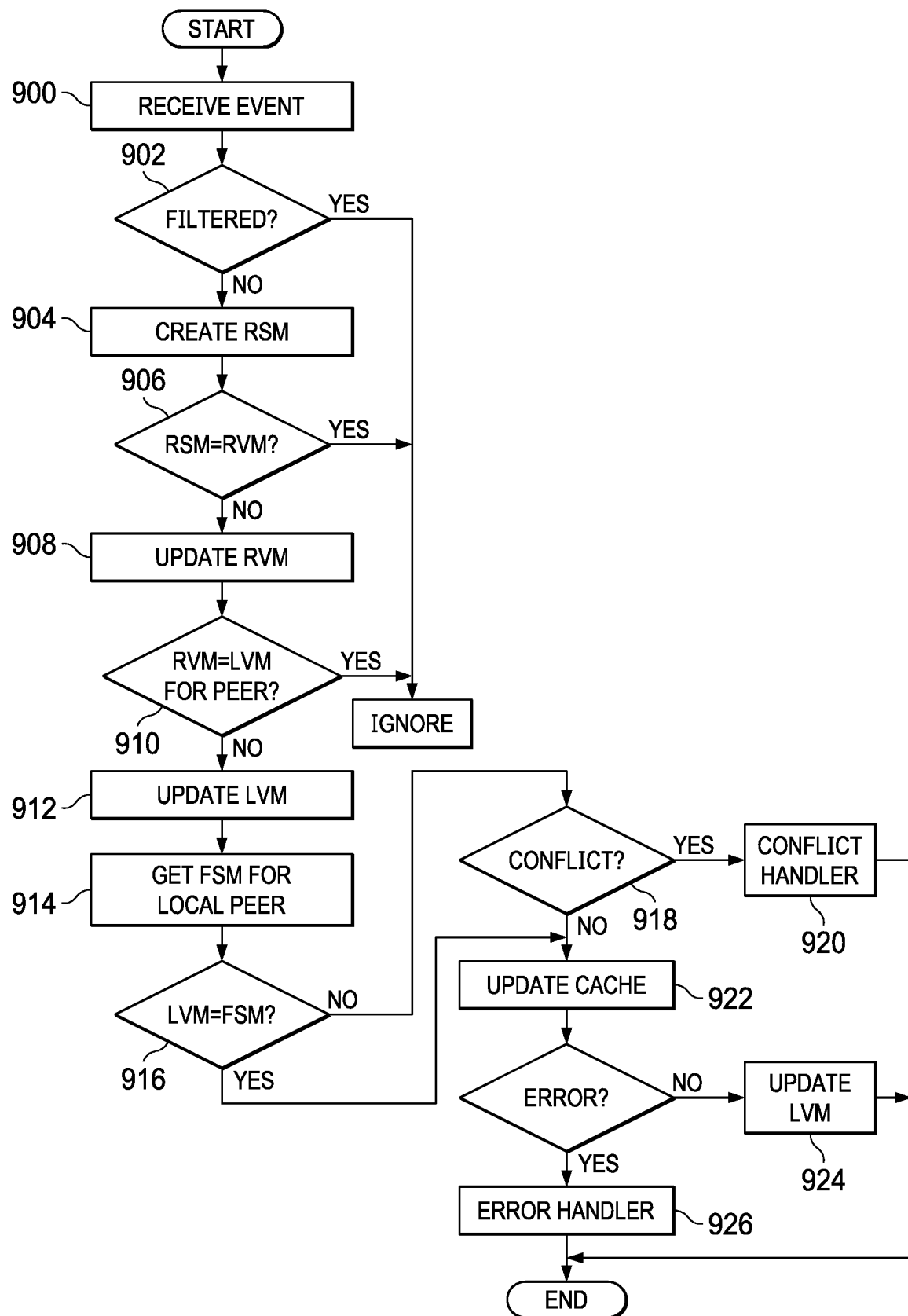
FIG. 10 is a flow diagram illustrating another embodiment of a method for live synchronization.

FIG. 10 is a flow chart of one embodiment of a method for live synchronization of changes from a server to a local cache. For the sake of example, the steps of FIG. 10 are discussed with reference to FIG. 2 and FIG. 3. At step 900, a synchronization manager can detect an event that may require synchronization. According to one embodiment, sync engine module 204 may include a remote watcher 260 that detects events at remote server 290, such as events to create, delete or update objects. When an action is taken on a file or folder at remote server 290 (e.g., the file or the file metadata is edited by another user, a file or folder is added to the synchronized folder, a synchronized file or folder is deleted), remote server 290 may send an event notification to sync agent 202 and sync agent 202 can pass the notification to remote watcher 260. Thus, remote watcher 260 can be configured to listen for events from sync agent 202 (or otherwise listen for or receive notifications from server 290 of a change to a file or folder, including a change on the file or folder metadata). In some embodiments, the synchronization manager may filter certain remote events based on rules. If an event is filtered (step 902) the event may be ignored.

Based on an event notification, the synchronization manager can collect information from the remote service regarding the folders or file subject to the event (step 904) and compare the information collected from the server with the RVM 314 (step 906). According to one embodiment, if remote watcher 260 detects a change to a peer remote folder or file, remote watcher 260 can trigger remote downlink module 232. For a delete event, remote downlink module 232 updates RVM 314 by removing the entry for the file or folder from RVM 314. Otherwise, remote downlink module can collect information for a file or folder from remote server 290 according to remote server model 316 and determine if the information according to remote server model 316 differs from corresponding information in RVM 314 for the file or folder. If the information according to the RSM for the file or folder is the same as the information in the entry for the file or folder in RVM 314, the event can be ignored. Otherwise, remote downlink module 232 can resolve the differences by updating the RVM 314, thus updating RVM 314 to the current state for the file or folder at remote server 290 (step 908).

For a non-delete event, if there is no entry for the file or folder in RVM 314, remote downlink module 232 creates an entry, for example assigning an id 344 and populating attribute values with values from the RSM 316. If there is an entry for the remote peer file or folder in RVM 314, synchronization manager 250 can compare a set of attributes of the RVM entry for the file or folder with corresponding attributes from RSM 310 for the remote peer file or folder and, if there is a discrepancy in the attribute values, update RVM 314 with the current attribute values. For example, if RSM 316 includes a new version number, modified_time entry and data_hash for a file, RVM 314 can be updated with the new modified_time entry, version number entry and data_hash for the file. Thus, if there is a discrepancy between the RSM 316 and RVM 314 for a file or folder (step 906), the remote downlink module 232 creates new entries or updates existing entries in RVM 314 and signals sync engine downlink module 252 of the changes (step 908). When remote downlink module 234 updates RVM 314, remote downlink module 232 can notify sync engine downlink module 252 of the changes to RVM 314 for the file or folder.

Synchronization manager can compare the entry for the file in folder in RVM 314 with entry for the file or folder in the LVM 312 (step 910) and update the LVM 312 accordingly (step 912). According to one embodiment, synchronization engine downlink module 252 can be notified of a change in RVM 314 for a remote file or folder and determine if there is a corresponding entry for a peer local file or folder in LVM 312 using map 380. If there is no difference between LVM 312 and RVM 314 for the file or folder, the event can be ignored. If there is a discrepancy between LVM 312 and RVM 314 that does not result in an error, synchronization engine downlink module 252 can update LVM 312 (step 912).

Updating LVM 312 may include marking a local peer file or folder for deletion in LVM 312 based on a delete event. For a non-delete event, if there is no corresponding entry for the file or folder in LVM 312, sync engine 250 can build a partial entry for the item in LVM 312 from RVM 314 (including assigning an id 342) and update map 380. If there is an entry for the local peer file or folder in LVM 312, synchronization manager 250 can compare a set of attributes of the LVM entry for the file or folder with corresponding attributes of RVM entry for the remote peer file or folder and, if there is a discrepancy in the attribute values, update LVM 312 by marking the LVM entry stale. For example, synchronization engine downlink module 252 can update the statuses of the appropriate attributes in LVM 312. Continuing with the previous example, synchronization engine downlink module 252 can update the content status in LVM 312 based on a discrepancy in the modified_time, version number and data_hash attributes between the RVM 314 and LVM 312 for the remote and local peer copies. Synchronization downlink module 252 notifies local downlink module 222 of the changes to LVM 312 for the file or folder.

If the synchronization manager updates LVM 312 for a file or folder, local downlink module 222 can query the file system 280 for information related to the file or folder according to FSM 310 and compare the information for the folder or file according to FSM 310 with corresponding information for the file or folder in LVM 312 (steps 914, 916). If the information in the entry for the file or folder in LVM 312 differs from that retrieved from the file system based on the comparison, local downlink module 222 can determine if a conflict exists, such as a version conflict or other conflict (step 918). If a conflict arises, local downlink module 222 can call a conflict handler (step 920).

If there is no discrepancy between the compared attribute values or if the differences between LVM 312 and corresponding information from file system 280 for the file or folder do not result in an error, local downlink module 222 can synchronize the local cache with remote server 290 (e.g., using information from sync engine downlink module 252) (step 922). This may include, for example, creating, deleting or modifying files or folders, signaling sync agent 202 to download a copy of a remotely stored file to file system 280 or otherwise modifying file system 280. If the update is successful, local downlink module 222 can update the attributes and status of the file in LVM 312 (e.g., update the modified_time, data_hash and change the status to synched) (step 924). According to one embodiment, an error handler 626 can be called if the update is not successful. If the update to the local cache is not successful, LVM 312 is not updated and the status of the changed attributes remains "dirty" indicating that the update should be attempted again. The steps of FIG. 10 may be repeated for each event.

Figure 11:
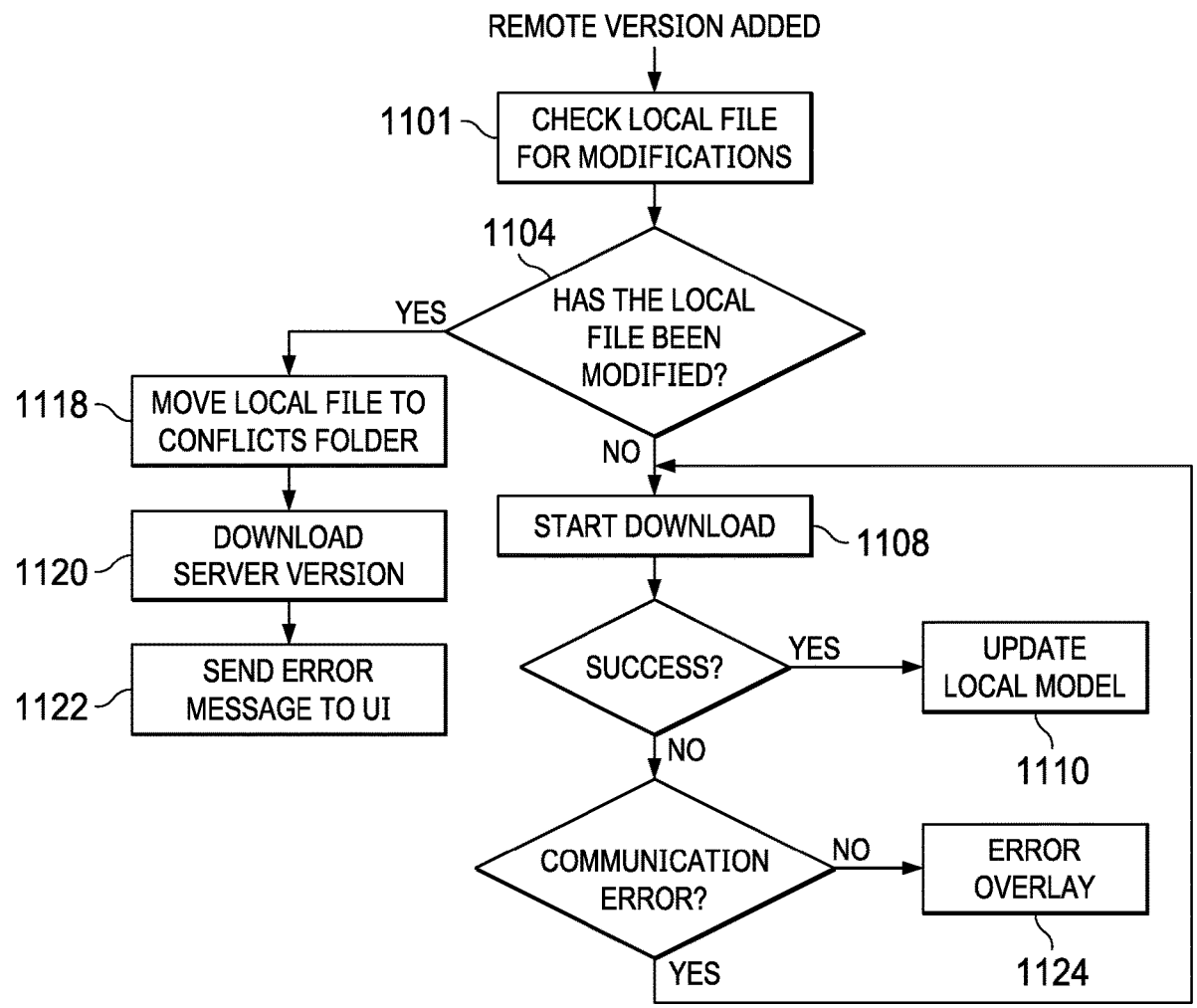
FIG. 11 is a flow diagram illustrating one embodiment of synchronization based on a remote file edit.

FIG. 11 is a flow chart illustrating one embodiment of determining a version conflict when a change is made to a remote copy of the file. In response to detecting that a file has been edited (e.g., based on a change to the LVM in step 912 of FIG. 10), a local downlink module 222 can collect information for the local peer copy of the file from the file system (step 1102) and compare the information for the file according to the file system model to the information for the file according to the LVM to determine if the file has changed (e.g., based on modified_time or data_hash) (step 1104). If it is determined that the local file has not changed based on the comparison, the local downlink module 222 can download a copy of the remote peer file and write the copy of the remote peer file to the local cache (step 1108) to update the cache. If the file is successfully downloaded to the local cache, the LVM can be updated (step 1110) (e.g., the LVM can be updated to indicate a status of synced and the updated values for the data_hash and modified_time).

If the local peer file was modified before the update to the remote peer file was made (as determined at step 1104 by comparing the modified_time from the FSM 310 with the modified_time in the LVM 312 for the file) or if there was a communications error in downloading the latest version of the remote peer file from the server, an appropriate error handler can be called. The error handler can move the local file to a conflicts folder (step 1118), download the latest version of the remote peer file from the server and store the copy of the remote peer file as the local peer file in the local cache (step 1120). The synchronization manager can further present an error message to the user notifying the user that the edited local version was not the latest version on the server and that a newer version has been downloaded (step 1122). If the error cannot be handled, the synchronization manager can present an error message to the user (step 1124), such as through an overlay on a file icon of the file in the local cache.

One advantage of using a LVM and RVM scheme is that various file system models can be mapped to the LVM and various remote server models can be mapped to the RVM. Thus, synchronization managers can be configured for a variety of environments (file systems, servers, etc.) without changing the synchronization engine. For example, the local link services can be configured to interact with a first local file system to map data from/to the first local file system to/from the LVM and the "remote" link services can be configured to interact with a second local file system to map data from/to the second local file system to/from the RVM such that the synchronization manager synchronizes between two local file systems. In another example, the "local" link services can be configured to interact with a first remote system to map data from/to the first remote system to/from the LVM and the remote link services can be configured to interact with a second remote system to map data to/from the second remote system from/to the RVM such that the synchronization manager synchronizes between two remote systems.

As another advantage, the LVM and RVM can provide representations of local and remote data even if synchronization manager loses connection to the remote server or file system. Because the most recent state of files is recorded in LVM and RVM, the synchronization manager can easily synchronize with the remote server or file system when it reconnects and identify conflicts (e.g., version conflicts) between changes made at the remote server and on the client device while the synchronization manager was disconnected.

Initial RVM and LVM models may be built at initial startup of the synchronization manager post-install. FIG. 12 is a flow diagram illustrating one embodiment of a startup sequence of a synchronization manager that includes a tray application 1202 and a synchronization engine module 1204. In the illustrated embodiment, the tray application 1202 acts as a synchronization agent (e.g., sync agent 202) that handles communication with remote server 1210.

Tray application 1202 may be configured with the credential information, root object identification for a user and other information and pass the root node identification to sync engine module 1204. Though not shown in FIG. 12, tray application 1202 can be configured to log onto server 1210 using the stored credential information at startup. In addition, sync engine module 1204 can connect to tray app 802 at startup. Tray application 1202 can pass the root node identification (e.g., identification for the highest level "folder" for the user on server 1210) to sync engine 1204. Using the example of FIG. 1, a tray application 1202 of synchronization manager 160a can pass an identifier of User A's "home" node to sync engine module 1204. Returning to FIG. 8, as indicated at 1218, sync engine application 1204 communicates with tray application 1202, which can in turn communicate with server 1210, to traverse the hierarchy of objects (folders and files) accessible by the user to collect information according to a remote server model (e.g., remote server model 316) and can construct a remote virtual model (e.g., RVM 314).

In the embodiment illustrated, sync engine module 1204 passes a getObjectInfo(id) command 1222 to tray application 1202 with id of the root node, which sends a getObjectInfo(id) request 1224 to server 1210. Server 1210 replies with an object state (e.g., object id, name, type, version, etc.) (1226), which can be passed to sync engine 404 (1228). If the root node object state indicates that the root node object has children nodes (e.g., the top level folder contains files or folders), sync engine module 1204 can loop through the hierarchy for each node. For nodes that are files, sync engine 1204 can request and receive file binaries (represented by getFile (id, version) 1230, 1232 and binary 1234, 1236) and store the files in a local file system. Using the information from server 1210, the synchronization manager can build an initial local virtual model (e.g., LVM 312) and write files to a local cache residing in a file system.

Using the example of FIG. 1, the state information for the "home" node corresponding to User A, the state information for the node will indicate that the node has the children Folder A and Folder B. The sync engine module 1204 will therefore request the state information for Folder A and Folder B. Similarly, the state information returned by the server for Folder A will indicate it has children File 1 and File 2 and the state information for Folder B will indicate that it has child File 4. The sync engine module 1204 will therefore request the state information for File 1, File 2 and File 4. In addition, sync engine module 1204 can request the binaries of the latest versions File 1, File 2 and File 4. As the synchronization manager collects information from the server and creates files and folders in the local cache, the synchronization manager can build the initial RVM and LVM.

Figure 13:
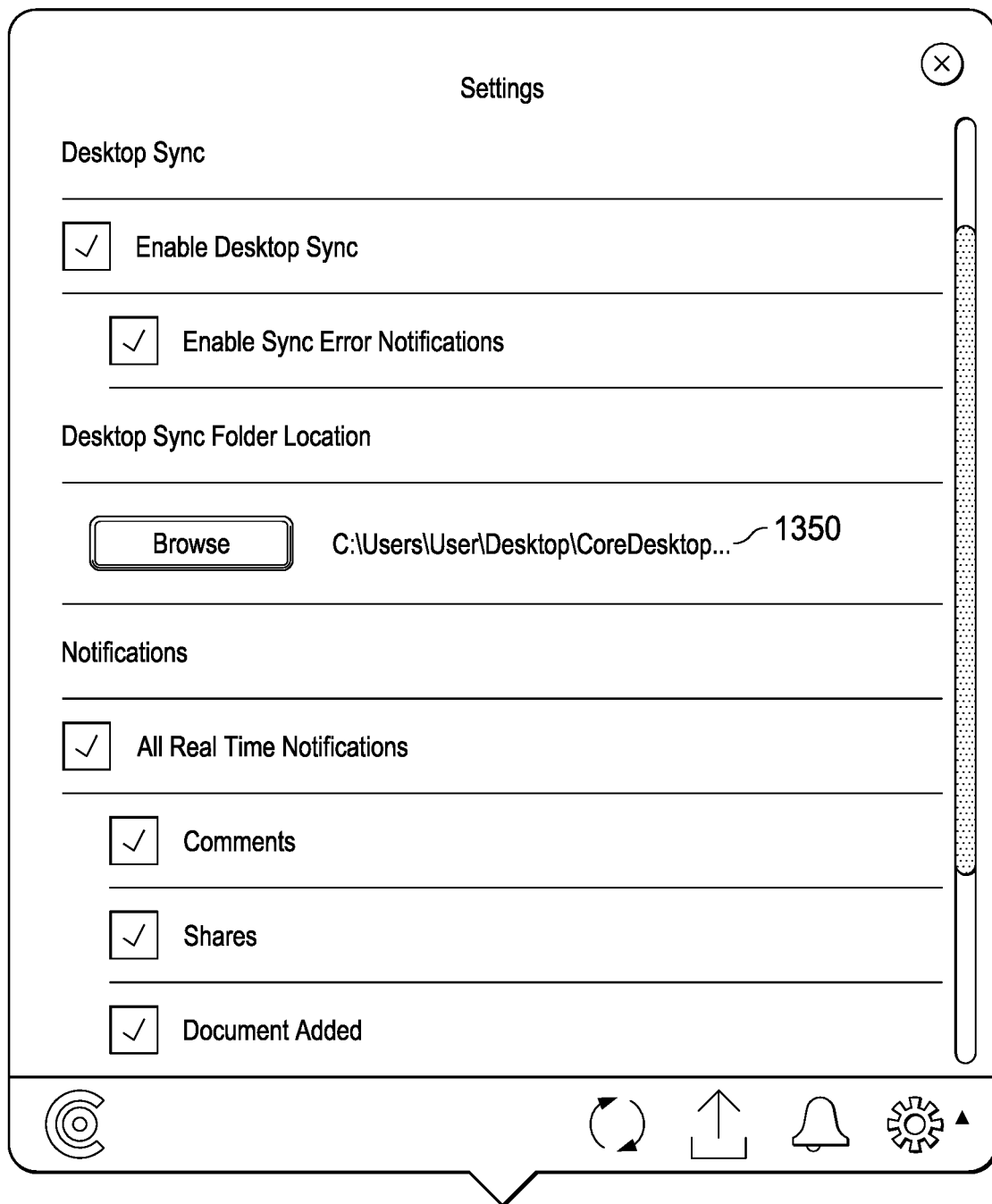
FIG. 13 depicts one embodiment of a user interface provided by one embodiment of a tray application.
Figure 14A:
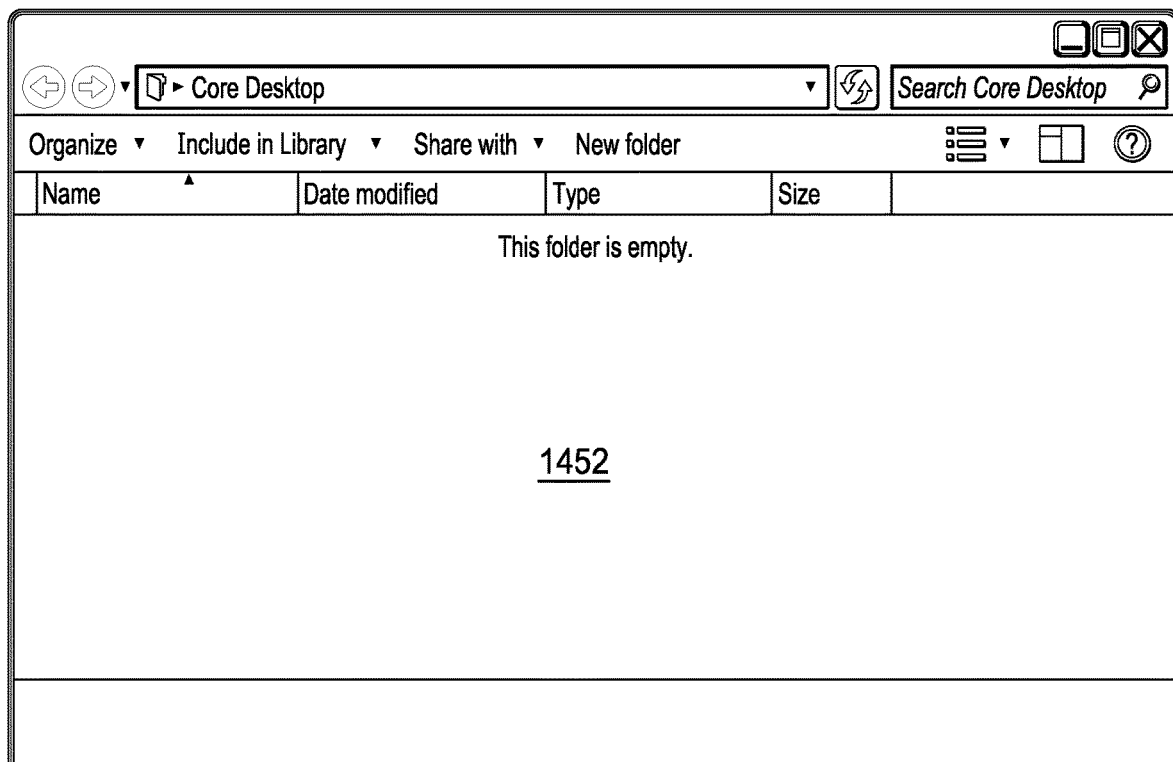
FIGS. 14A, 14B, 14C, 14D, 14E, 14F and 14G depict views of a local cache and content data on a management server associated with the local cache.
Figure 14A:
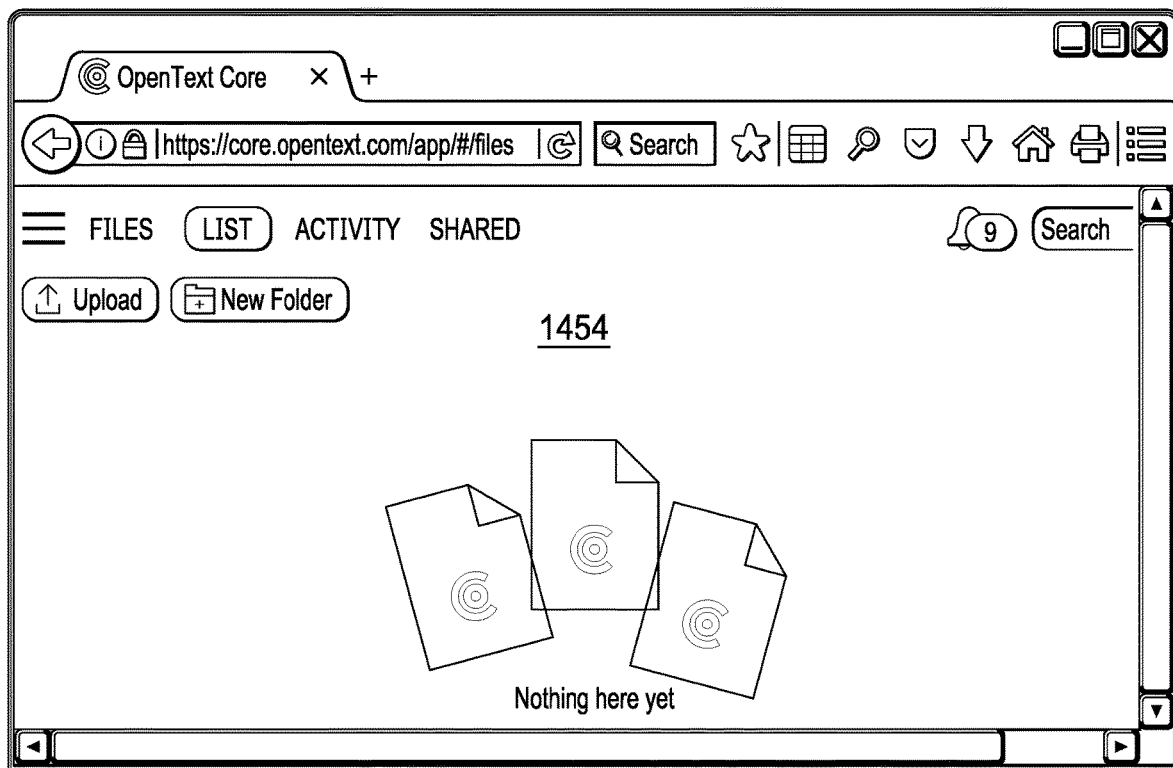
Figure 14B:
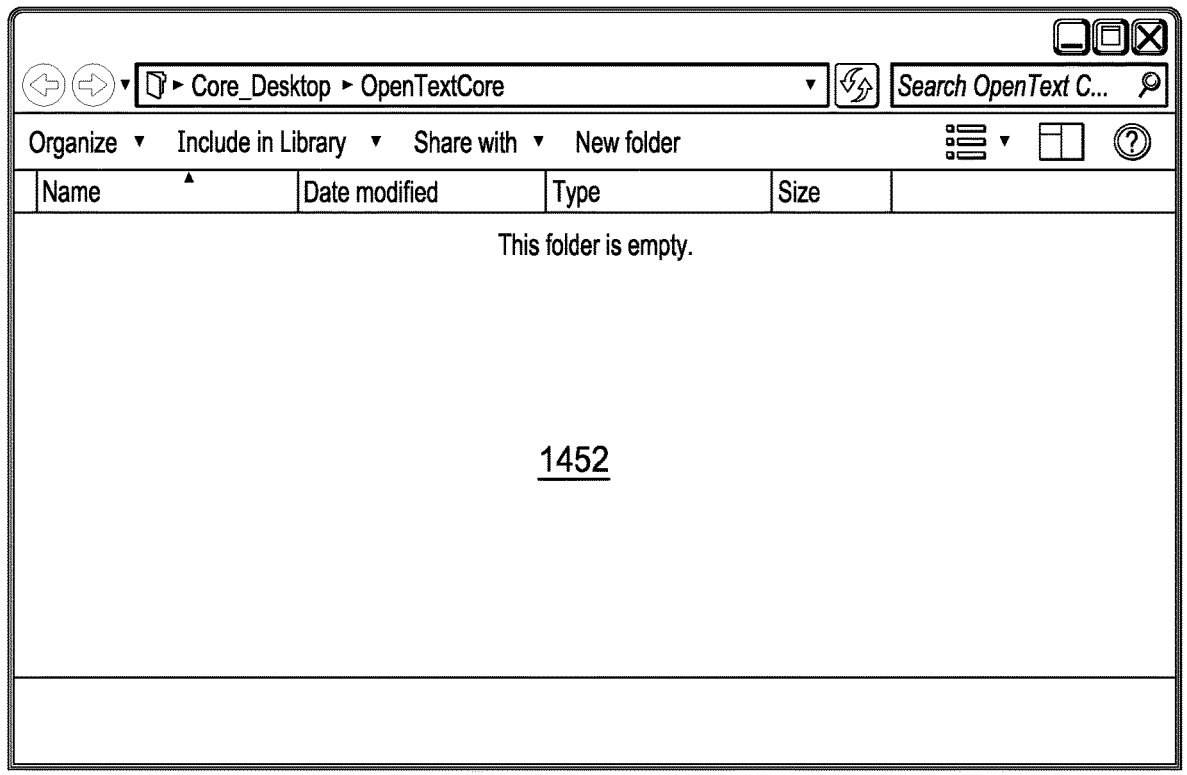
Figure 14B:
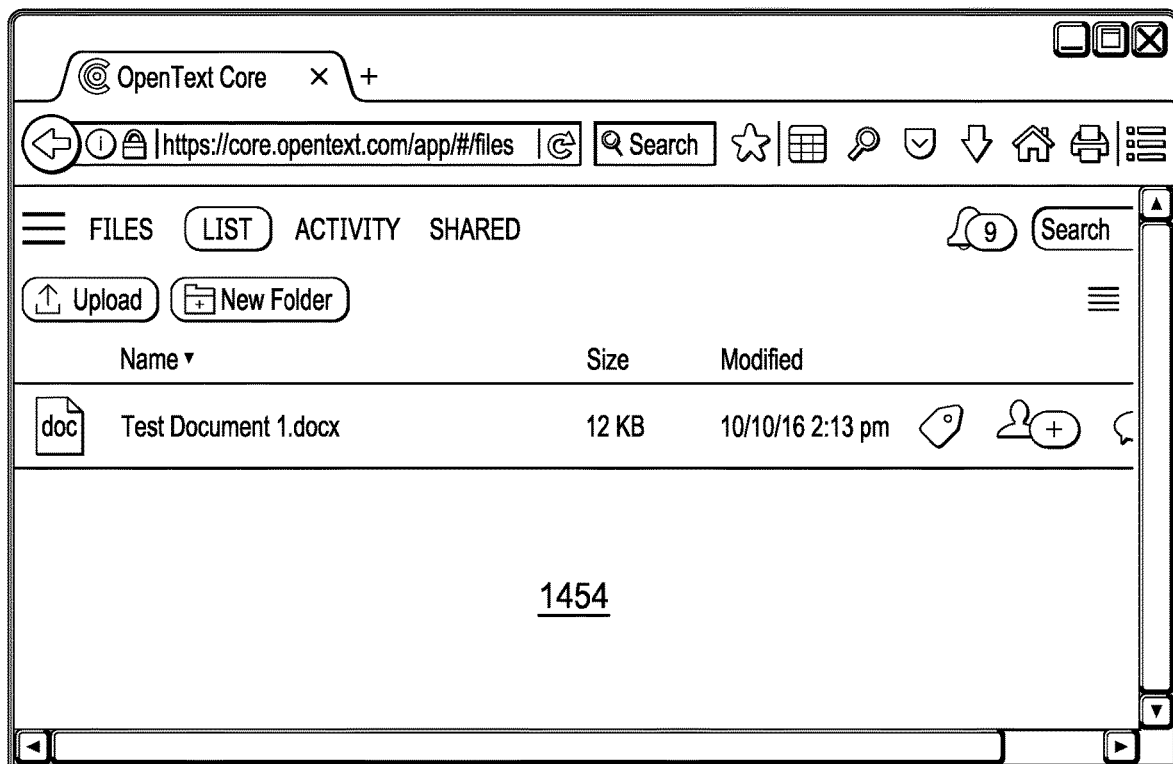
Figure 14C:
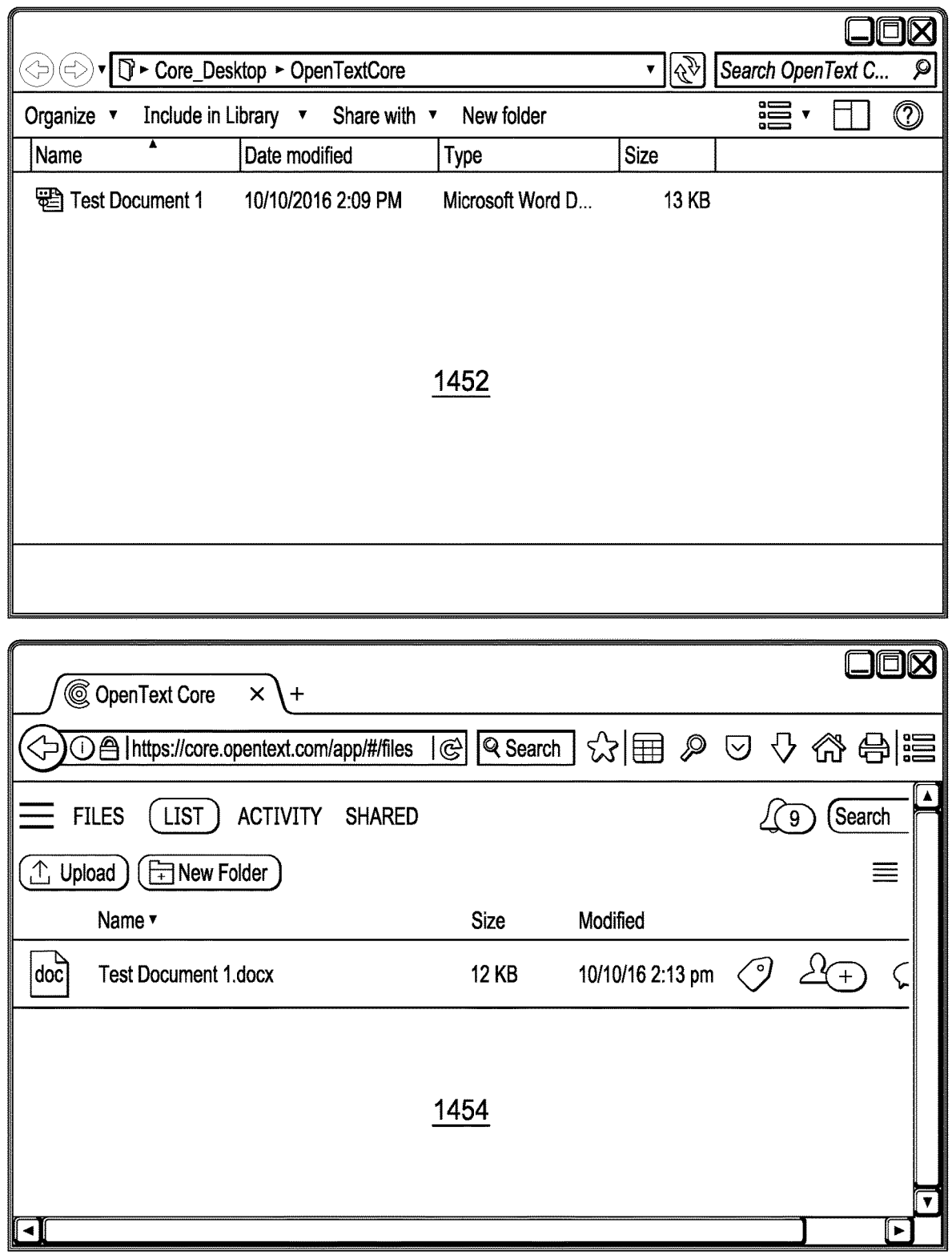
Figure 14D:
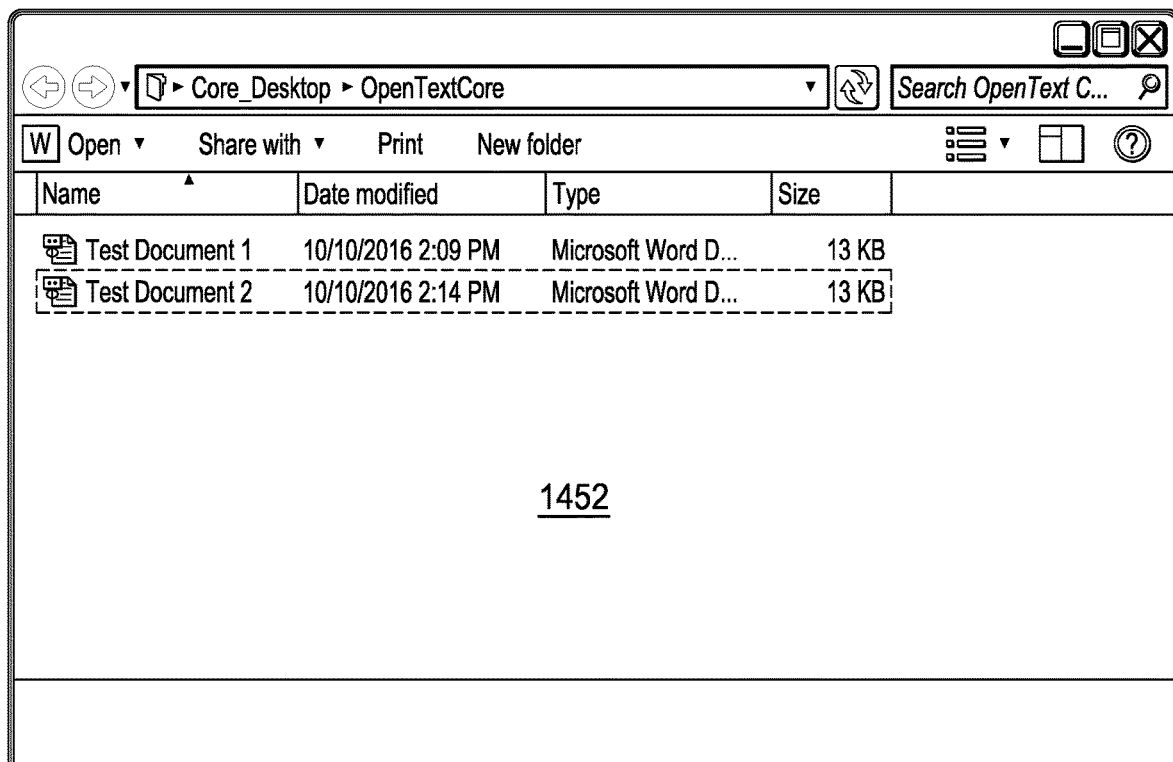
Figure 14D:
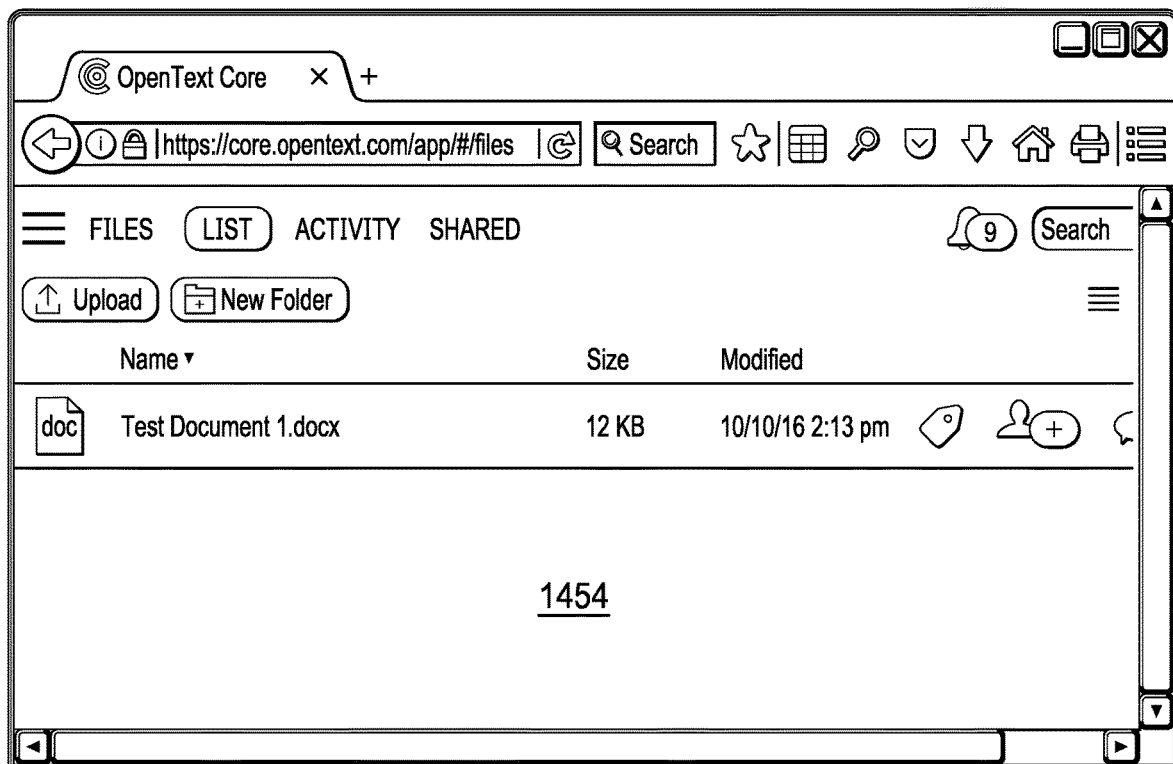
Figure 14E:
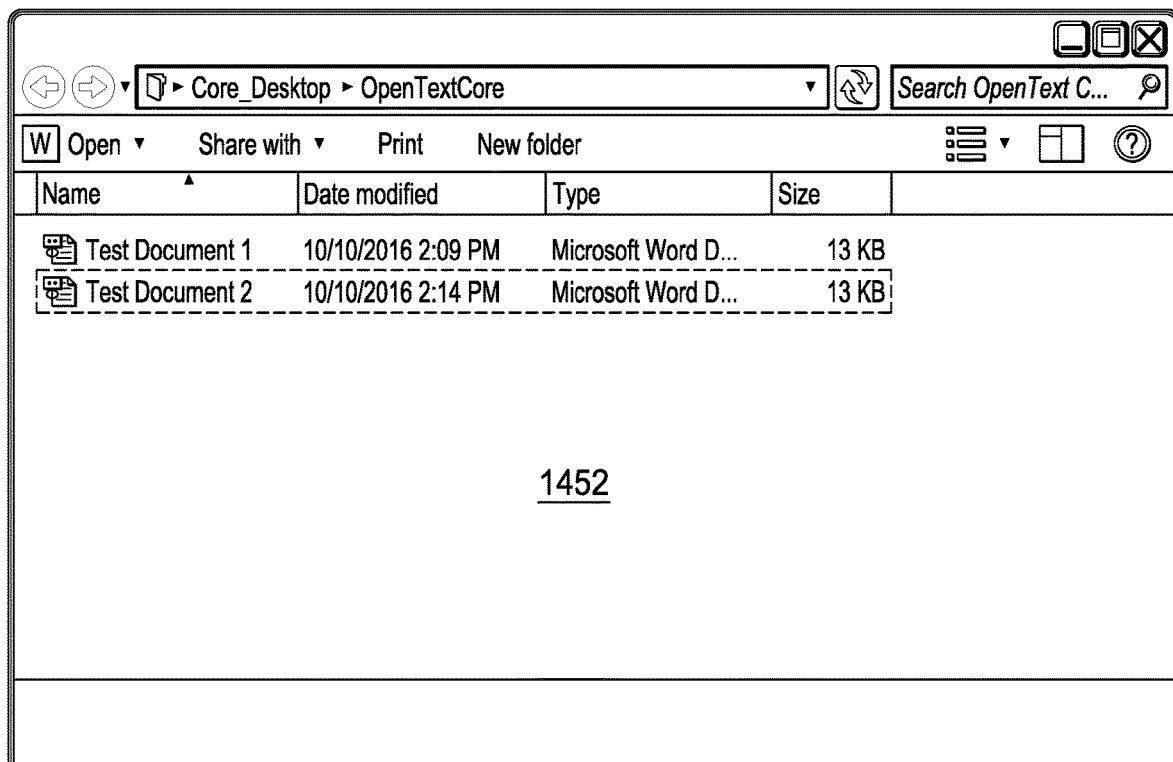
Figure 14E:
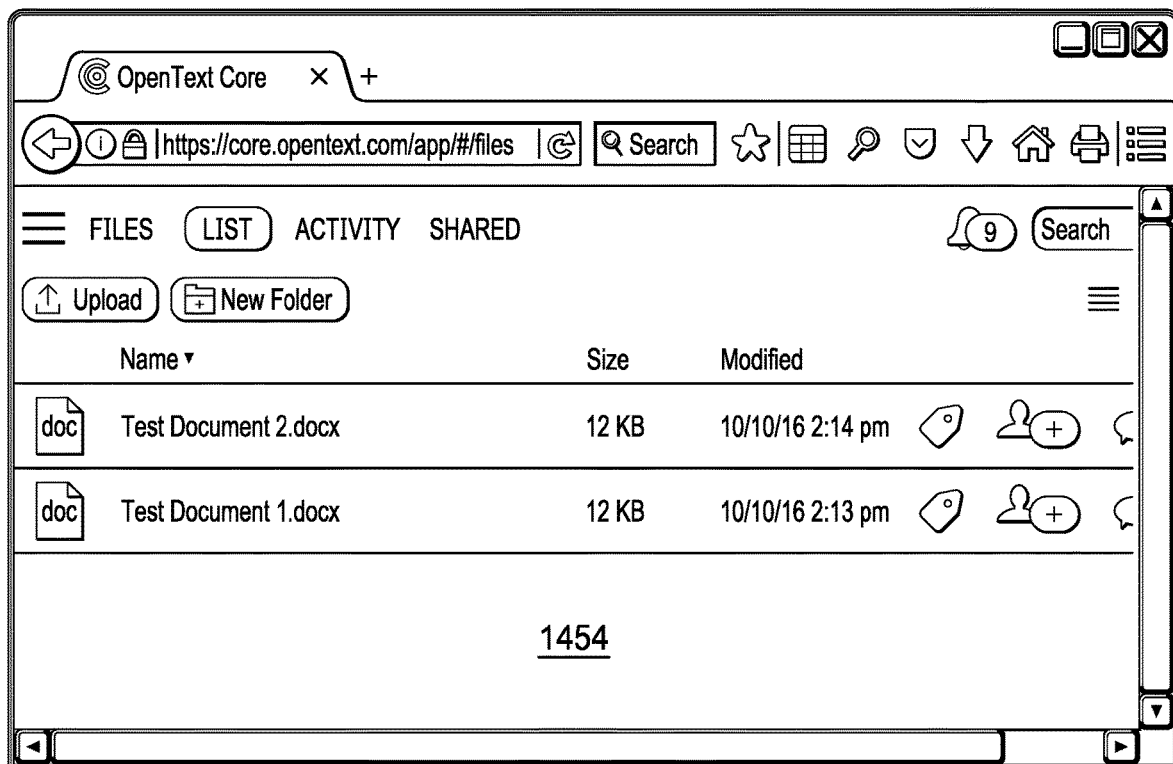
Figure 14F:
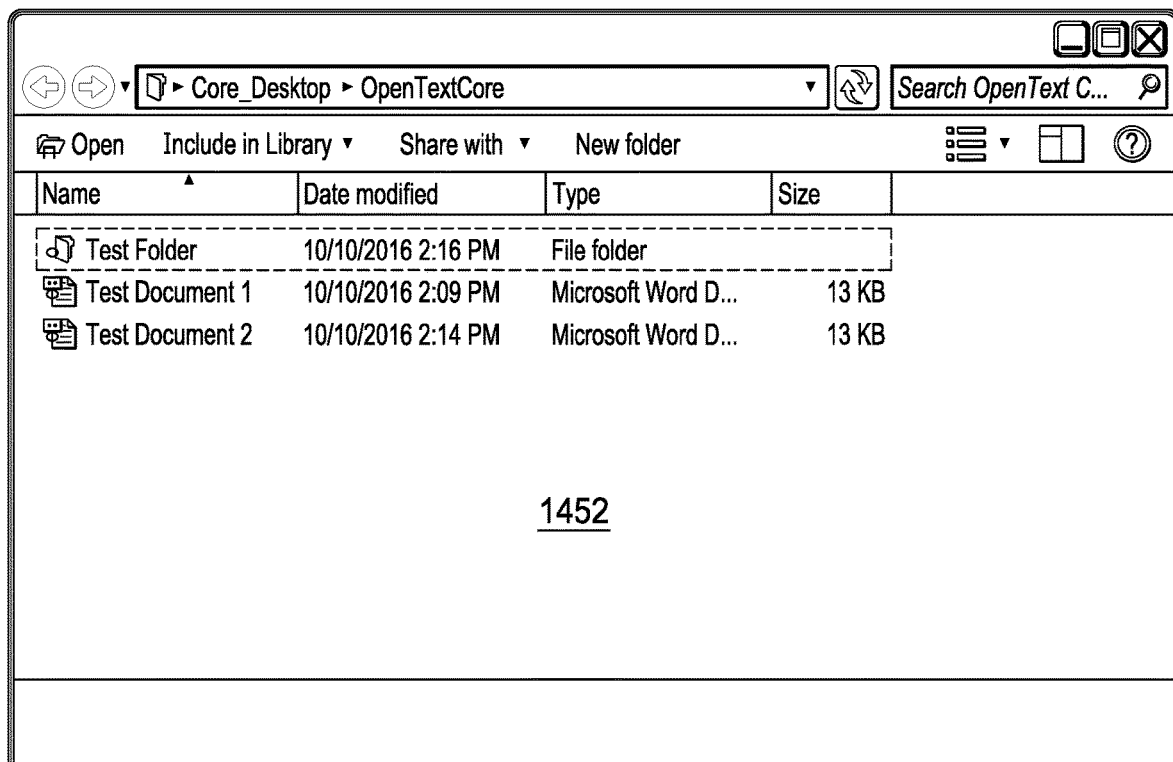
Figure 14F:
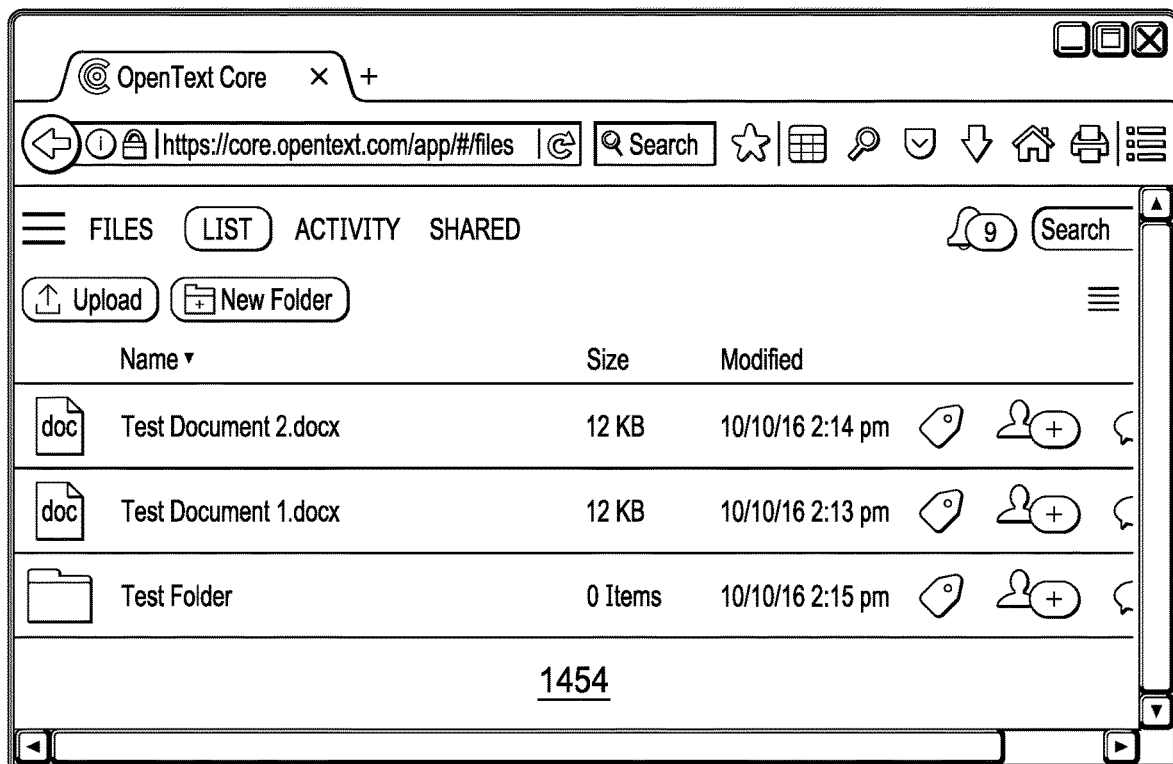
Figure 14G:
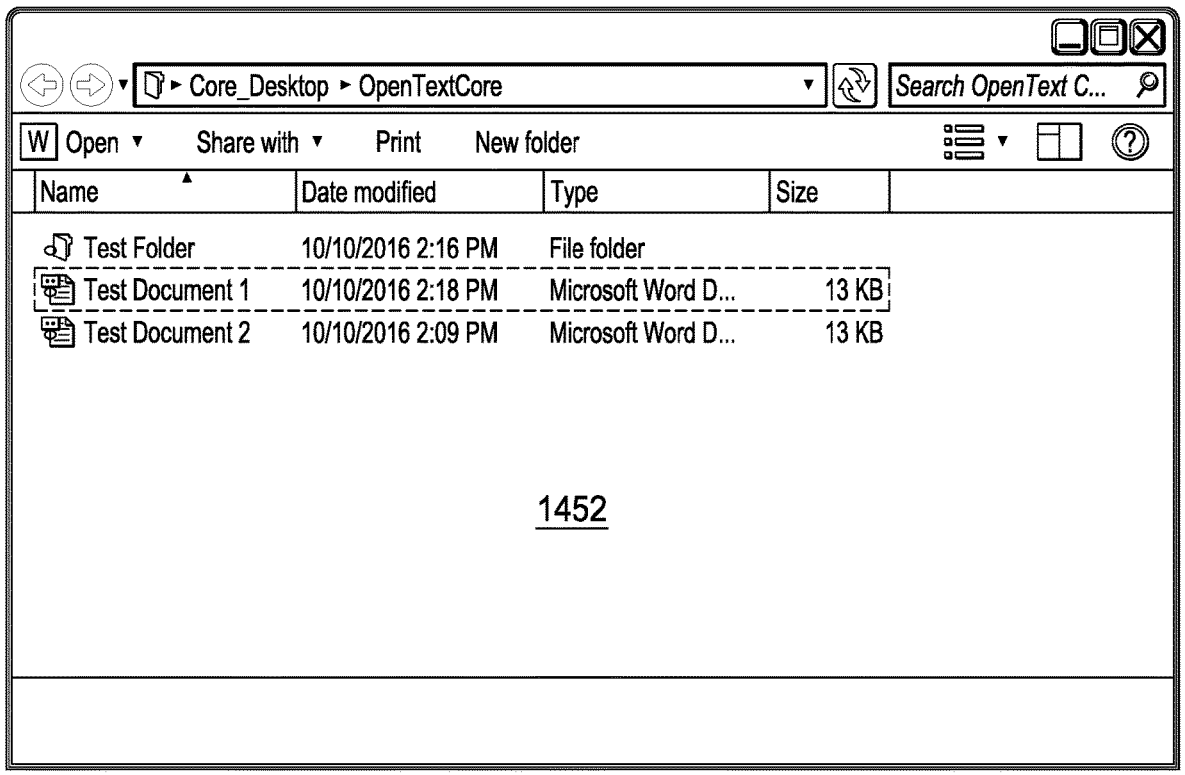
Figure 14G:
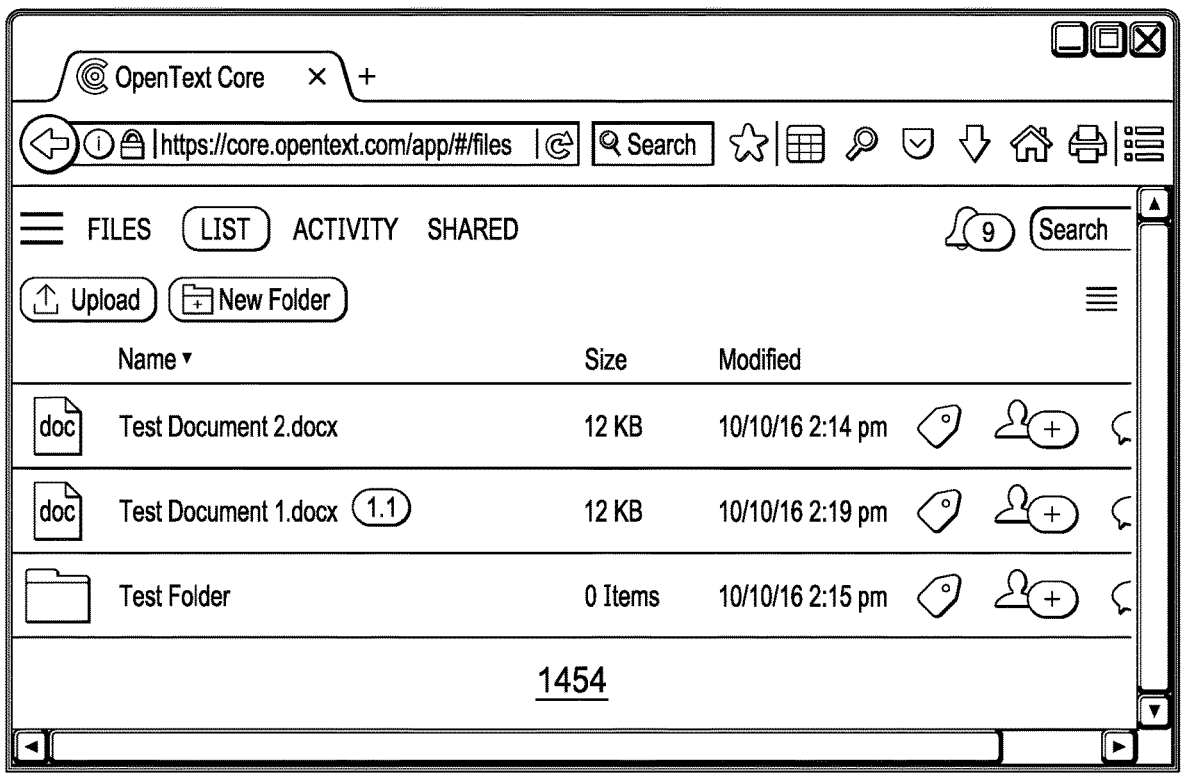

FIG. 13 is a diagrammatic representation of one embodiment of a user interface provided by a tray application in which a user can set the location of a local cache (indicated at 1350). FIGS. 14A-14G illustrate interfaces providing views of a local cache (indicated at 1452) and views of a corresponding location on a content management server as viewed through a web browser (indicated 1454). The highest level folder in the user's local cache corresponds to the highest level folder accessible by the user through the web interface or highest level folder selected for synchronization. FIG. 14A shows an example initial state in which there are no files or folders corresponding to a user account in the local cache or on the content management server. FIG. 14B illustrates an example in which a file "Test Document 1" has been added to the location on the content management server corresponding to a user's account. FIG. 14C illustrates an example in which the synchronization manager on a client device has synchronized the local cache with the content management server such that a local peer copy of "Test Document 1" is stored in the local cache. FIG. 14D illustrates an example in which a user at the client device has added a second file, "Test Document 2", to the local cache associated with the content management system. FIG. 14E illustrates an example in which the synchronization manager has synchronized the content management server with the local cache by storing a remote peer copy of "Test Document 2" at the content management server. FIG. 14F illustrates an example in which the user has added a new folder to the content management system and that the synchronization manager and that the synchronization manager has synchronized the local cache with the content management server by creating the peer local folder in the local cache. FIG. 14G further illustrates an example in which a user has modified the file "Test Document 2" in the local cache. In this example embodiment, when the synchronization manager detects that "Test Document 2" has been released by another application (e.g., an editing application) and has been modified, the synchronization manager can upload a copy of the local peer copy of Test Document 2. The server saves the uploaded file as a new version 1.1. As discussed above, synchronizing the local cache and server can be facilitated through models of the files and folders in the local cache and on the server.

Figure 15:
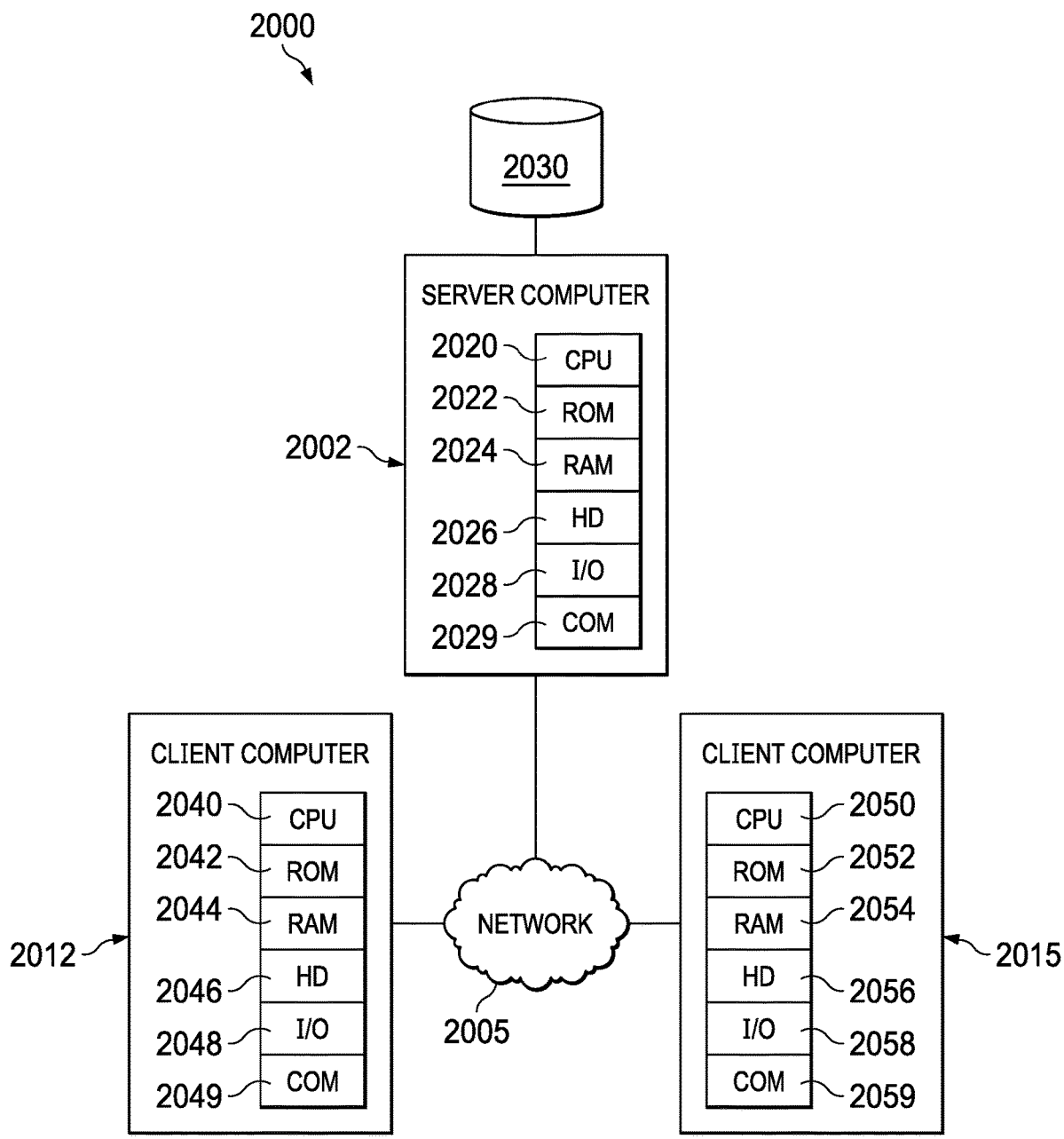
FIG. 15 is a diagrammatic representation of a networked computer environment.

FIG. 15 depicts a diagrammatic representation of a distributed network computing environment where embodiments disclosed herein can be implemented. In the example illustrated, network computing environment 2000 includes network 2005 that can be bi-directionally coupled to client computers 2012, 2015 and server computer 2002. Network 2005 may represent a combination of wired and wireless networks that network computing environment 2000 may utilize for various types of network communications known to those skilled in the art. For the purpose of illustration, a single system is shown for each of computer 2002, 2012, and 2015. However, with each of computer 2002, 2012 and 2015 may comprise a plurality of computers (not shown) interconnected to each other over network 2005. For example, a plurality of computers 2002, a plurality of computers 2012 and a plurality of computers 2015 may be coupled to network 2005. Computers 2012, 2015 may include data processing systems for communicating with computer 2002.

Server computer 2002 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005. Computer 2002 may include one or more backend systems configured for providing a variety of services to computers 2012, 2015 over network 2005. These services may utilize data stored in data store 2030. According to one embodiment, server computer 2002 may include computer executable instructions stored on a non-transitory computer readable medium coupled to a processor. The computer executable instructions of server 2002 may be executable to provide a content management application to manage an object data store in which folders and files are managed as objects.

Computer 2012 can comprise CPU 2040, ROM 2042, RAM 2044, HD 2046, I/O 2048 and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058 and communications interface 2059. According to one embodiment, client computers 2012, 2012 run synchronization managers to synchronize local files and folders with remote peers managed in data store 2030.

Each of the computers in FIG. 15 may have more than one CPU, ROM, RAM, HD, I/O, or other hardware components. For the sake of brevity, each computer is illustrated as having one of each of the hardware components, even if more than one is used. Each of computers 2002, 2012 and 2015 is an example of a data processing system. ROM 2022, 2042, and 2052; RAM 2024, 2044, and 2054; HD 2026, 2046, and 2056; and data store 2030 can include media that can be read by CPU 2020, 2040, or 2050. These memories may be internal or external to computers 2002, 2012, or 2015.

Portions of the methods described herein may be implemented in suitable software code that may reside within ROM 2022, 2042, or 2052; RAM 2024, 2044, or 2054; or HD 2026, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

As one skilled in the art can appreciate, a computer program product implementing an embodiment disclosed herein may comprise one or more non-transitory computer readable media storing computer instructions translatable by one or more processors in a computing environment. ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Data may be stored in a single storage medium or distributed through multiple storage mediums, and may reside in a single database or multiple databases (or other data storage techniques).

Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

The invention claimed is:

1. A system comprising:
a processor;
a memory having stored thereon instructions executable by the processor to:
  send a request from a client device to a content management system for a resource stored at the content management system;
  receive the resource in response to the request;
  store the received resource as a local peer resource in a local cache located in a local file system of the client device, the local peer resource having local peer resource content and an associated set of local peer resource filesystem metadata on the local file system, the local peer resource corresponding to a remote peer resource having remote peer resource content and an associated set of remote peer resource metadata at the content management system;
  maintain a remote virtual model at the client device, the remote virtual model including a set of remote virtual model attributes for the remote peer resource;
  maintain as a separate data structure from the associated set of local peer resource filesystem metadata, a local virtual model at the client device, the local virtual model including a set of local virtual model attributes for the local peer resource;
  determine that the remote peer resource and local peer resource are out of sync based on a comparison of the remote virtual model and the local virtual model at the client device, the comparison of the remote virtual model and the local virtual model comprising a comparison of the set of remote virtual model attributes and the set of local virtual model attributes; and
  based on a result of the comparison, synchronize changes to the local peer resource to the content management system to update the remote peer resource.

2. The system of claim 1, wherein the remote virtual model at the client device models a synchronization state of the remote peer resource at the content management system, the remote virtual model further including an indication of the synchronization state for the remote peer resource, and wherein the local virtual model at the client device models a synchronization state of the local peer resource in the local file system, the local virtual model further including an indication of the synchronization state for the local peer resource, and wherein the comparison of the remote virtual model and the local virtual model, further comprises:
  comparing the synchronization state of the local peer resource and the synchronization state of the remote peer resource.

3. The system of claim 1, wherein the instructions are further executable to:
  monitor the local file system for events in the local cache;
  in response to an event in the local cache, determine that the local peer resource has been modified;
  update the local virtual model to reflect a current state of the local peer resource;
  update the remote virtual model based on the result of the comparison to mark the remote virtual model stale for the resource;
  based on the update to the remote virtual model, send the local peer resource to the content management system to update the remote peer resource; and update the remote virtual model to indicate that the local peer resource and the remote peer resource are synchronized.

4. The system of claim 3, wherein monitoring the local file system for events in the local cache comprises registering with an operating system for change notifications with respect to a local cache directory.

5. The system of claim 3, wherein monitoring the local file system for events in the local cache comprises polling an operating system for file system metadata of items in the local cache.

6. The system of claim 3, wherein determining that the local peer resource has been modified comprises:
    generating a file system model of the local peer resource, the file system model comprising file system model attributes, the file system model attributes comprising a third content data hash and a third metadata attribute, the third content data hash generated based on the local peer resource content; and
    comparing the file system model of the local peer resource to an entry for the local peer resource in the local virtual model, the entry for the local peer resource comprising the set of local virtual model attributes, wherein the local virtual model is updated based on a result of a comparison of the file system model and the entry for the local peer resource in the local virtual model.

7. The system of claim 1, wherein the instructions are further executable to:
    monitor a remote server for changes to the remote peer resource;
    in response to a change to the remote peer resource, update the remote virtual model for the remote peer resource;
    update the local virtual model based on the result of the comparison to mark the local virtual model stale for the resource;
    based on the update to the local virtual model, download a copy of the remote peer resource and store the copy of the remote peer resource in the local cache to update the local peer resource; and
    update the local virtual model to indicate that the local peer resource and the remote peer resource are synchronized.

8. The system of claim 1, wherein the instructions are further executable to:
    based on the result of the comparison, synchronize changes to the remote peer resource to the local cache on the client device.

9. A method of synchronizing content, the method comprising:
    sending a request from a client device to a content management system for a resource stored at the content management system;
    receiving the resource in response to the request;
    storing the received resource as a local peer resource in a local cache located in a local file system of the client device, the local peer resource having local peer resource content and an associated set of local peer resource filesystem metadata on the local file system, the local peer resource corresponding to a remote peer resource having remote peer resource content and an associated set of remote peer resource metadata at the content management system;
    maintaining a remote virtual model at the client device, the remote virtual model including a set of remote virtual model attributes for the remote peer resource;
    maintaining as a separate data structure from the associated set of local peer resource filesystem metadata, a local virtual model at the client device, the local virtual model including a set of local virtual model attributes for the local peer resource;
    determining that the remote peer resource and local peer resource are out of sync based on a comparison of the remote virtual model and the local virtual model at the client device, the comparison of the remote virtual model and the local virtual model comprising a comparison of the set of remote virtual model attributes and the set of local virtual model attributes; and
    based on a result of the comparison, synchronizing changes to the local peer resource to the content management system to update the remote peer resource.

10. The method of claim 9, wherein the remote virtual model at the client device models a synchronization state of the remote peer resource at the content management system, the remote virtual model further including an indication of the synchronization state for the remote peer resource, and wherein the local virtual model at the client device models a synchronization state of the local peer resource in the local file system, the local virtual model further including an indication of the synchronization state for the local peer resource, and wherein the comparison of the remote virtual model and the local virtual model, further comprises:
    comparing the synchronization state of the local peer resource and the synchronization state of the remote peer resource.

11. The method of claim 9, further comprising:
    monitoring the local file system for events in the local cache;
    in response to an event in the local cache, determining that the local peer resource has been modified;
    updating the local virtual model to reflect a current state of the local peer resource;
    updating the remote virtual model based on the result of the comparison to mark the remote virtual model stale for the resource;
    based on the update to the remote virtual model, sending the local peer resource to the content management system to update the remote peer resource; and
    updating the remote virtual model to indicate that the local peer resource and the remote peer resource are synchronized.

12. The method of claim 11, wherein monitoring the local file system for events in the local cache comprises registering with an operating system for change notifications with respect to a local cache directory.

13. The method of claim 11, wherein monitoring the local file system for events in the local cache comprises polling an operating system for file system metadata of items in the local cache.

14. The method of claim 11, wherein determining that the local peer resource has been modified comprises:
    generating a file system model of the local peer resource, the file system model comprising file system model attributes, the file system model attributes comprising a third content data hash and a third metadata attribute, the third content data hash generated based on the local peer resource content; and
    comparing the file system model of the local peer resource to an entry for the local peer resource in the local virtual model, the entry for the local peer resource comprising the set of local virtual model attributes, wherein the local virtual model is updated based on a result of a comparison of the file system model and the entry for the local peer resource in the local virtual model.

15. The method of claim 9, further comprising:
monitoring a remote server for changes to the remote peer resource;
in response to a change to the remote peer resource, updating the remote virtual model for the remote peer resource;
updating the local virtual model based on the result of the comparison to mark the local virtual model stale for the resource;
based on the update to the local virtual model, downloading a copy of the remote peer resource and store the copy of the remote peer resource in the local cache to update the local peer resource; and
updating the local virtual model to indicate that the local peer resource and the remote peer resource are synchronized.

16. The method of claim 9, further comprising:
based on the result of the comparison, synchronizing changes to the remote peer resource to the local cache on the client device.

17. A system comprising:
a processor;
a memory having stored thereon instructions executable by the processor to provide a synchronization manager configured to run on a client device to:
 request files from a content management system, the files having a first set of associated metadata at the content management system;
 store the files in a local cache associated with the content management system, the files in the local cache having associated filesystem metadata on a local filesystem;
 maintain at the client device and as a separate data structure from the associated filesystem metadata, a local virtual model modelling the files in the local cache, the local virtual model including a set of virtual local model attributes for the files in the local cache and a synchronization status for each of the files in the local cache, the set of virtual local model attributes comprising a content data hash and a set of metadata for each of the files in the local cache; and
 maintain at the client device a remote virtual model modelling the files on the content management system, the remote virtual model including a set of remote virtual model attributes for the files on the content management system and a synchronization status for each of the files on the content management system, the set of remote virtual model attributes comprising a content data hash and a set of metadata for each of the files on the content management system, the synchronization manager comprising:
 remote link services configured to:
  update the remote virtual model based on changes at the content management system;
  send copies of local peer files to the content management system based on changes to the remote virtual model to synchronize the content management system with the local cache;
 local link services configured to;
  update the local virtual model based on changes in the local cache;
  update the local cache based on changes to the local virtual model to synchronize the local cache with the content management system;
 a synchronization engine configured to:
  compare the local virtual model and the remote virtual model, wherein comparing the local virtual model and the remote virtual model comprises comparing the set of local virtual model attributes and the set of remote virtual model attributes;
  update the local virtual model based on the remote virtual model to indicate that the local cache is out of sync with the content management system; and
  update the remote virtual model based on the local virtual model to indicate the content management system is out of sync with the local cache.

18. The system of claim 17, wherein the remote link services are further configured to map a remote server model to the remote virtual model.

19. The system of claim 17, wherein the local link services are further configured to map a file system model to the local virtual model.

20. The system of claim 17, wherein the synchronization manager further comprises:
a local watcher configured to monitor the local filesystem for changes in the local cache, wherein the local link services are further configured to update the local virtual model responsive to events detected by the local watcher; and
a remote watcher configured to monitor the content management system for changes at the content management system, wherein the remote link services are further configured to update the remote virtual model responsive to services detected by the remote watcher.

* * * * *